(12) United States Patent
Figueroa et al.

(10) Patent No.: US 10,870,713 B2
(45) Date of Patent: Dec. 22, 2020

(54) PROCATALYST AND POLYMERIZATION PROCESS USING THE SAME

(71) Applicant: Dow Global Technologies LLC, Midland, MI (US)

(72) Inventors: Ruth Figueroa, Midland, MI (US); Johnathan Delorbe, Manvel, TX (US); Phillip P. Fontaine, Alvin, TX (US); Jerzy Klosin, Midland, MI (US); Ravi Shankar, Midland, MI (US); Matthew Yonkey, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 267 days.

(21) Appl. No.: 15/763,945

(22) PCT Filed: Sep. 29, 2016

(86) PCT No.: PCT/US2016/054285
§ 371 (c)(1),
(2) Date: Mar. 28, 2018

(87) PCT Pub. No.: WO2017/058981
PCT Pub. Date: Apr. 6, 2017

(65) Prior Publication Data
US 2018/0265604 A1 Sep. 20, 2018

Related U.S. Application Data

(60) Provisional application No. 62/234,791, filed on Sep. 30, 2015.

(51) Int. Cl.
| | | |
|---|---|---|
| C08F 4/64 | (2006.01) | |
| C08F 4/659 | (2006.01) | |
| C08F 210/16 | (2006.01) | |
| B01J 31/22 | (2006.01) | |

(52) U.S. Cl.
CPC ......... *C08F 4/64193* (2013.01); *B01J 31/223* (2013.01); *C08F 4/65908* (2013.01); *C08F 4/65912* (2013.01); *C08F 210/16* (2013.01); *B01J 2231/12* (2013.01); *B01J 2523/48* (2013.01); *B01J 2523/49* (2013.01); *C08F 2500/08* (2013.01)

(58) Field of Classification Search
None
See application file for complete search history.

(56) References Cited

U.S. PATENT DOCUMENTS

| | | | |
|---|---|---|---|
| 5,064,802 A | 11/1991 | Stevens et al. | |
| 5,153,157 A | 10/1992 | Hlatky et al. | |
| 5,296,433 A | 3/1994 | Siedle et al. | |
| 5,321,106 A | 6/1994 | Lapointe | |
| 5,350,723 A | 9/1994 | Neithamer et al. | |
| 5,425,872 A | 6/1995 | Devore et al. | |
| 5,625,087 A | 4/1997 | Devore et al. | |
| 5,721,185 A | 2/1998 | Lapointe et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 6,103,657 A | 8/2000 | Murray | |
| 6,515,155 B1 | 2/2003 | Klosin et al. | |
| 6,696,379 B1 | 2/2004 | Carnahan et al. | |
| 6,869,904 B2 | 3/2005 | Boussie et al. | |
| 7,060,848 B2 | 6/2006 | Boussie et al. | |
| 7,163,907 B1 | 1/2007 | Canich et al. | |
| 7,951,882 B2 | 5/2011 | Arriola et al. | |
| 8,609,794 B2 | 12/2013 | Klosin et al. | |
| 8,729,201 B2 | 5/2014 | Fontaine et al. | |
| 9,029,487 B2 | 5/2015 | Klosin et al. | |
| 9,102,819 B2 | 8/2015 | Kapur et al. | |
| 9,522,855 B2 | 12/2016 | Klosin et al. | |

(Continued)

FOREIGN PATENT DOCUMENTS

| | | | |
|---|---|---|---|
| CN | 102712795 A | 10/2012 | |
| GB | 1069848 A | 5/1967 | |

(Continued)

OTHER PUBLICATIONS

Office Action dated Jun. 10, 2019 pertaining to U.S. Appl. No. 15/740,996, filed Dec. 29, 2017, 33 pgs.

(Continued)

*Primary Examiner* — Catherine S Branch
(74) *Attorney, Agent, or Firm* — Dinsmore & Shohl LLP

(57) ABSTRACT

A procatalyst for the polymerization of ethylene and optionally one or more alpha-olefins having the structure shown in formula (I) below. Formula (I) is provided. Also provided is a polymerization process using the inventive procatalyst.

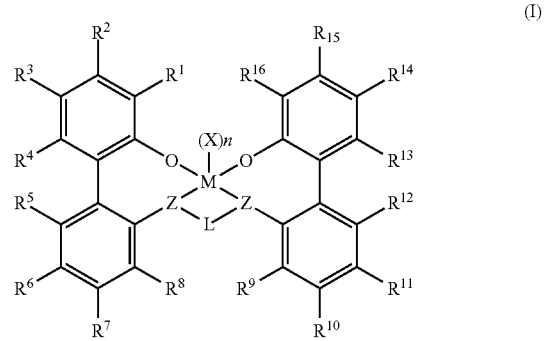

(I)

14 Claims, No Drawings

(56) References Cited

U.S. PATENT DOCUMENTS

| | | | |
|---|---|---|---|
| 9,527,940 | B2 | 12/2016 | Demirors et al. |
| 9,527,941 | B2 | 12/2016 | Demirors et al. |
| 9,601,230 | B2 | 3/2017 | Nair et al. |
| 9,601,231 | B2 | 3/2017 | Klosin et al. |
| 9,605,098 | B2 | 3/2017 | Klosin et al. |
| 2004/0005984 | A1 | 1/2004 | Boussie et al. |
| 2011/0039082 | A1 | 2/2011 | Yun et al. |
| 2011/0082249 | A1 | 4/2011 | Shan et al. |
| 2011/0282018 | A1 | 11/2011 | Klosin et al. |
| 2014/0330056 | A1 | 11/2014 | Klosin et al. |
| 2014/0357918 | A1 | 12/2014 | Klosin et al. |
| 2015/0337062 | A1 | 11/2015 | Demirors et al. |
| 2015/0337063 | A1 | 11/2015 | Demirors et al. |
| 2015/0344601 | A1 | 12/2015 | Demirors et al. |
| 2015/0344602 | A1 | 12/2015 | Demirors et al. |
| 2017/0101494 | A1* | 4/2017 | Fontaine ............... C08F 210/16 |
| 2018/0186910 | A1 | 7/2018 | Figueroa |
| 2018/0194871 | A1 | 7/2018 | Figueroa |

FOREIGN PATENT DOCUMENTS

| | | |
|---|---|---|
| JP | 2000159829 A | 6/2000 |
| JP | 2001525859 A | 12/2001 |
| JP | 2005523921 A | 8/2005 |
| JP | 2011525212 A | 9/2011 |
| JP | 2013521382 A | 6/2013 |
| JP | 2013534934 A | 9/2013 |
| JP | 2013541631 A | 11/2013 |
| JP | 2013544940 A | 12/2013 |
| WO | 2007136494 A2 | 11/2007 |
| WO | 2007136496 A2 | 11/2007 |
| WO | 2010061630 A1 | 6/2010 |
| WO | 2011025784 A1 | 3/2011 |
| WO | 2011041696 A1 | 4/2011 |
| WO | 2011109563 A2 | 9/2011 |
| WO | 2011146044 A1 | 11/2011 |
| WO | 2011146291 A1 | 11/2011 |
| WO | 2012004683 A2 | 1/2012 |
| WO | 2012027448 A1 | 3/2012 |
| WO | 2012064630 A2 | 5/2012 |
| WO | 2013101375 A1 | 7/2013 |
| WO | 2014105411 A1 | 7/2014 |
| WO | 2014105412 A1 | 7/2014 |
| WO | 2014105413 A1 | 7/2014 |
| WO | 2014105414 A1 | 7/2014 |
| WO | 2014209927 A1 | 12/2014 |
| WO | 2015045928 A1 | 4/2015 |
| WO | 2015045930 A1 | 4/2015 |

OTHER PUBLICATIONS

Notice of Allowance and Fee(s) Due dated Jan. 8, 2020 pertaining to U.S. Appl. No. 15/763,937, filed Mar. 28, 2018, 12 pgs.
Notice of Allowance pertaining to U.S. Appl. No. 15/357,901, dated May 16, 2018, 29 pages.
Balke et al.., Chromatography of Polymers, Chapter 13, pp. 199-219 (1992).
Bonvonsombat et al., "Regioselective Iodination of Phenol and Analogues Using N-Iodosuccinimide and p-toluenesulfonic Acid", Tetrahedrom Letters, 2009, 50: 22, 2664-2667.
Chinese Office Action dated Aug. 22, 2016 pertaining to Chinese Application No. 201380067366.4.
Chinese Office Action dated Jan. 25, 2018 pertaining to Chinese Application No. 201380065868.3.
Chinese Office Action dated May 15, 2017 pertaining to Chinese Application No. 201380067366.4.
Chinese Office Action dated May 3, 2017 pertaining to Chinese Application No. 201380065868.3.
Chinese Office Action dated Sep. 1, 2016 pertaining to Chinese Application No. 201380065868.3.
Chinese Office Action dated Nov. 1, 2017 pertaining to Chinese Application No. 201480033642.X.
Chinese Office Action pertaining to Chinese Patent Application No. 201380065667.3.
Chinese Office Action pertaining to Chinese Patent Application No. 201380065848.6.
Chinese Office Action pertaining to Chinese Patent Application No. 201380067367.9 dated May 11, 2017.
Chinese Office Action pertaining to Chinese Patent Application No. 201380067367.9.
EP Communication Pursuant to Rules 161(1) and 162 EPC dated Aug. 4, 2015 for EPO Application No. 13811737.9.
EPO Communication pursuant to Rules 161(1) and 162 EPC dated Aug. 4, 2015 pertaining to European Patent Application No. 13811736.1.
EPO Communication pursuant to Rules 161(1) and 162 EPC dated Aug. 4, 2015 pertaining to European Patent Application No. 13812379.9.
European Search Report pertaining to European Patent Application Serial No. 14741484.1 dated Aug. 24, 2017.
Giorgio Soave, Chemical Engineering Science, 1972, vol. 27, pp. 1197-1203.
Han et al., "Synthesis of diindeno-Fused 4H-Cyclopenta[def]phenanthren-4-ones and Related Compounds via Benzannulated Enediynyl Propargylic Alcohols", J. Org. Chem., 2005, 70: 6, 2406-2408.
International Preliminary Report on Patentability pertaining to PCT/US2013/0073982 dated Jun. 30, 2015.
International Preliminary Report on Patentability pertaining to PCT/US2013/073976 dated Jun. 30, 2015.
International Preliminary Report on Patentability pertaining to PCT/US2013/073977 dated Mar. 18, 2014.
International Preliminary Report on Patentability pertaining to PCT/US2013/073979 dated Jul. 9, 2015.
International Preliminary Report on Patentability pertaining to PCT/US2013/073980 dated Jun. 30, 2015.
International Preliminary Report on Patentability pertaining to PCT/US2014/044374 dated Jan. 7, 2016.
International Preliminary Report on Patentability pertaining to PCT/US2016/040568 dated Jan. 2, 2018.
International Preliminary Report on Patentability pertaining to PCT/US2016/040577 dated Jan. 2, 2018.
International Preliminary Report on Patentability pertaining to PCT/US2016/054088 dated Apr. 3, 2018.
International Preliminary Report on Patentability pertaining to PCT/US2016/054285 dated Apr. 3, 2018.
International Search Report and Written Opinion pertaining to PCT/US2013/073976 dated Mar. 18, 2014.
International Search Report and Written Opinion pertaining to PCT/US2013/073977 dated Jul. 9, 2015.
International Search Report and Written Opinion pertaining to PCT/US2013/073979 dated Mar. 18, 2014.
International Search Report and Written Opinion pertaining to PCT/US2013/073980 dated Mar. 18, 2014.
International Search Report and Written Opinion pertaining to PCT/US2013/073982 dated Mar. 18, 2014.
International Search Report and Written Opinion pertaining to PCT/US2014/044374 dated Aug. 28, 2014.
International Search Report and Written Opinion pertaining to PCT/US2016/040568 dated Sep. 26, 2016.
International Search Report and Written Opinion pertaining to PCT/US2016/040577 dated Sep. 30, 2016.
International Search Report and Written Opinion pertaining to PCT/US2016/054088 dated Dec. 19, 2016.
International Search Report and Written Opinion pertaining to PCT/US2016/054285 dated Dec. 21, 2016.
Japanese Office Action pertaining to Japan Patent Application No. 2015-550433 dated Jan. 9, 2018.
Japanese Office Action pertaining to Japan Patent Application No. 2015-550434 dated Jan. 9, 2018.
Monrabal et al., Macromol. Symp. 2007, 257, 71-79.
Office Action pertaining to U.S. Appl. No. 15/357,931 dated Apr. 16, 2018.
Supplementary Examination Report pertaining to Singapore Patent Application No. 11201503581P dated Sep. 18, 2017.

(56) References Cited

OTHER PUBLICATIONS

Thomas H. Mourey and Stephen T. Balke, Chromatography of Polymers, Chapter 12, pp. 180-198, (1992).
Yau, Wallace W., "Examples of Using 3D-GPC-TREF for Polyolefin Characterization", Macromol. Symp., 2007, 257, 29-45.
Zimm, Bruno H., Journal of Chemical Physics, vol. 16, 12, 1099-1116 (1948).
Office Action dated Jul. 12, 2019 pertaining to U.S. Appl. No. 15/763,937, filed Mar. 28, 2018, 28 pgs.
Office Action dated Oct. 25, 2019 pertaining to U.S. Appl. No. 15/763,937, filed Mar. 28, 2018, 5 pgs.
Notice of Allowance and Fee(s) Due dated Nov. 14, 2019 pertaining to U.S. Appl. No. 15/740,996, filed Dec. 29, 2017, 8 pgs.
Office Action pertaining to corresponding Thailand Patent Application Serial No. 1801001880 dated Oct. 10, 2018.
Office Action pertaining to corresponding Chinese Patent Application No. 201680037010.X, dated Dec. 24, 2019.
Office Action dated Apr. 27, 2020 pertaining to U.S. Appl. No. 15/740,710, filed Dec. 28, 2017, 55 pgs.

\* cited by examiner

PROCATALYST AND POLYMERIZATION PROCESS USING THE SAME

FIELD OF INVENTION

The disclosure relates to a procatalyst for the polymerization of ethylene and optionally one or more alpha-olefins (α-olefins) and a polymerization process using the same.

BACKGROUND OF THE INVENTION

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene is known for use in the manufacture of a wide variety of articles. The polyethylene polymerization process can be varied in a number of respects to produce a wide variety of resultant polyethylene resins having different physical properties that render the various resins suitable for use in different applications. It is generally known that polyethylene can be produced in one or more conventional reactors e.g. loop reactors, spherical reactors, isothermal reactors, fluidized bed gas phase reactors, stirred tank reactors, batch reactors, in parallel, series, and/or any combinations thereof. In solution phase reactors, the ethylene monomers and optionally one or more comonomers and catalyst system are present in a liquid diluent, such as an alkane or isoalkane, for example isobutane.

Despite the research efforts in developing catalyst systems suitable for polyolefin production, such as polyethylene and/or polypropylene polymerization, there is still a need for a procatalyst and a catalyst system exhibiting improved solubility in aliphatic hydrocarbons. Improved solubility would impart greater process flexibility.

SUMMARY OF THE INVENTION

The disclosure is for a procatalyst for the polymerization of ethylene and optionally one or more alpha-olefins and a polymerization process using an inventive procatalyst.

In one embodiment, the disclosure provides a procatalyst for the polymerization of ethylene and optionally one or more alpha-olefins having the structure shown in formula (I) below:

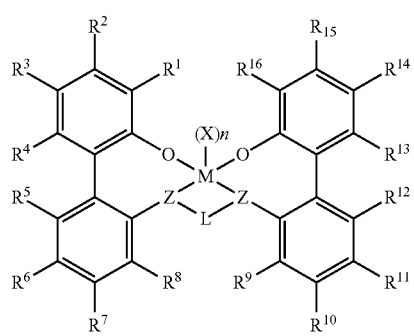

(I)

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl; and L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is selected from the group consisting of ($C_1$-$C_{40}$)hydrocarbyl, each $R^P$ is ($C_1$-$C_{40}$) hydrocarbyl; and each $R^N$ is ($C_1$-$C_{40}$)hydrocarbyl or absent; and $R^{1-16}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, OR$^C$, SR$^C$, NO$_2$, CN, CF$_3$, R$^C$S(O)—, R$^C$S(O)$_2$—, ($R^C$)$_2$C=N—, R$^C$C(O)O—, R$^C$OC(O)—, R$^C$C(O)N(R)—, ($R^C$)$_2$NC(O)—, halogen atom, hydrogen atom, and any combination thereof, with the proviso that at least one of the sites are substituted with an Si($Y_1$)($Y_2$)($Y_3$) group; $Y_1$ is a ($C_3$-$C_{40}$)hydrocarbyl or ($C_2$-$C_{40}$)heterohydrocarbyl; $Y_2$ is a ($C_1$-$C_{40}$)hydrocarbyl or ($C_1$-$C_{40}$)heterohydrocarbyl; $Y_3$ is a ($C_1$-$C_{40}$)hydrocarbyl or ($C_1$-$C_{40}$)heterohydrocarbyl, with the further proviso that $Y_1$, $Y_2$ and $Y_3$ are not all isopropyl groups; and each of the hydrocarbyl, heterohydrocarbyl, Si($R^C$)$_3$, Ge($R^C$)$_3$, P($R^1$)$_2$, N($R^N$)$_2$, OR$^C$, SR$^C$, R$^C$S(O)—, R$^C$S(O)$_2$—, ($R^C$)$_2$C=N—, R$^C$C(O)O—, R$^C$OC(O)—, R$^C$C(O)N(R)—, ($R^C$)$_2$NC(O)—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC (O)—, or two of the $R^S$ are taken together to form an unsubstituted ($C_1$-$C_{18}$)hydrocarbylene wherein each R independently is an unsubstituted ($C_1$-$C_{18}$)hydrocarbyl; and optionally two or more R groups of the $R^{1-16}$ groups (for example, from $R^{1-8}$, $R^{9-16}$) can combine together into ring structures with such ring structures having from 2 to 50 atoms in the ring excluding any hydrogen atoms.

In another embodiment, the disclosure provides a polymerization process for producing ethylene based polymers comprising polymerizing ethylene and optionally one or more α-olefins in the presence of a catalyst system in a reactor system having one or more reactors, wherein the catalyst system comprises one or more inventive procatalysts.

DETAILED DESCRIPTION OF THE INVENTION

The procatalyst for the polymerization of ethylene and optionally one or more alpha-olefins having the structure shown in formula (I) below:

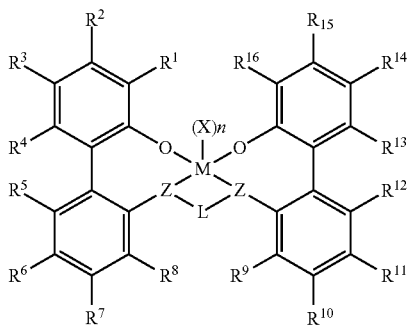

(I)

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl; and L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is ($C_1$-$C_{40}$)hydrocarbyl, each $R^P$ is ($C_1$-$C_{40}$)hydrocarbyl; and each $R^N$ is ($C_1$-$C_{40}$) hydrocarbyl or absent; and $R^{1-16}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen atom, hydrogen atom, and any combination thereof, with the proviso that at least one of the $R^1$-$R^{16}$ sites are substituted with an Si($Y_1$)($Y_2$)($Y_3$) group; $Y_1$ is a ($C_3$-$C_{40}$)hydrocarbyl or ($C_2$-$C_{40}$)heterohydrocarbyl; $Y_2$ is a ($C_1$-$C_{40}$)hydrocarbyl or ($C_1$-$C_{40}$)heterohydrocarbyl; $Y_3$ is a ($C_1$-$C_{40}$)hydrocarbyl or ($C_1$-$C_{40}$)heterohydrocarbyl, and with the further proviso that $Y_1$, $Y_2$ and $Y_3$ are not all isopropyl groups; and each of the hydrocarbyl, heterohydrocarbyl, Si($R^C$)$_3$, Ge($R^C$)$_3$, P($R^P$)$_2$, N($R^N$)$_2$, O$R^C$, S$R^C$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)2NC(O)—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC (O)—, or two of the $R^S$ are taken together to form an unsubstituted ($C_1$-$C_{18}$)hydrocarbylene wherein each R independently is an unsubstituted ($C_1$-$C_{18}$)hydrocarbyl; and optionally two or more R groups of the $R^{1-16}$ groups (for example, from $R^{1-8}$, $R^{9-16}$) can combine together into ring structures with such ring structures having from 2 to 50 atoms in the ring excluding any hydrogen atoms.

As used herein, the term "($C_x$-$C_y$)hydrocarbyl" means a hydrocarbon radical of from x to y carbon atoms and the term "($C_x$-$C_y$)hydrocarbylene" means a hydrocarbon diradical of from x to y carbon atoms and the term "($C_x$-$C_y$)alkyl" means an alkyl group of from x to y carbon atoms.

As used herein, the term "($C_1$-$C_{40}$)hydrocarbyl" means a hydrocarbon radical of from 1 to 40 carbon atoms and the term "($C_2$-$C_{40}$)hydrocarbylene" means a hydrocarbon diradical of from 2 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

$R^C$ is selected from the group consisting of ($C_1$-$C_{40}$) hydrocarbyl. As used herein, the $R^C$ includes the situation wherein two $R^C$ groups are joined together to form a diradical ring in and wherein the Si is within the ring.

Preferably, a ($C_1$-$C_{40}$)hydrocarbyl independently is an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. More preferably, each of the aforementioned ($C_1$-$C_{40}$)hydrocarbyl groups independently has a maximum of 20 carbon atoms (i.e., ($C_1$-$C_{20}$)hydrocarbyl), and still more preferably a maximum of 12 carbon atoms.

The terms "($C_1$-$C_{40}$)alkyl" and "($C_1$-$C_{18}$)alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and ($C_{45}$)alkyl. The ($C_{45}$)alkyl is, for example, a ($C_{27}$-$C_{40}$)alkyl substituted by one $R^S$, which is a ($C_{18}$-$C_5$)alkyl, respectively. Preferably, each ($C_1$-$C_5$)alkyl independently is methyl, trifluoromethyl, ethyl, 1-propyl, 1-methylethyl, or 1,1-dimethylethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl; unsubstituted ($C_6$-$C_{18}$)aryl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl are substituted ($C_6$-$C_{20}$)aryl; substituted ($C_6$-$C_{18}$)aryl; 2,4-bis

[($C_{20}$)alkyl]-phenyl; polyfluorophenyl; pentafluorophenyl; 2-($C_1$-$C_5$)alkyl-phenyl; and 2,4-bis($C_1$-$C_5$)alkyl-phenyl; and fluoren-9-one-1-yl.

The term "($C_3$-$C_{40}$)cycloalkyl" means a saturated cyclic hydrocarbon radical of from 3 to 40 carbon atoms that is unsubstituted or substituted by one or more $R^S$. Other cycloalkyl groups (e.g., ($C_3$-$C_{12}$)cycloalkyl)) are defined in an analogous manner. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene are unsubstituted or substituted ($C_6$-$C_{40}$)arylene, ($C_3$-$C_{40}$)cycloalkylene, and ($C_1$-$C_{40}$)alkylene (e.g., ($C_1$-$C_{20}$)alkylene). In some embodiments, the diradicals are on a same carbon atom (e.g., —$CH_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of ($C_6$-$C_{18}$)arylene, ($C_3$-$C_{20}$)cycloalkylene, or ($C_2$-$C_{20}$)alkylene.

The term "($C_1$-$C_{40}$)alkylene" means a saturated straight chain or branched chain diradical (i.e., the radicals are not on ring atoms) of from 1 to 40 carbon atoms that is unsubstituted or substituted by one or more $R^S$. Examples of unsubstituted ($C_1$-$C_{40}$)alkylene are unsubstituted ($C_1$-$C_{20}$)alkylene, including unsubstituted 1,2-($C_2$-$C_{10}$)alkylene; 1,3-($C_3$-$C_{10}$)alkylene; 1,4-($C_4$-$C_{10}$)alkylene; —$CH_2$—, —$CH_2CH_2$—, —$(CH_2)_3$—, —$CH_2CHCH_3$, —$(CH_2)_4$—, —$(CH_2)_5$—, —$(CH_2)_6$—, —$(CH_2)_7$—, —$(CH_2)_8$—, and —$(CH_2)_4C(H)(CH_3)$—. Examples of substituted ($C_1$-$C_{40}$)alkylene are substituted ($C_1$-$C_{20}$)alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a ($C_1$-$C_{18}$)hydrocarbylene, examples of substituted ($C_1$-$C_{40}$)alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "($C_3$-$C_{40}$)cycloalkylene" means a cyclic diradical (i.e., the radicals are on ring atoms) of from 3 to 40 carbon atoms that is unsubstituted or substituted by one or more $R^S$. Examples of unsubstituted ($C_3$-$C_{40}$)cycloalkylene are 1,3-cyclopropylene, 1,1-cyclopropylene, and 1,2-cyclohexylene. Examples of substituted ($C_3$-$C_{40}$)cycloalkylene are 2-oxo-1,3-cyclopropylene and 1,2-dimethyl-1,2-cyclohexylene.

The term "($C_1$-$C_{40}$)heterohydrocarbyl" means a heterohydrocarbon radical of from 1 to 40 carbon atoms and the term "($C_1$-$C_{40}$)heterohydrocarbylene" means a heterohydrocarbon diradical of from 1 to 40 carbon atoms, and each heterohydrocarbon independently has one or more heteroatoms O; S; S(O); S(O)$_2$; Si($R^C$)$_2$; Ge($R^C$)$_2$; P($R^P$); and N($R^N$), wherein independently each $R^C$ is unsubstituted ($C_1$-$C_{40}$)hydrocarbyl, each $R^P$ is unsubstituted ($C_1$-$C_{40}$)hydrocarbyl; and each $R^N$ is unsubstituted ($C_1$-$C_{40}$)hydrocarbyl or absent (e.g., absent when N comprises —N= or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each ($C_1$-$C_{40}$)heterohydrocarbyl and ($C_1$-$C_{40}$)heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the ($C_1$-$C_{40}$)heterohydrocarbyl independently is unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-S(O)$_2$—, ($C_1$-$C_{40}$)hydrocarbyl-Si($R^C$)$_2$—, ($C_1$-$C_{40}$)hydrocarbyl-Ge($R^C$)$_2$—, ($C_1$-$C_{40}$)hydrocarbyl-N($R^N$)—, ($C_1$-$C_{40}$)hydrocarbyl-P($R^P$)—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_9$)heteroalkylene, or ($C_1$-$C_{19}$)heteroaryl-($C_1$-$C_{20}$)heteroalkylene. The term "($C_1$-$C_{40}$)heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., ($C_4$-$C_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

In some embodiments the ($C_1$-$C_{40}$)heteroaryl is 2,7-disubstituted carbazolyl or 3,6-disubstituted carbazolyl or unsubstituted carbazoles, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing ($C_1$-$C_{40}$) carbon atoms, or fewer carbon atoms as the case may be, and one or more of the heteroatoms $Si(R^C)_2$, $Ge(R^C)_2$, $P(R^1)$, $N(R^N)$, N, O, S, S(O), and $S(O)_2$ as defined above, wherein each of the heteroalkyl and heteroalkylene groups independently are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The disclosure further provides a procatalyst in accordance with any embodiment disclosed herein except that $Y_1$ of the $Si(Y_1)(Y_2)(Y_3)$ group is a ($C_8$-$C_{10}$)hydrocarbyl or ($C_8$-$C_{10}$)heterohydrocarbyl.

The disclosure provides that $Y_2$ of the $Si(Y_1)(Y_2)(Y_3)$ group is a ($C_1$-$C_{40}$)hydrocarbyl or ($C_1$-$C_{40}$)heterohydrocarbyl. All individual values and subranges from $C_1$ to $C_{40}$ are included and disclosed herein. For example, $Y_2$ may be a hydrocarbyl or heterohydrocarbyl having from 1 to 40 carbon atoms, or in the alternative, from 1 to 20 carbon atoms, or in the alternative, from 20 to 40 carbon atoms, or in the alternative, from 1 to 10 carbon atoms, or in the alternative, from 1 to 3 carbon atoms, or in the alternative, from 1 to 5 carbon atoms, or in the alternative, from 5 to 10 carbon atoms.

The disclosure provides that $Y_3$ of the $Si(Y_1)(Y_2)(Y_3)$ group is a ($C_1$-$C_{40}$)hydrocarbyl or ($C_1$-$C_{40}$)heterohydrocarbyl. All individual values and subranges from $C_1$ to $C_{40}$ are included and disclosed herein. For example, $Y_3$ may be a hydrocarbyl or heterohydrocarbyl having from 1 to 40 carbon atoms, or in the alternative, from 1 to 20 carbon atoms, or in the alternative, from 20 to 40 carbon atoms, or in the alternative, from 1 to 10 carbon atoms, or in the alternative, from 1 to 3 carbon atoms, or in the alternative, from 1 to 5 carbon atoms, or in the alternative, from 5 to 10 carbon atoms.

The disclosure provides the procatalyst wherein $Y_1$, $Y_2$ and $Y_3$ are not all isopropyl groups. For example, $Y_1$ and $Y_3$ may contain isopropyl groups provided $Y_2$ does not contain an isopropyl group, or in the alternative, $Y_1$ and $Y_2$ may contain isopropyl groups provided $Y_3$ does not contain an isopropyl group, or in the alternative, $Y_2$ and $Y_3$ may contain isopropyl groups provided $Y_1$ does not contain an isopropyl group, or in the alternative, only one of $Y_1$, $Y_2$ and $Y_3$ may contain an isopropyl group.

The term "halogen atom" means fluorine atom (F), chlorine atom ($C_1$), bromine atom (Br), or iodine atom (I) radical. Preferably each halogen atom independently is the Br, F, or $C_1$ radical, and more preferably the F or $C_1$ radical. The term "halide" means fluoride ($F^-$), chloride ($Cl^-$), bromide ($Br^-$), or iodide ($I^-$) anion.

Unless otherwise indicated herein the term "heteroatom" means O, S, S(O), $S(O)_2$, $Si(R^C)_2$, $Ge(R^C)_2$, $P(R^P)$, or $N(R^N)$, wherein independently each $R^C$ is unsubstituted ($C_1$-$C_{40}$)hydrocarbyl, each $R^P$ is unsubstituted ($C_1$-$C_{40}$)hydrocarbyl; and each $R^N$ is unsubstituted ($C_1$-$C_{40}$)hydrocarbyl or absent (absent when N comprises —N=). Preferably, there are no O—O, S—S, or O—S bonds, other than O—S bonds in an S(O) or $S(O)_2$ diradical functional group, in the metal-ligand complex of formula (I). More preferably, there are no O—O, N—N, P—P, N—P, S—S, or O—S bonds, other than O—S bonds in an S(O) or $S(O)_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double or triple bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds or triple bonds, not including any such double bonds that may be present in substituents $R^S$, if any, or in (hetero)aromatic rings, if any.

M is titanium, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, sulfate, $HC(O)O^-$, ($C_1$-$C_{40}$)hydrocarbyl$C(O)O^-$, $HC(O)N(H)^-$, ($C_1$-$C_{40}$)hydrocarbyl$C(O)N(H)^-$, ($C_1$-$C_{40}$)hydrocarbyl$C(O)N(($C_1$-$C_{20}$)hydrocarbyl)^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{40}$)heterohydrocarbylene and $R^M$ is as defined above.

In some embodiments at least one monodentate ligand of X independently is the neutral ligand. In one embodiment, the neutral ligand is a neutral Lewis base group that is $R^X NR^K R^L$, $R^K OR^L$, $R^K SR^L$, or $R^X PR^K R^L$, wherein each $R^x$ independently is hydrogen, ($C_1$-$C_{40}$)hydrocarbyl, [($C_1$-$C_{10}$)hydrocarbyl]$_3$Si, [($C_1$-$C_{10}$)hydrocarbyl]$_3$ Si($C_1$-$C_{10}$)hydrocarbyl, or ($C_1$-$C_{40}$)heterohydrocarbyl and each $R^K$ and $R^L$ independently is as defined above.

In some embodiments, each X is a monodentate ligand that independently is a halogen atom, unsubstituted ($C_1$-$C_{20}$) hydrocarbyl, unsubstituted ($C_1$-$C_{20}$)hydrocarbylC(O)O—, or $R^K R^L N$— wherein each of $R^K$ and $R^L$ independently is an unsubstituted ($C_1$-$C_{20}$)hydrocarbyl. In some embodiments each monodentate ligand X is a chlorine atom, ($C_1$-$C_{10}$) hydrocarbyl (e.g., ($C_1$-$C_6$)alkyl or benzyl), unsubstituted ($C_1$-$C_{10}$)hydrocarbylC(O)O—, or $R^K R^L N$— wherein each of $R^K$ and $R^L$ independently is an unsubstituted ($C_1$-$C_{10}$) hydrocarbyl.

In some embodiments there are at least two X and the two X are taken together to form the bidentate ligand. In some embodiments the bidentate ligand is a neutral bidentate ligand. In one embodiment, the neutral bidentate ligand is a diene of formula $(R^D)_2C=C(R^D)-C(R^D)=C(R^D)_2$, wherein each $R^D$ independently is H, unsubstituted ($C_1$-$C_6$) alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E$—C(O⁻)=CH—C(=O)—$R^E$ (D), wherein each $R^E$ independently is H, unsubstituted ($C_1$-$C_6$) alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., ⁻O₂CC(O)O⁻), ($C_2$-$C_{40}$)hydrocarbylene dicarbanion, ($C_1$-$C_{40}$)heterohydrocarbylene dicarbanion, phosphate, or sulfate.

As previously mentioned, number and charge (neutral, monoanionic, dianionic) of X are selected depending on the formal oxidation state of M such that the metal-ligand complex of formula (I) is, overall, neutral.

In some embodiments each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In some embodiments at least two X are different. In some embodiments n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 and two X are taken together to form a bidentate ligand. In some embodiments, the bidentate ligand is 2,2-dimethyl-2-silapropane-1,3-diyl or 1,3-butadiene.

Each Z independently is O, S, N($C_1$-$C_{40}$)hydrocarbyl, or P($C_1$-$C_{40}$)hydrocarbyl. In some embodiments, each Z is different. In some embodiments one Z is O and one Z is NCH₃. In some embodiments, one Z is O and one Z is S. In some embodiments, one Z is S and one Z is N($C_1$-$C_{40}$)hydrocarbyl (e.g., NCH₃). In some embodiments, each Z is the same. In some embodiments each Z is O. In some embodiments, each Z is S. In some embodiments each Z is N($C_1$-$C_{40}$)hydrocarbyl (e.g., NCH₃). In some embodiments, at least one, and in some embodiments, each Z is P($C_1$-$C_{40}$) hydrocarbyl (e.g., PCH₃).

L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the from 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)₂, Si($R^C$)₂, Ge($R^C$)₂, P($R^P$), or N($R^N$), wherein independently each $R^C$ is ($C_1$-$C_{40}$)hydrocarbyl, each $R^P$ is ($C_1$-$C_{40}$)hydrocarbyl; and each $R^N$ is ($C_1$-$C_{40}$) hydrocarbyl or absent. For example, when L has three atoms, at least two of the atoms are carbon atoms and one atom is O or S.

In some embodiments, L is the ($C_2$-$C_{40}$)hydrocarbylene. Preferably the aforementioned portion that comprises a 2-carbon atom to 10-carbon atom linker backbone of the ($C_2$-$C_{40}$)hydrocarbylene of L comprises a 2-carbon atom to 10-carbon atom, and more preferably a 2-carbon atom or 4-carbon atom linker backbone linking the Z atoms in formula (I) to which L is bonded. In some embodiments L comprises a 3-carbon atom linker backbone (e.g., L is —CH₂CH₂CH₂—; —CH(CH₃)CH₂CH(CH₃)—; —CH(CH₃)CH(CH₃)CH(CH₃)—; —CH₂C(CH₃)₂CH₂—); 1,3-cyclopentane-diyl; or 1,3-cyclohexane-diyl. In some embodiments, L comprises a 4-carbon atom linker backbone (e.g., L is —CH₂CH₂CH₂CH₂—; —CH₂C(CH₃)₂C(CH₃)₂ CH₂—; 1,2-bis(methylene)cyclohexane; or 2,3-bis(methylene)-bicyclo[2.2.2]octane). In some embodiments, L comprises a 5-carbon atom linker backbone (e.g., L is —CH₂CH₂CH₂CH₂CH₂— or 1,3-bis(methylene)cyclohexane). In some embodiments, L comprises a 6-carbon atom linker backbone (e.g., L is —CH₂CH₂CH₂CH₂CH₂CH₂— or 1,2-bis(ethylene)cyclohexane).

In some embodiments, L is a ($C_2$-$C_{40}$)hydrocarbylene and the ($C_2$-$C_{40}$)hydrocarbylene of L is a ($C_2$-$C_{12}$)hydrocarbylene, and more preferably ($C_2$-$C_8$)hydrocarbylene. In some embodiments, the ($C_2$-$C_{40}$)hydrocarbylene is an unsubstituted ($C_2$-$C_{40}$)alkylene. In some embodiments, the ($C_2$-$C_{40}$) hydrocarbylene is a substituted ($C_2$-$C_{40}$)alkylene. In some embodiments the ($C_2$-$C_{40}$)hydrocarbylene is an unsubstituted ($C_2$-$C_{40}$)cycloalkylene or substituted ($C_2$-$C_{40}$)cycloalkylene, wherein each substituent independently is $R^S$, wherein preferably the $R^S$ independently is ($C_1$-$C_4$)alkyl.

In some embodiments L is an unsubstituted ($C_2$-$C_{40}$) alkylene, and in some other embodiments, L is an acyclic unsubstituted ($C_2$-$C_{40}$)alkylene, and still more preferably the acyclic unsubstituted ($C_2$-$C_{40}$)alkylene is, —CH₂CH₂CH₂—, cis —CH(CH₃)CH₂CH(CH₃)—, trans —CH(CH₃)CH₂CH(CH₃)—, —CH(CH₃)CH₂CH(CH₃)₂—, —CH(CH₃)CH(CH₃)CH(CH₃)—, —CH₂C(CH₃)₂CH₂—, —CH₂CH₂CH₂CH₂—, or —CH₂C(CH₃)₂C(CH₃)₂CH₂—. In some embodiments, L is trans-1,2-bis(methylene)cyclopentane, cis-1,2-bis(methylene)cyclopentane, trans-1,2-bis(methylene)cyclohexane, or cis-1,2-bis(methylene)cyclohexane. In some embodiments the ($C_1$-$C_{40}$)alkylene-substituted ($C_2$-$C_{40}$)alkylene is exo-2,3-bis(methylene)bicyclo [2.2.2]octane or exo-2,3-bis(methylene)-7,7-dimethyl-bicyclo[2.2.1]heptane. In some embodiments L is the unsubstituted ($C_2$-$C_{40}$)cycloalkylene, and in some other embodiments, L is cis-1,3-cyclopentane-diyl or cis-1,3-cyclohexane-diyl. In some embodiments, L is the substituted ($C_2$-$C_{40}$)cycloalkylene, and more preferably L is a ($C_1$-$C_{40}$) alkylene-substituted ($C_2$-$C_{40}$)cycloalkylene, and in some other embodiments, L is the ($C_1$-$C_{40}$)alkylene-substituted ($C_2$-$C_{40}$)cycloalkylene that is exo-bicyclo[2.2.2]octan-2,3-diyl.

In some embodiments L is a ($C_2$-$C_{40}$)heterohydrocarbylene. In some embodiments, the aforementioned portion that comprises a 3-atom to 6-atom linker backbone of the ($C_2$-$C_{40}$)heterohydrocarbylene of L comprises a from 3-atom to 5-atom, and in some other embodiments a 3-atom or 4-atom linker backbone linking the Z atoms in formula (I) to which L is bonded. In some embodiments, L comprises a 3-atom linker backbone (e.g., L is —CH₂CH₂CH(OCH₃)—, —CH₂Si(CH₃)₂CH₂—, or —CH₂Ge(CH₃)₂CH₂—). The "—CH₂Si(CH₃)₂CH₂—" may be referred to herein as a 1,3-diradical of 2,2-dimethyl-2-silapropane. In some embodiments, L comprises a 4-atom linker backbone (e.g., L is —CH₂CH₂OCH₂— or —CH₂P(CH₃)CH₂CH₂—). In some embodiments, L comprises a 5-atom linker backbone (e.g., L is —CH₂CH₂OCH₂CH₂— or —CH₂CH₂N(CH₃) CH₂CH₂—). In some embodiments, L comprises a 6-atom linker backbone (e.g., L is —CH₂CH₂C(OCH₃)₂ CH₂CH₂CH₂—, —CH₂CH₂CH₂S(O)₂CH₂CH₂—, or —CH₂CH₂S(O)CH₂CH₂CH₂—).

In some embodiments, each of the from 3 to 6 atoms of a 3-atom to 6-atom linker backbone is a carbon atom. In some embodiments, at least one heteroatom is Si($R^C$)₂. In some embodiments, at least one heteroatom is O. In some embodiments, at least one heteroatom is the N($R^N$). In some embodiments, there are no O—O, S—S, or O—S bonds, other than O—S bonds in the S(O) or S(O)₂ diradical functional group, in —Z-L-Z—. In some other embodiments, there are no O—O, N—N, P—P, N—P, S—S, or O—S bonds, other than O—S bonds in an S(O) or S(O)₂ diradical functional group, in —Z-L-Z—.

In some embodiments, the $(C_2-C_{40})$heterohydrocarbylene is $(C_2-C_{10})$heterohydrocarbylene, and in some other embodiments $(C_2-C_8)$heterohydrocarbylene. In some embodiments, the $(C_2-C_8)$heterohydrocarbylene of L is —CH₂Si(CH₃)₂CH₂—; —CH₂CH₂Si(CH₃)₂CH₂—; or CH₂Si(CH₃)₂CH₂CH₂—. In some embodiments, the $(C_2-C_8)$heterohydrocarbylene of L is —CH₂Si(CH₃)₂CH₂—, —CH₂Si(CH₂CH₃)₂CH₂—, —CH₂Si(isopropyl)₂CH₂—, —CH₂Si(tetramethylene)CH₂—, or —CH₂Si(pentamethylene)CH₂—. The —CH₂Si(tetramethylene)CH₂— is named 1-silacyclopentan-1,1-dimethylene. The —CH₂Si(pentamethylene)CH₂— is named 1-silacyclohexan-1,1-dimethylene.

The disclosure further provides a polymerization process for producing ethylene based polymers comprising polymerizing ethylene and optionally one or more α-olefins in the presence of a catalyst system in a reactor system having one or more reactors, wherein the catalyst system comprises a procatalyst in accordance with any embodiment disclosed herein.

In some embodiments the metal-ligand complex of formula (I) is a metal-ligand complex of any one of the following formulas:

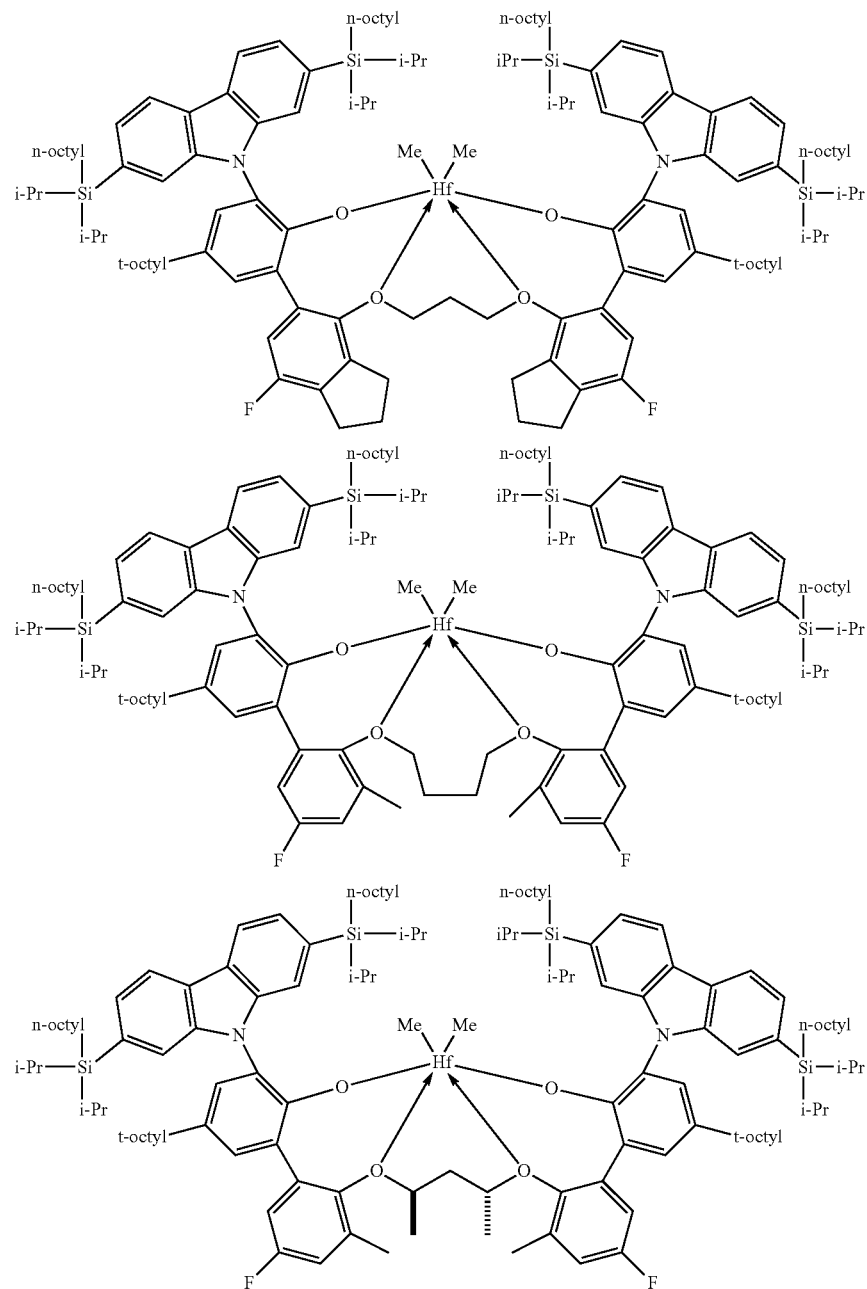

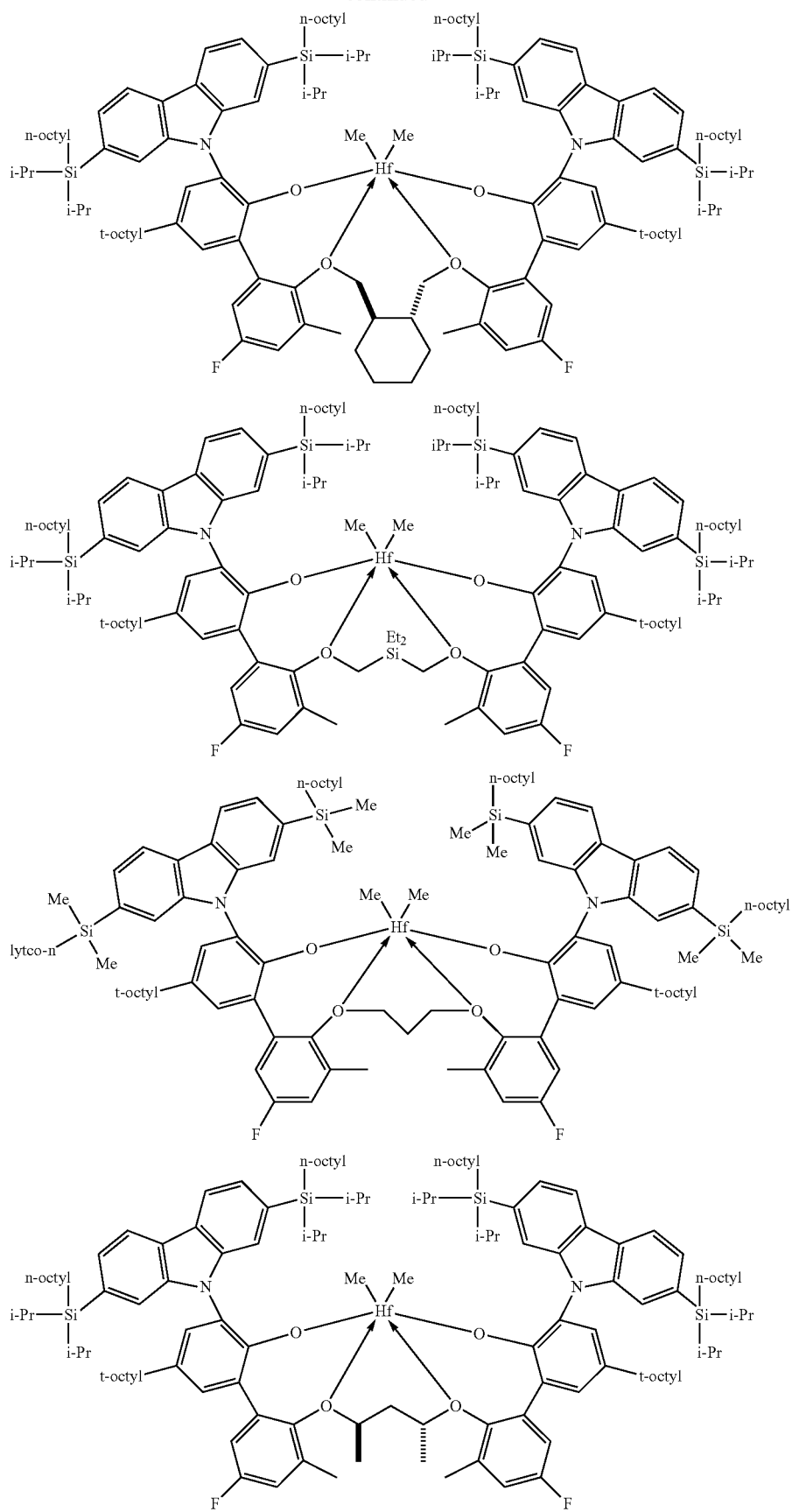

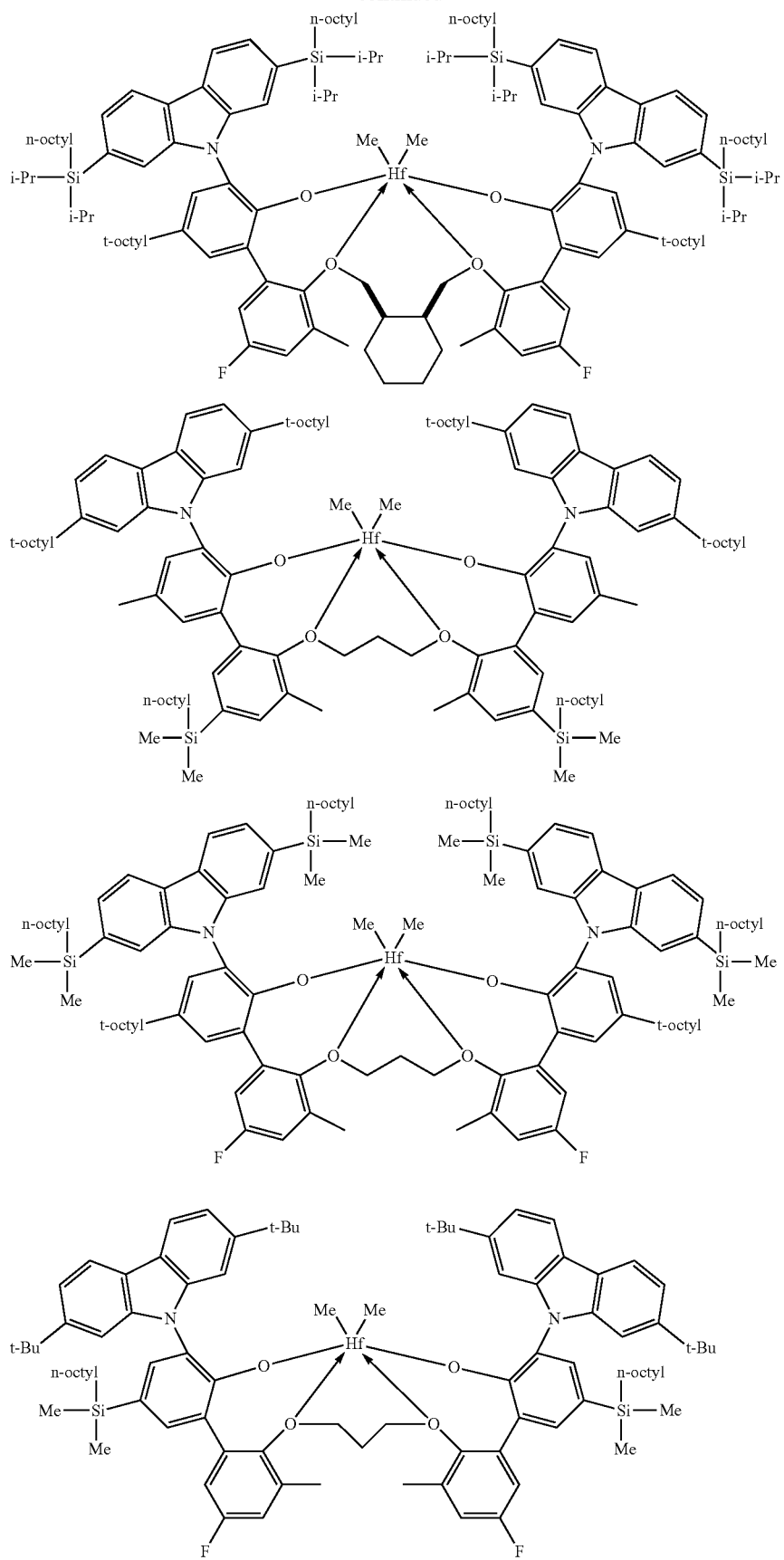

-continued
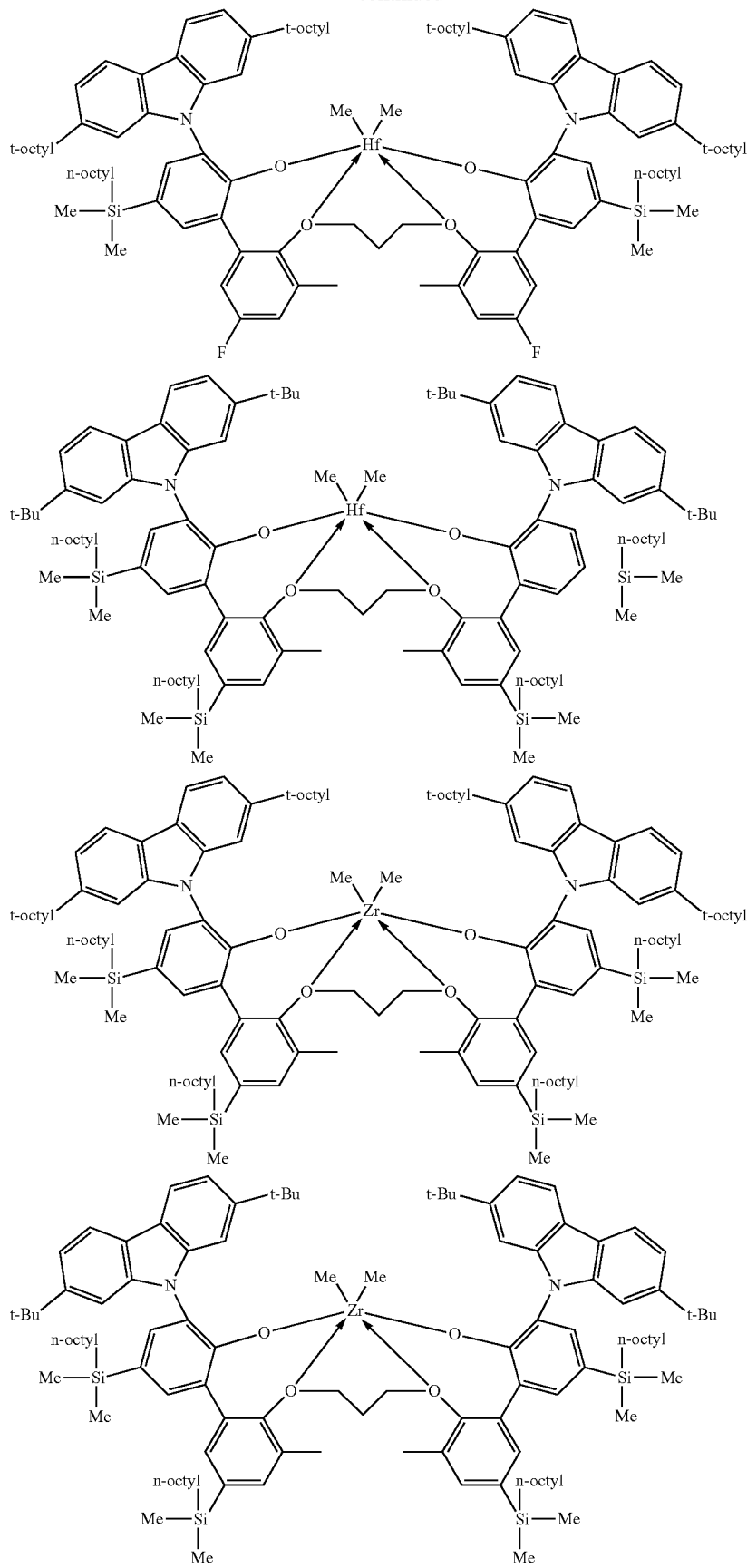

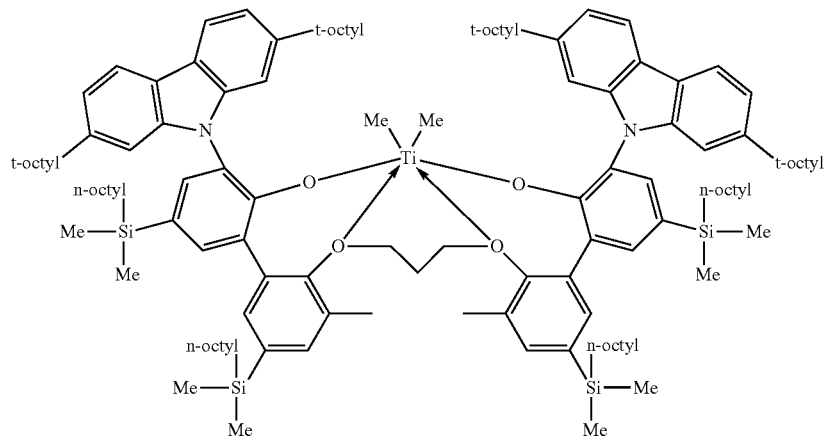
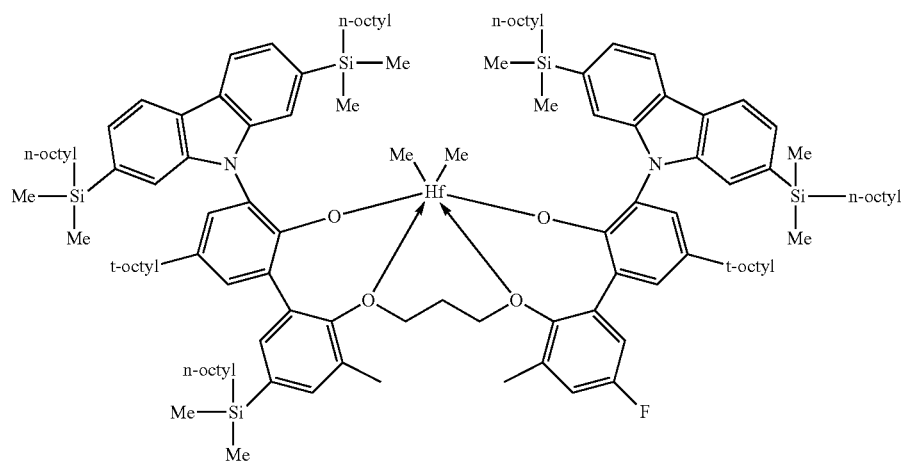
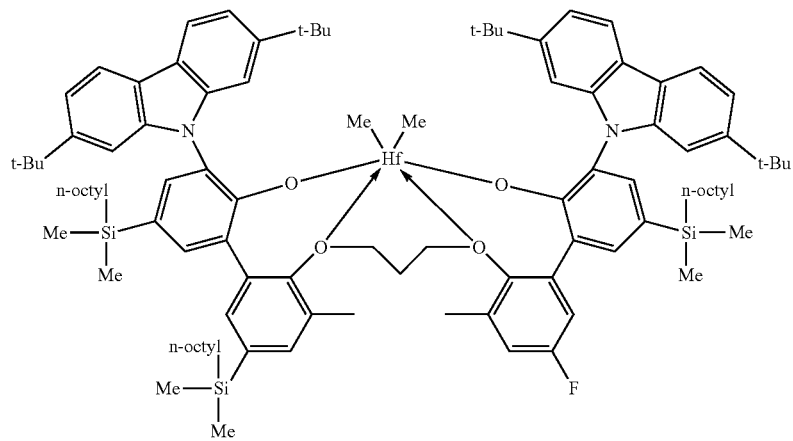

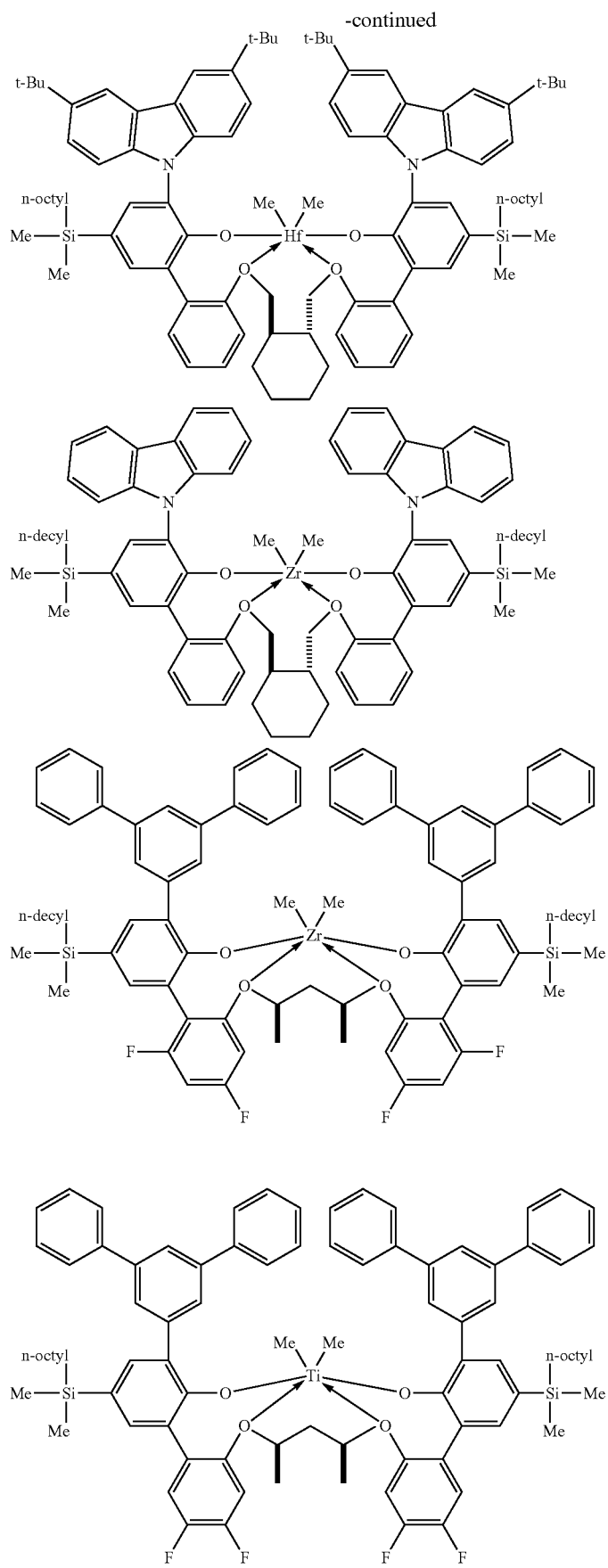

-continued
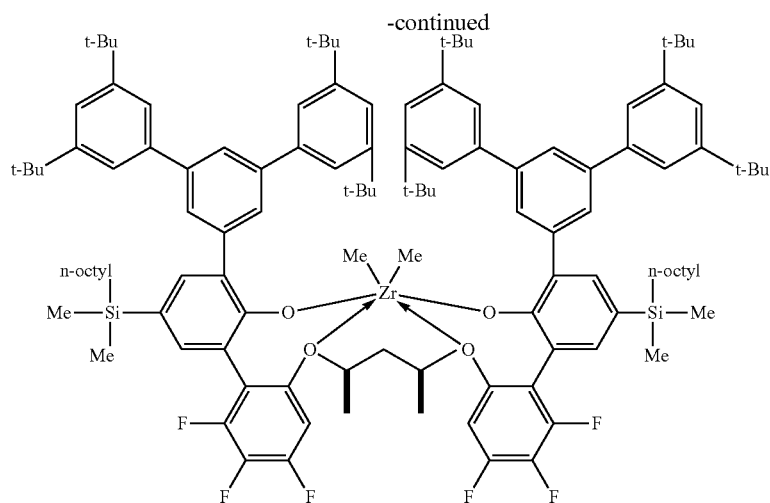
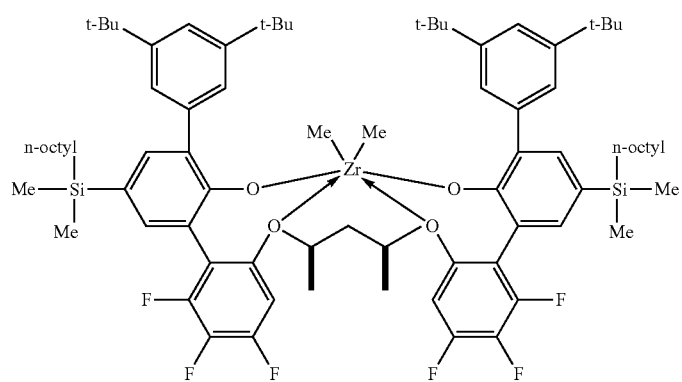
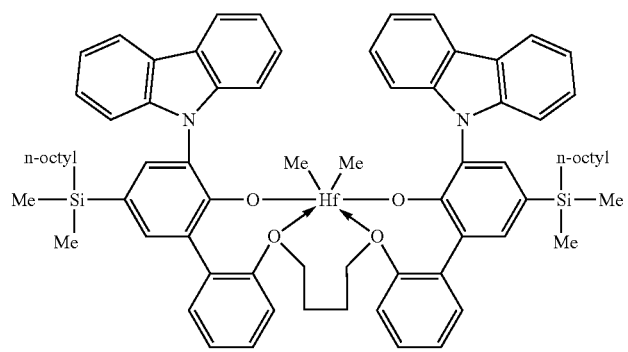
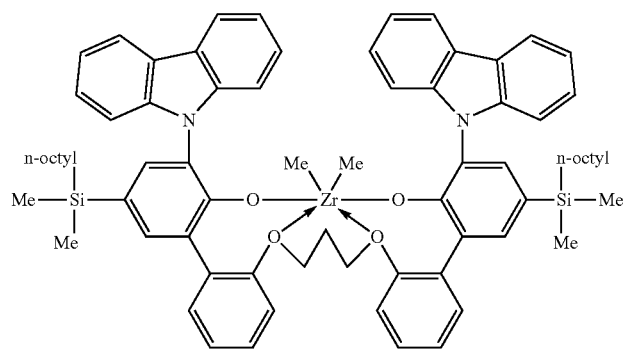

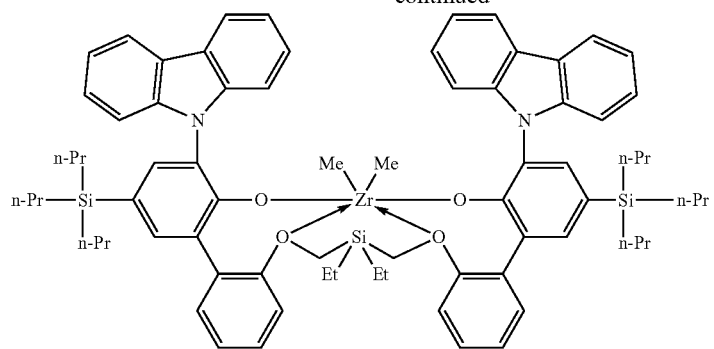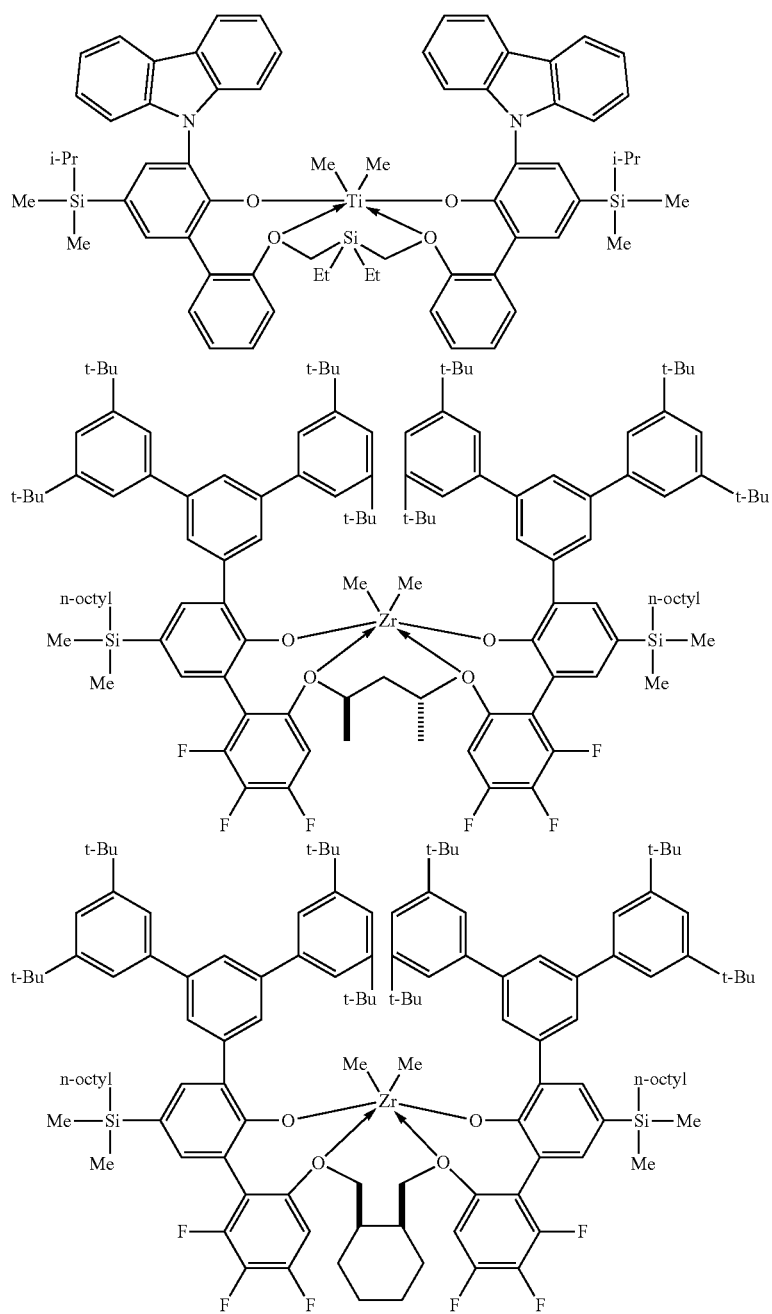

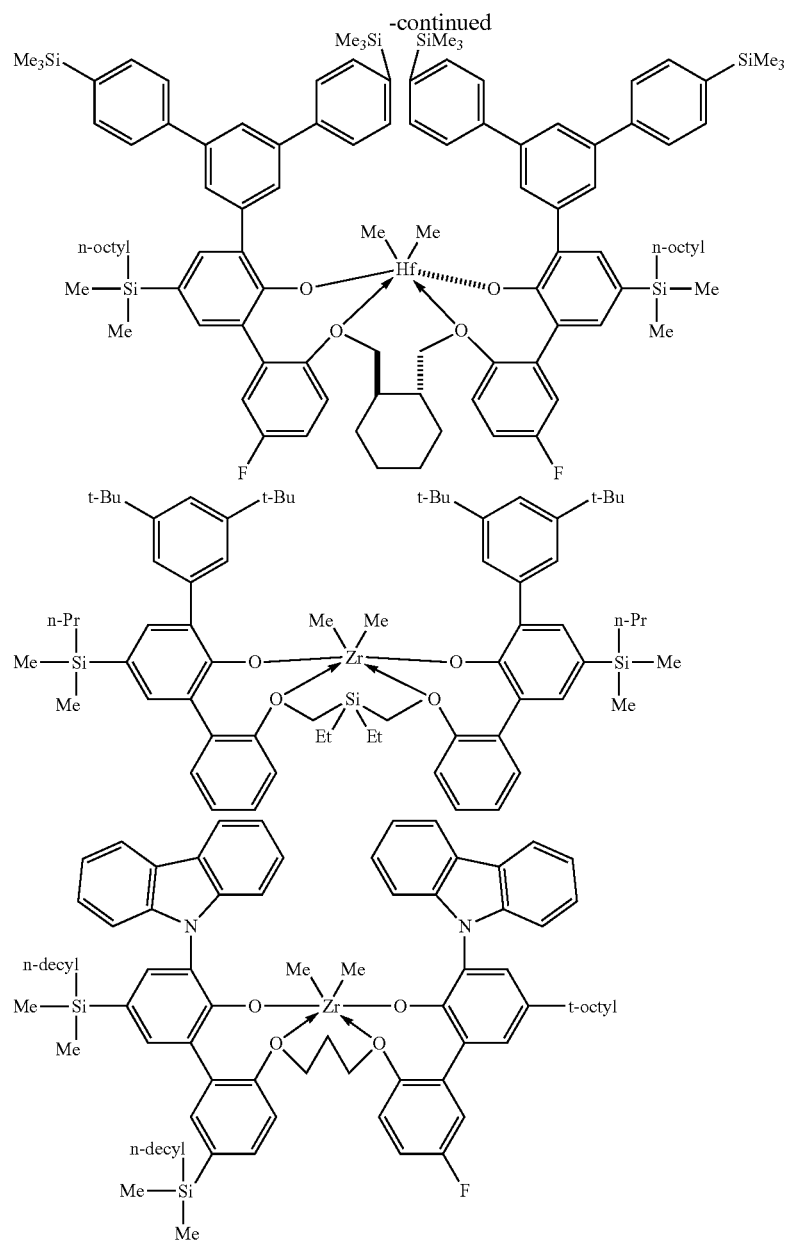
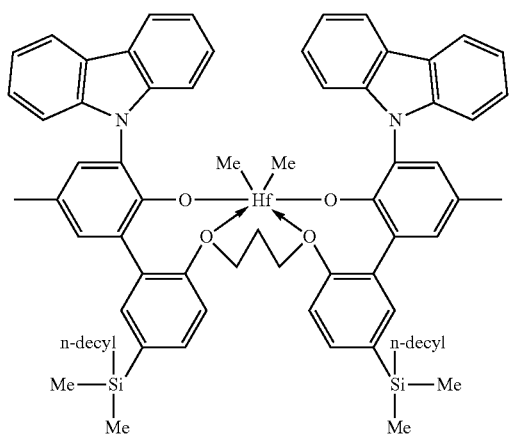

In another embodiment, the disclosure provides the procatalyst or polymerization process in accordance with any embodiment described herein except that the procatalyst has the following structure:

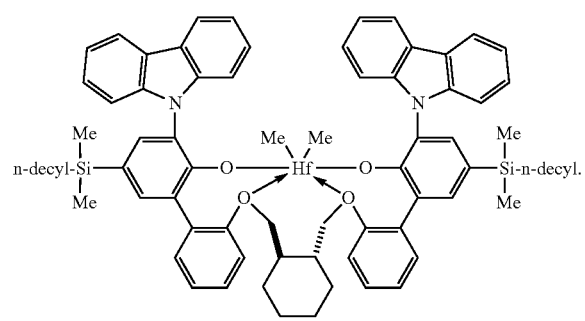

I1

In another embodiment, the disclosure provides the procatalyst or polymerization process in accordance with any embodiment described herein except that the procatalyst has the following structure:

I2

In another embodiment, the disclosure provides the procatalyst or polymerization process in accordance with any embodiment described herein except that the procatalyst has the following structure:

I3

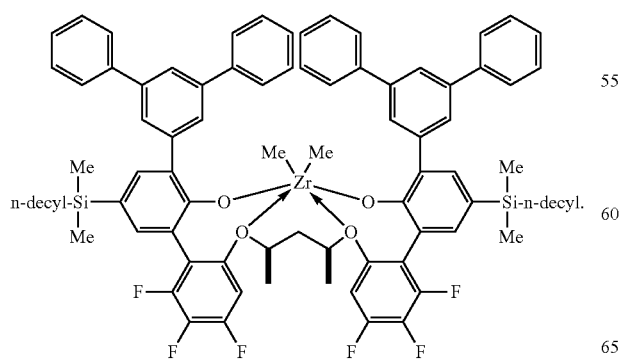

In another embodiment, the disclosure provides the procatalyst or polymerization process in accordance with any embodiment described herein except that the procatalyst has the following structure:

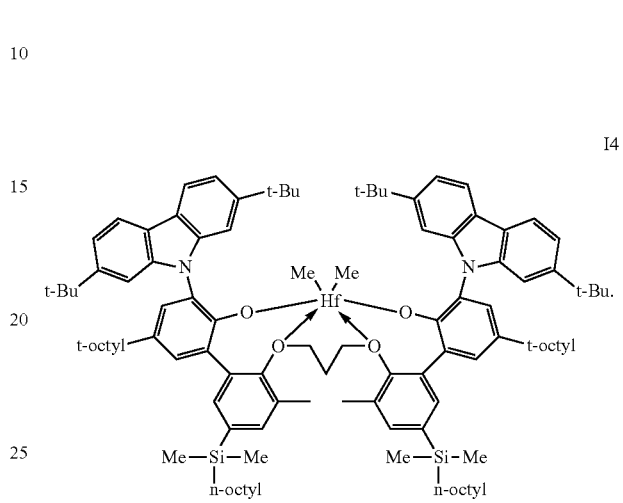

I4

In another embodiment, the disclosure provides the procatalyst or polymerization process in accordance with any embodiment described herein except that the procatalyst has the following structure:

I5

In another embodiment, the disclosure provides the procatalyst or polymerization process in accordance with any embodiment described herein except that the procatalyst has the following structure:

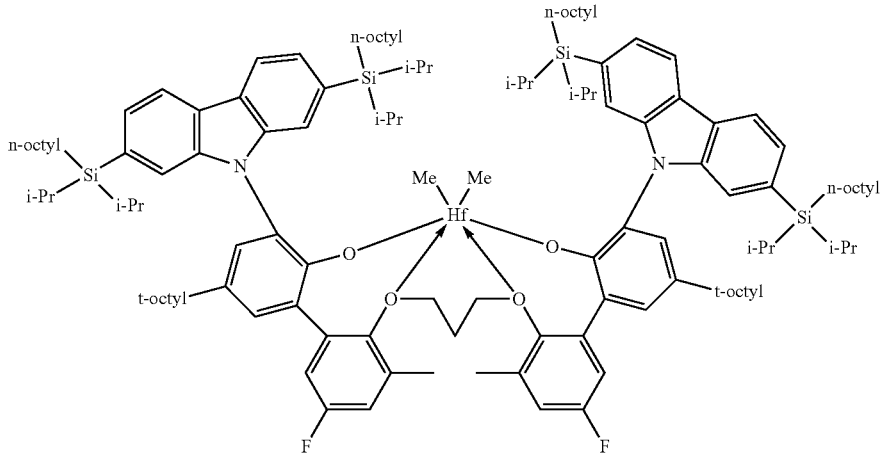

16

In another embodiment, the disclosure provides the procatalyst or polymerization process in accordance with any embodiment described herein except that the procatalyst has the following structure:

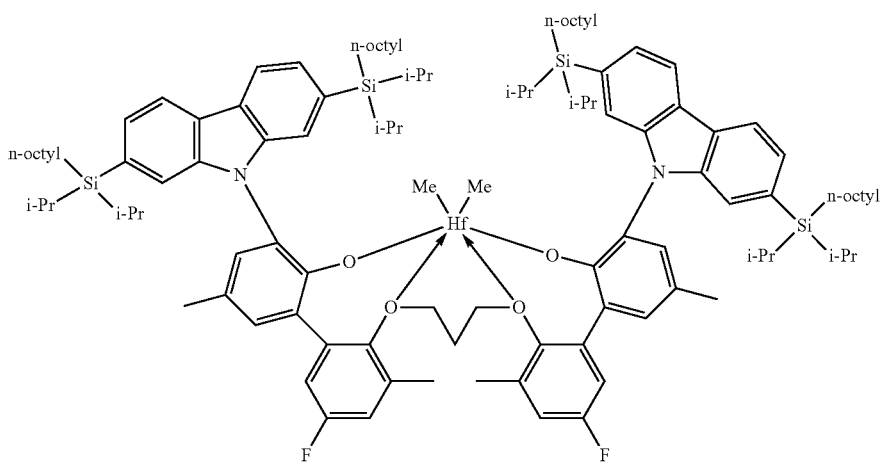

17

In another embodiment, the disclosure provides the procatalyst or polymerization process in accordance with any embodiment described herein except that the procatalyst exhibits a solubility in aliphatic hydrocarbons of equal to or greater than 0.8 wt %. All individual values and subranges from equal to or greater than 0.8 wt % are included and disclosed herein; for example, the procatalyst may exhibit a solubility in aliphatic hydrocarbons of equal to or greater than 0.8 wt %, or in the alternative, equal to or greater than 0.9 wt %, or in the alternative, equal to or greater than 1.0 wt %, or in the alternative, equal to or greater than 1.1 wt %. In an alternative embodiment, the disclosure provides the procatalyst or polymerization process in accordance with any embodiment described herein except that the procatalyst exhibits a solubility in aliphatic hydrocarbons of equal to or less than 90 wt %. All individual values and subranges from equal to or less than 90 wt % is included and disclosed herein; for example, the procatalyst may exhibit a solubility in aliphatic hydrocarbons of equal to or less than 90 wt %, or in the alternative, equal to or less than 70 wt %, or in the alternative, equal to or less than 50 wt %, or in the alternative, equal to or less than 30 wt %, or in the alternative, equal to or less than 20 wt %. In particular embodiments, the disclosure provides the procatalyst or polymerization process in accordance with any embodiment described herein except that the procatalyst exhibits a solubility in aliphatic hydrocarbons from 0.8 to 20 wt %, or in the alternative, from 0.8 to 20 wt %, or in the alternative, from 5 to 15 wt %, or in the alternative, from 1 to 18 wt %, or in the alternative, from 3 to 10 wt %.

In another embodiment, the disclosure provides the procatalyst or polymerization process in accordance with any embodiment described herein except that a ratio of a solubility in an aliphatic hydrocarbon of the procatalyst to the solubility in the aliphatic hydrocarbon of a comparative procatalyst having the same structure of the procatalyst except not having any $Si(Y_1)(Y_2)(Y_3)$ groups is at least 3. All individual values and subranges from at least 3 are included and disclosed herein; for example, the solubility ratio may be at least 3, or in the alternative, at least 4, or in the alternative, at least 5, or in the alternative, at least 7, or in the alternative, at least 8. In a particular embodiment, the disclosure provides the procatalyst or polymerization process in accordance with any embodiment described herein except that a ratio of a solubility in an aliphatic hydrocarbon of the procatalyst to the solubility in the aliphatic hydrocarbon of a comparative procatalyst having the same structure of the procatalyst except not having any $Si(Y_1)(Y_2)(Y_3)$ groups is equal to or less than 100. All individual values and subranges from equal to or less than 100 are included and disclosed herein. For example, the ratio of a solubility in an aliphatic hydrocarbon of the procatalyst to the solubility in the aliphatic hydrocarbon of a comparative procatalyst having the same structure of the procatalyst except not having any $Si(Y_1)(Y_2)(Y_3)$ groups is equal to or less than 100, or in the alternative, equal to or less than 75, or in the alternative, equal to or less than 50, or in the alternative, equal to or less than 25.

As used herein, the term aliphatic hydrocarbon means any linear or branched alkane having from 1 to 50 carbon atoms, including for example, propane, pentane, hexane, heptane, mixtures thereof and combinations thereof. Exemplary aliphatic hydrocarbon solvents are commercially available from ExxonMobil Chemical Company under the tradename ISOPAR.

Process for Producing Procatalyst

In some embodiments, the ligands of the invention may be prepared using known procedures. Specifically, the ligands of the invention may be prepared using a variety of synthetic routes, depending on the variation desired in the ligand. In general, building blocks are prepared that are then linked together with a bridging group. Variations in the R group substituents can be introduced in the synthesis of the building blocks.

Variations in the bridge can be introduced with the synthesis of the bridging group. In one embodiment, generally, each of the optionally substituted phenyl rings is prepared as a separate building block. The desired optionally substituted phenyls are then combined into bi-phenyl building blocks, which are then bridged together. In another embodiment, the optionally substituted phenyl building blocks are bridged together and then additional optionally substituted phenyl building blocks are added to form the bridged bi-aryl structures. The starting materials or reagents used are generally commercially available, or are prepared via routine synthetic means.

The term ligand refers to the organic precursor to the procatalyst. The procatalyst is derived from a reaction of the ligand with a suitable metallic (titanium, zirconium, or hafnium) precursor. Common abbreviations used herein include the following:

LG: generic leaving group
PG: generic protecting group, common examples include:

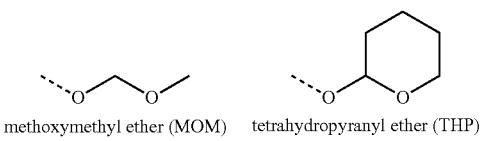

methoxymethyl ether (MOM)    tetrahydropyranyl ether (THP)

R, L, M, Z, X: as defined above
Ha: halide, most commonly Br or I; Me: methyl; Et: ethyl; Ph: phenyl; i-Pr: iso-propyl; n-Pr: normal-propyl; t-Bu: tertiary-butyl; t-octyl: tertiary-octyl; n-octyl: normal-octyl; n-decyl: normal-decyl;

Ts: para-toluene sulfonate; MsCl: methanesulfonyl chloride; THF: tetrahydrofuran; $Et_2O$: diethyl ether; DMF: dimethylformamide;

EtOAc: ethyl acetate; MeOH: methanol; $CH_3CN$: acetonitrile; $CHCl_3$: chloroform; $CH_2Cl_2$: dichloromethane; DMSO: dimethylsulfoxide; $CDCl_3$: deuterated chloroform; $C_6D_6$: deuterated benzene; sat. aq. $NaHCO_3$: saturated aqueous sodium bicarbonate; sat. aq. $NH_4Cl$: saturated aqueous ammonium chloride; brine: saturated aqueous sodium chloride; NaOH: sodium hydroxide; HCl: hydrochloric acid; $MgSO_4$: magnesium sulfate; $Na_2SO_4$: sodium sulfate; $K_2CO_3$: potassium carbonate; $K_3PO_4$: tribasic potassium phosphate; CuI: copper(I) iodide; $SiO_2$: silica gel; $HfCl_4$: hafnium tetrachloride; $ZrCl_4$: zirconium tetrachloride; MeMgBr: methylmagnesium bromide; n-BuLi: n-butyllithium;

DIAD: diisopropyl azodicarboxylate; $PPh_3$; triphenylphosphine; PinBOi-Pr: 2-isopropoxy-4,4,5,5-tetramethyl-1,3,2-dioxaborolane; $Pd(PPh_3)_4$: tetrakis(triphenylphosphine) palladium(0); $Pd(Pt-Bu_3)_2$: Bis(tri-tert-butylphosphine) palladium(0); PTSA: para-toluene sulfonic acid; NIS: N-iodosuccinimide; $Et_3N$: triethylamine; GC: gas chromatography; LC: liquid chromatography;

TLC: thin layer chromatography; rac: racemic.
NMR: nuclear magnetic resonance; mol: moles; mmol: millimoles; mL: milliliters; pt: microliters; g: grams; mg: milligrams.

Co-Catalyst Component

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$) alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri (($C_1$-$C_{20}$)hydrocarbyl)ammonium tetra(($C_1$-$C_{20}$)hydrocarbyl)borane (e.g., bis(octadecyl)methylammonium tetrakis (pentafluorophenyl)borane). As used herein, the term "ammonium" means a nitrogen cation that is a $((C_1-C_{20})$hydrocarbyl$)_4N^+$, a $((C_1-C_{20})$hydrocarbyl$)_3N(H)^+$, a $((C_1-C_{20})$hydrocarbyl$)_2N(H)_2^+$, $(C_1-C_{20})$hydrocarbylN$(H)_3^+$, or $N(H)_4^+$, wherein each $(C_1-C_{20})$hydrocarbyl may be the same or different.

Exemplary combinations of neutral Lewis acid activating co-catalysts include mixtures comprising a combination of a tri$((C_1-C_4)$alkyl)aluminum and a halogenated tri$((C_6-C_{18})$aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs: U.S. Pat. No. 5,064,802; U.S. Pat. No. 5,153,157; U.S. Pat. No. 5,296,433; U.S. Pat. No. 5,321,106; U.S. Pat. No. 5,350,723; U.S. Pat. No. 5,425,872; U.S. Pat. No. 5,625,087; U.S. Pat. No. 5,721,185; U.S. Pat. No. 5,783,512; U.S. Pat. No. 5,883,204; U.S. Pat. No. 5,919,983; U.S. Pat. No. 6,696,379; and U.S. Pat. No. 7,163,907. Examples of suitable hydrocarbyloxides are disclosed in U.S. Pat. No. 5,296,433. Examples of suitable Bronsted acid salts for addition polymerization catalysts are disclosed in U.S. Pat. No. 5,064,802; U.S. Pat. No. 5,919,983; U.S. Pat. No. 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-)amine, triethyl aluminum (TEA), and any combinations thereof.

In some embodiments, one or more of the foregoing activating co-catalysts are used in combination with each other. An especially preferred combination is a mixture of a tri$((C_1-C_4)$hydrocarbyl)aluminum, tri$((C_1-C_4)$hydrocarbyl) borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

Polymerization Process Conditions

Any conventional polymerization processes may be employed to conduct the inventive process. Such conventional polymerization processes include, but are not limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors, in parallel, series, and/or any combinations thereof.

The inventive process may occur in a solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes (min); for example, from 10 to 20 min. Ethylene, one or more solvents, one or more catalyst systems, e.g. an inventive catalyst system, optionally one or more cocatalysts, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

In one embodiment, the inventive process occurs in a solution polymerization reactor in a dual reactor system, for example a dual loop or spherical reactor system, wherein ethylene and optionally one or more α-olefins are polymerized in the presence of the inventive catalyst system, as described herein, and optionally one or more cocatalysts. In one embodiment, the ethylene based polymer may be produced via solution polymerization in a dual reactor system, for example a dual loop or spherical reactor system, wherein ethylene and optionally one or more α-olefins are polymerized in the presence of the inventive catalyst system, as described herein, and optionally one or more other catalysts.

The inventive catalyst system, as described herein, can be used in the first reactor, or second reactor, optionally in combination with one or more other catalysts. In one embodiment, the ethylene based polymer may be produced via solution polymerization in a dual reactor system, for example a dual loop or spherical reactor system, wherein ethylene and optionally one or more α-olefins are polymerized in the presence of the inventive catalyst system, as described herein, in both reactors.

In another embodiment, the inventive process occurs in a solution polymerization reactor in a single reactor system, for example a single loop or spherical reactor system, wherein ethylene and optionally one or more α-olefins are polymerized in the presence of the inventive catalyst system, as described herein, and optionally one or more cocatalysts.

In another embodiment, the inventive process occurs in a solution polymerization in a single reactor system, for example a single loop or spherical reactor system, wherein ethylene and optionally one or more α-olefins are polymerized in the presence of the inventive catalyst system, as described herein, optionally one or more other catalysts, and optionally one or more cocatalysts.

The procatalyst comprising the metal-ligand complex of formula (I) may be activated to form an active catalyst composition by combination with one or more cocatalysts, as described above, for example, a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and combinations thereof.

In another embodiment, the inventive process may occur in a solution polymerization reactor in a dual reactor system, for example a dual loop or spherical reactor system, wherein ethylene and optionally one or more α-olefins are polymerized in the presence of one or more catalyst systems.

In another embodiment, the inventive process may occur in a solution polymerization reactor in a multiple reactor system wherein the reactors are connected in series.

In another embodiment, the inventive process may occur in a solution polymerization reactor in a multiple reactor system wherein the reactors are connected in parallel.

In another embodiment, the inventive process may occur in a solution polymerization reactor in a single reactor system, for example a single loop or spherical reactor system, wherein ethylene and optionally one or more α-olefins are polymerized in the presence of one or more catalyst systems.

The inventive process may further occur in the presence of one or more additives. Such additives include, but are not limited to, antistatic agents, color enhancers, dyes, lubricants, pigments, primary antioxidants, secondary antioxidants, processing aids, UV stabilizers, and combinations thereof.

EXAMPLES

The following examples illustrate the present invention but are not intended to limit the scope of the invention. Two Comparative Procatalysts (C1-C2) and seven Inventive Procatalysts (I1-I7) were produced.

Comparative Catalyst C1:

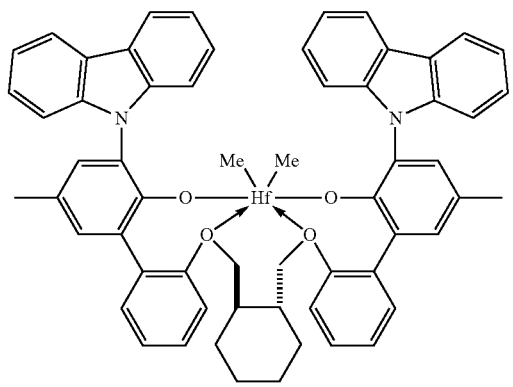

C1

The synthetic procedures of US Published Application 2004/0010103 were substantially repeated to prepare metal complex C1.

Comparative Catalyst C2:

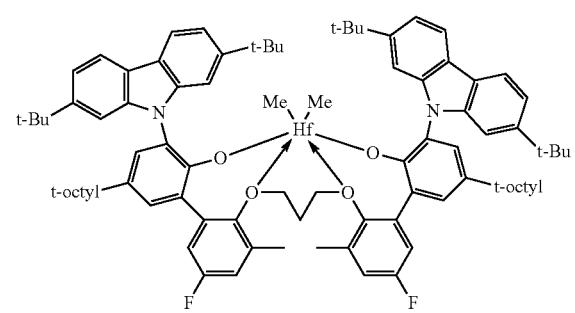

C2

The synthetic procedures of Published Application WO 2013-US73976 were substantially repeated to prepare metal complex C2.

Inventive Catalyst I1

I1-1. Preparation of 2-(4-bromophenoxy)tetrahydro-2H-pyran

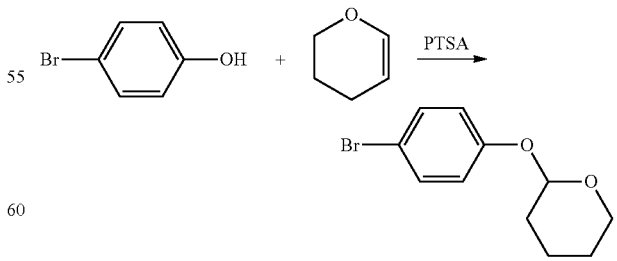

para-Toluene sulfonic acid (PTSA) monohydrate (0.088 g, 0.462 mmol) was added to a 0° C. solution of 4-bromophenol (8.00 g, 46.2 mmol) in 3,4-dihydro-2H-pyran (11.7 mL, 138.7 mmol). The mixture was stirred at this temperature for 45 minutes (min). After this time, Et$_2$O (50 mL) and 1 normal (N) NaOH (25 mL) were added to the reaction flask. The mixture was transferred to a separatory funnel and the layers were separated. The aqueous phase was further extracted with Et$_2$O (50 mL). The organics were washed with brine (30 mL), dried (Na$_2$SO$_4$), filtered, then concentrated to dryness under reduced pressure to afford the desired compound (11.8 g, 94%) as a colorless oil, which crystallized upon standing:

$^1$H NMR (400 MHz, CDCl$_3$) δ 7.41-7.33 (m, 2H), 6.98-6.89 (m, 2H), 5.37 (t, J=3.3 Hz, 1H), 3.87 (ddd, J=11.4, 9.6, 3.2 Hz, 1H), 3.59 (dtd, J=11.4, 4.1, 1.4 Hz, 1H), 2.05-1.91 (m, 1H), 1.94-1.79 (m, 2H), 1.78-1.52 (m, 3H);

$^{13}$C{$^1$H} NMR (101 MHz, CDCl$_3$) δ 156.17, 132.19, 118.31, 113.83, 96.51, 62.00, 30.26, 25.13, 18.65.

I1-2. Preparation of n-decyldimethyl(4-((tetrahydro-2H-pyran-2-yl)oxy)phenyl)silane

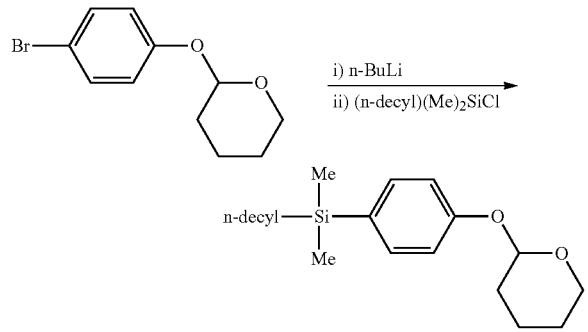

n-BuLi (2.4 molar (M) in hexanes) (11.9 mL, 28.6 mmol) was added slowly to a flask charged with 2-(4-bromophenoxy)tetrahydro-2H-pyran (7.00 g, 27.2 mmol) in THF (61 mL) at −78° C. The mixture was stirred at this temperature for 45 min then neat chloro(n-decyl)dimethylsilane (7.75 mL, 28.6 mmol) was added slowly. The reaction was maintained at −78° C. for 30 mins then allowed to warm to room temperature while the cold bath expired (stirred 18 hours (h)). The reaction was quenched with the addition of sat. aq. NH$_4$Cl (50 mL), Et$_2$O (50 mL) was added, the biphase was stirred vigorously for 15 min, then the phases were transferred to a separatory funnel and separated. The aqueous phase was further extracted with Et$_2$O (35 mL) and the combined organic extracts were washed with brine (25 mL), dried (Na$_2$SO$_4$), filtered and concentrated to dryness. The crude residue was purified by flash column chromatography (20 g CELITE load cartridge, 80 g SiO$_2$, 0% EtOAc to 25% EtOAc in hexanes) to afford the desired compound (7.9 g, 86%) as a colorless oil:

$^1$H NMR (400 MHz, CDCl$_3$) δ 7.45-7.38 (m, 2H), 7.08-7.00 (m, 2H), 5.45 (t, J=3.3 Hz, 1H), 3.91 (ddd, J=11.4, 9.5, 3.2 Hz, 1H), 3.60 (dtd, J=11.4, 4.1, 1.4 Hz, 1H), 2.12-1.51 (m, 6H), 1.34-1.17 (m, 16H), 0.94-0.82 (m, 3H), 0.70 (t, J=7.6 Hz, 2H), 0.22 (s, 6H);

$^{13}$C{$^1$H} NMR (101 MHz, CDCl$_3$) δ 157.72, 134.87, 131.66, 115.82, 96.08, 62.02, 33.64, 31.93, 30.38, 29.67, 29.61, 29.34, 29.33, 25.25, 23.90, 22.69, 18.79, 15.92, 14.12, −2.81.

I1-3. Preparation of decyl(3-iodo-4-((tetrahydro-2H-pyran-2-yl)oxy)phenyl)dimethylsilane

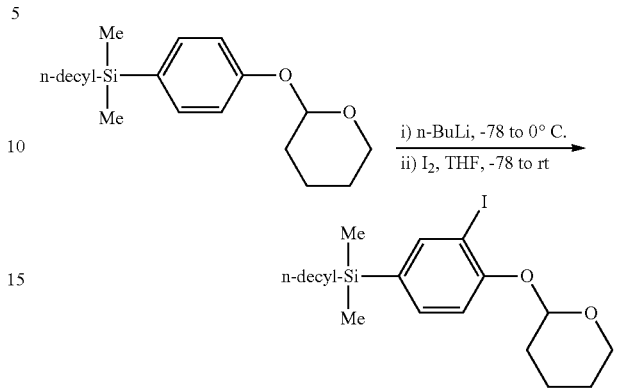

n-BuLi (2.4 M in hexanes) (7.74 mL, 18.6 mmol) was added to a −78° C. solution of decyldimethyl(4-((tetrahydro-2H-pyran-2-yl)oxy)phenyl)silane (5.00 g, 13.3 mmol) in THF (25 mL) in a 250 mL flask. The solution was stirred at this temperature for 30 min, then transferred to a 0° C. bath (ice/water) and stirred an additional 3 h. The solution was recooled to −78° C. then iodine (I$_2$) (4.55 g, 17.9 mmol) in THF (10 mL) was added slowly to the flask. The reaction was stirred for 18 h, reaching room temperature while the cold bath expired. The reaction was treated with a mixture of saturated aqueous sodium thiosulfate (15 mL) and water (15 mL) then stirred for 30 min. The biphase was transferred to a separatory funnel, Et$_2$O (25 mL) was added, the layers were separated, and the aqueous phase was further extracted with Et$_2$O (25 mL). The combined organics were washed with brine (15 mL), dried (Na$_2$SO$_4$), filtered, and concentrated to dryness. The crude residue was passed through a SiO$_2$ plug, eluting with a mixture of hexanes and EtOAc (100 mL, 5:1) to provide the desired compound (6.4 g, 96%) as a colorless oil:

$^1$H NMR (400 MHz, CDCl$_3$) δ 7.85 (d, J=1.5 Hz, 1H), 7.37 (dd, J=8.1, 1.5 Hz, 1H), 7.05 (d, J=8.1 Hz, 1H), 5.57 (t, J=2.9 Hz, 1H), 3.87 (td, J=11.1, 2.9 Hz, 1H), 3.67-3.52 (m, 1H), 2.25-2.08 (m, 1H), 2.05-1.93 (m, 1H), 1.92-1.81 (m, 1H), 1.81-1.59 (m, 3H), 1.31-1.21 (m, 16H), 0.88 (t, J=6.8 Hz, 3H), 0.77-0.63 (m, 2H), 0.22 (s, 6H);

$^{13}$C{$^1$H} NMR (101 MHz, CDCl$_3$) δ 155.89, 144.33, 134.83, 134.79, 114.72, 96.25, 88.29, 61.71, 33.55, 31.92, 30.18, 29.66, 29.60, 29.34, 29.30, 25.26, 23.80, 22.69, 18.26, 15.73, 14.12, −2.90.

I1-4. Preparation of 9-(5-(decyldimethylsilyl)-2-((tetrahydro-2H-pyran-2-yl)oxy)phenyl)-9H-carbazole

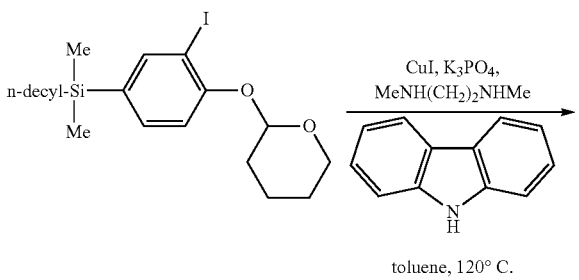

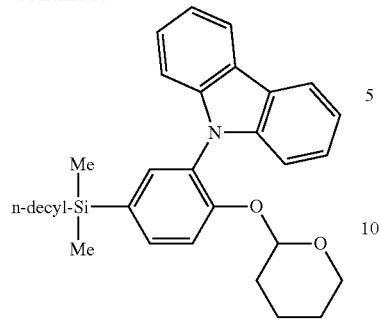

Note:
K₃PO₄ was finely ground and dried in a vacuum oven overnight prior to use.

Charged a 250 mL flask with decyl(3-iodo-4-((tetrahydro-2H-pyran-2-yl)oxy)phenyl)dimethylsilane (10.7 g, 21.3 mmol), carbazole (4.27 g, 25.6 mmol), CuI (101 mg, 0.532 mmol), N¹,N²-dimethylethane-1,2-diamine (0.380 mL, 3.83 mmol), and K₃PO₄ (9.04 g, 42.6 mmol), then added toluene (50 mL). The flask was fitted with a condenser and the solution was stirred 18 h at 110° C. (external temperature). After this time, added additional CuI (25 mg) and continued to stir for 2 h. The reaction mixture was cooled to room temperature then filtered through a SiO₂ plug. The plug was washed with Et₂O (100 mL). The combined solvent was removed under reduced pressure. The resulting material was taken up in hexanes (25 mL), and excess carbazole precipitated. The material was filtered and washed with hexanes (2×20 mL). The hexanes layers were combined and the volatiles were removed under reduced pressure. The crude residue was purified directly using flash column chromatography (material was split into two equal portions and purified individually) (20 g CELITE load cartridge, 80 g SiO₂, 10% CHCl₃ to 20% CHCl₃ in hexanes, when starting/protodeiodinated material had finished eluting the CHCl₃ was switched to acetone) to afford the desired compound (8.4 g, 73%) as a slightly yellow oil:

¹H NMR (400 MHz, CDCl₃) δ 8.14 (dt, J=7.7, 0.9 Hz, 2H), 7.60 (d, J=1.6 Hz, 1H), 7.56 (dd, J=8.1, 1.7 Hz, 1H), 7.42-7.34 (m, 3H), 7.29-7.21 (m, 3H), 7.16 (dt, J=8.2, 0.9 Hz, 1H), 5.38-5.30 (m, 1H), 3.61 (td, J=11.3, 2.8 Hz, 1H), 3.50-3.40 (m, 1H), 1.59-0.77 (m, 25H), 0.80-0.69 (m, 2H), 0.26 (app d, J=1.1 Hz, 6H);

¹³C{¹H} NMR (101 MHz, CDCl₃) δ 153.86, 141.50, 141.48, 134.84, 134.71, 133.10, 126.34, 125.47, 125.45, 123.19, 123.13, 120.01, 119.97, 119.35, 119.33, 116.36, 110.56, 110.26, 96.57, 61.56, 33.61, 31.93, 29.91, 29.68, 29.62, 29.38, 29.35, 24.94, 23.96, 22.69, 17.51, 15.86, 14.12, −2.84.

I1-5. Preparation of 9-(5-(decyldimethylsilyl)-2-((tetrahydro-2H-pyran-2-yl)oxy)-3-(4,4,5,5-tetramethyl-1,3,2-dioxaborolan-2-yl)phenyl)-9H-carbazole

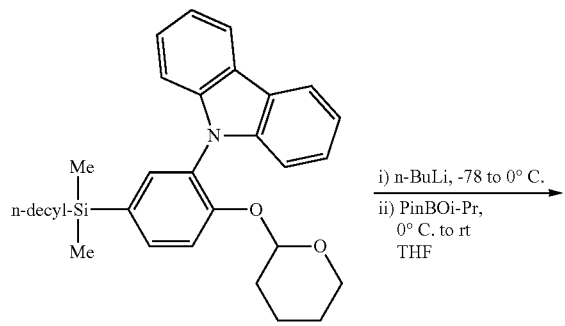

i) n-BuLi, -78 to 0° C.
ii) PinBOi-Pr, 0° C. to rt
THF

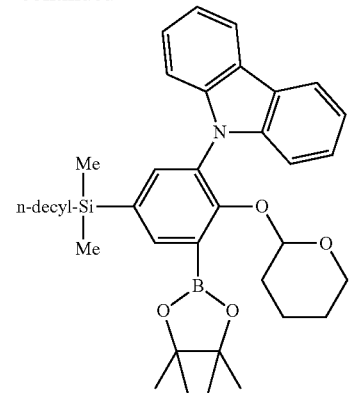

A dry 250 mL flask was charged with 9-(5-(decyldimethylsilyl)-2-((tetrahydro-2H-pyran-2-yl)oxy)phenyl)-9H-carbazole (8.30 g, 15.3 mmol) in THF (60 mL) and put under nitrogen. The solution was cooled to −78° C. (dry ice/acetone) then n-BuLi (2.4 M in hexanes) (8.94 mL, 21.5 mmol) was slowly added. The mixture was stirred at this temperature for 15 min then transferred to a 0° C. bath, and was stirred for 4 h at 0° C. (bath temperature rose to about 10° C.). After this time, additional ice was used to lower the bath temperature back to 0° C. then PinBOi-Pr (4.53 mL, 22.2 mmol) was added slowly over 5 min. The reaction was stirred while the cold bath expired overnight (18 h). The reaction was quenched with the addition of sat. aq. NaHCO₃ (40 mL), Et₂O (40 mL) was added then the phases were transferred to a separatory funnel and separated. The aqueous phase was further extracted with Et₂O (2×30 mL) and the combined organic extracts were washed with brine (30 mL), dried (Na₂SO₄), filtered and concentrated to dryness to provide the desired compound (9.90 g, 97%) as a sticky viscous oil. Trituration with CH₃CN and storing at 0° C. afforded a white solid:

¹H NMR (400 MHz, CDCl₃) δ 8.15-8.07 (m, 2H), 7.95 (d, J=1.8 Hz, 1H), 7.60 (d, J=1.7 Hz, 1H), 7.44-7.33 (m, 2H), 7.31-7.18 (m, 4H), 4.94 (app t, J=2.9 Hz, 1H), 2.65-2.52 (m, 2H), 1.71-1.63 (m, 1H), 1.38 (d, J=4.2 Hz, 12H), 1.32-1.15 (m, 20H), 1.00-0.78 (m, 4H), 0.77-0.68 (m, 2H), 0.24 (d, J=5.1 Hz, 6H);

¹³C{¹H} NMR (101 MHz, CDCl₃) δ 159.03, 141.96, 141.28, 141.19, 137.73, 135.28, 129.46, 125.70, 125.65, 123.24, 122.94, 119.82, 119.39, 119.36, 110.97, 110.59, 101.47, 83.79, 61.23, 33.62, 31.93, 29.94, 29.68, 29.62, 29.39, 29.34, 25.06, 24.90, 24.88, 24.79, 23.95, 22.69, 18.11, 15.74, 14.12, −2.81, −2.88.

I1-6. Preparation of rac-(1R,2R)-1,2-bis((2-bromophenoxy)methyl)cyclohexane

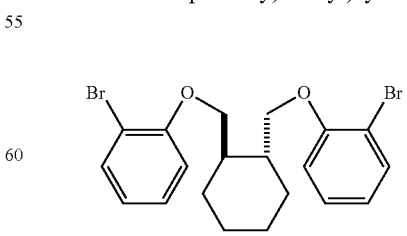

The synthetic procedures of US-A-2004/0010103 were substantially repeated to prepare (trans)-1,2-bis((2-bromophenoxy)methyl)cyclohexane.

I1-7. Preparation of Inventive Catalyst I1 Ligand rac-[2',2'''-((((1R,2R)-cyclohexane-1,2-diyl)bis(methylene))bis(oxy))bis(3-(9H-carbazol-9-yl)-5-(decyldimethylsilyl)-[1,1'-biphenyl]-2-ol)]

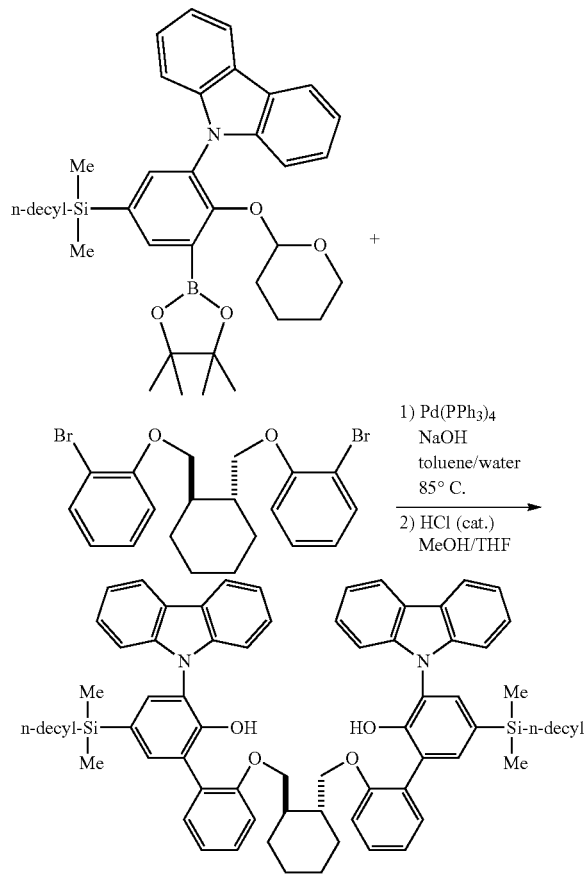

Degassed toluene (10 mL) and degassed water (2 mL) were added to a 40 mL vial charged with 9-(5-(decyldimethylsilyl)-2-((tetrahydro-2H-pyran-2-yl)oxy)-3-(4,4,5,5-tetramethyl-1,3,2-dioxaborolan-2-yl)phenyl)-9H-carbazole (0.790 g, 1.18 mmol), rac-(1R,2R)-1,2-bis((2-bromophenoxy)methyl)cyclohexane (0.250 g, 0.550 mmol), and solid sodium hydroxide (NaOH) (0.132 g, 3.30 mmol). The mixture was sparged with nitrogen for 5 min then solid Pd(PPh$_3$)$_4$ (0.016 g, 0.014 mmol) was added to the vial. The reaction was heated to 85° C. and maintained at this temperature for 18 h while stirring vigorously. After this time, the reaction was cooled to room temperature. The mixture was transferred to a separatory funnel, toluene (10 mL) and water (8 mL) were added, and the layers were separated. The organics were washed with water (5 mL), brine (5 mL), dried (Na$_2$SO$_4$), and filtered.

MeOH (8 mL) was added to the toluene solution from above then concentrated HCl (1 drop) was added. The flask was fitted with a condenser then the mixture was heated to 50° C. and maintained at this temperature for 1.5 h. After this time, the reaction was cooled to room temperature, and about half of the solvent volume was removed under reduced pressure. Water (10 mL) and CH$_2$Cl$_2$ (15 mL) were added to the crude residue, then the phases were transferred to a separatory funnel and separated. The aqueous phase was further extracted with CH$_2$Cl$_2$ (15 mL) and the combined organic extracts were dried (Na$_2$SO$_4$) then passed through a SiO$_2$ plug. The plug was washed with CH$_2$Cl$_2$ (65 mL) to ensure all material was collected (monitored by TLC). CELITE was added to the organic phase. The solvent was removed under reduced pressure and the resulting solid material was directly loaded onto a precolumn and purified using reverse phase flash column chromatography (50 g C$_{18}$, 15% THF to 90% THF in CH$_3$CN) to afford the desired compound (0.39 g, 58%) as a white solid:

$^1$H NMR (400 MHz, CDCl$_3$) δ 8.18-8.11 (m, 4H), 7.50 (dd, J=15.7, 1.6 Hz, 4H), 7.43-7.30 (m, 6H), 7.30-7.02 (m, 12H), 6.70 (d, J=8.2 Hz, 2H), 5.97 (s, 2H), 3.83-3.71 (m, 4H), 1.58-1.10 (m, 39H), 1.08-0.81 (m, 9H), 0.77-0.71 (m, 4H), 0.25 (s, 12H);

$^{13}$C{$^1$H} NMR (101 MHz, CDCl$_3$) δ 155.54, 150.96, 141.40, 141.37, 136.71, 134.24, 132.11, 131.75, 129.63, 127.63, 126.65, 125.77, 124.49, 123.34, 123.32, 121.83, 120.25, 119.64, 112.91, 110.02, 109.96, 72.11, 39.32, 33.57, 31.92, 29.86, 29.68, 29.63, 29.39, 29.34, 25.60, 23.98, 22.68, 15.91, 14.12, -2.78, -2.79.

I1-8. Preparation of Inventive Catalyst I1

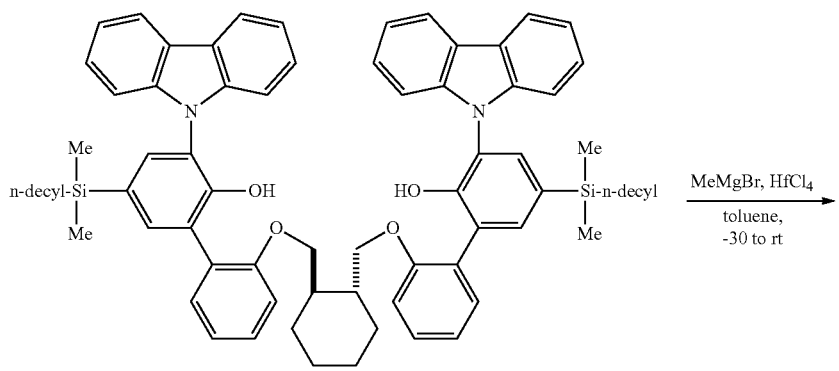

-continued

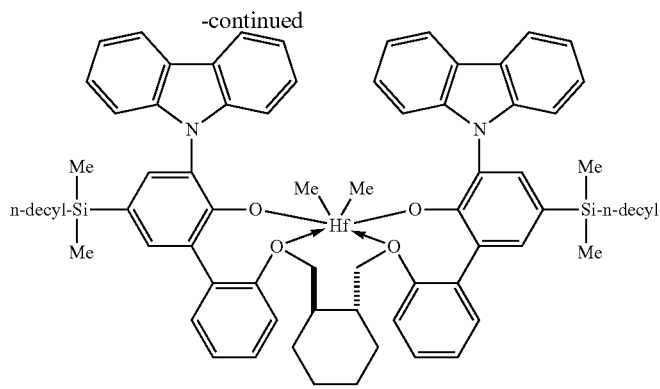

In a glovebox, in an oven dried 40 mL scintillation vial with a stir bar was suspended HfCl$_4$ (0.133 g, 0.414 mmol) in toluene (10 mL). Cooled mixture to −30° C. in freezer, removed from the freezer, then added MeMgBr (0.621 mL, 1.86 mmol, 3 M in Et$_2$O) with stirring. The solution was stirred for 5 min, then solid rac-[2',2'''-((((1R,2R)-cyclohexane-1,2-diyl)bis(methylene))bis(oxy))bis(3-(9H-carbazol-9-yl)-5-(decyldimethylsilyl)-[1,1'-biphenyl]-2-ol)] (0.500 g, 0.414 mmol) was added. The reaction was stirred while slowly warming to room temperature, and stirring was continued for 18 h. The reaction was filtered through a pad of CELITE and the pad was washed with toluene (5 mL). The combined organics were removed under vacuum to yield a tan solid. Hexanes (15 mL) was added to the solid, then this material was passed through a fritted funnel containing a pad of CELITE©. The pad was washed with hexanes (10 mL). The combined hexanes layers were concentrated to dryness under vacuum to provide the desired compound (0.400 g, 68%) as a white powder as a mixture of isomers (about 4:1):

$^1$H NMR (400 MHz, C$_6$D$_6$) δ 8.31-8.21 (m, 2H), 8.11-8.03 (m, 2H), 7.93-7.82 (m, 2H), 7.74-7.60 (m, 4H), 7.53-7.08 (m, 12H), 6.90-6.71 (m, 4H), 4.97-4.89 (m, 1.6H), 4.84-4.75 (m, 0.4), 4.24 (dd, J=12.2, 8.5 Hz, 1.6H), 3.88-3.71 (m, 0.4H), 3.41 (d, J=12.3 Hz, 1.6H), 3.25 (d, J=10.8 Hz, 0.4H), 1.49-0.57 (m, 52H), 0.31-0.24 (m, 12H), −1.08 (s, 4.8H), −1.17 (s, 1.2H).

Solubility Test of Inventive Catalyst I1

Hexanes (10 mL) was added to this material and the solution was allowed to settle overnight. 5.03 grams of the clear supernatant hexanes was removed from the vial, then the hexanes was removed from this clear solution to leave behind 205 mg of product. This is about 3.9% w/w solubility.

Inventive Catalyst I2

I2-1 Preparation of rac-((1R,2R)-cyclohexane-1,2-diyl)bis(methylene) dimethanesulfonate

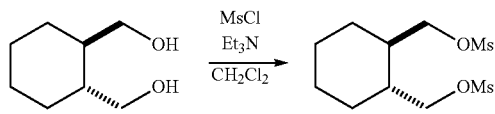

A solution of rac-((1R,2R)-cyclohexane-1,2-diyl)dimethanol (27 g, 187 mmol) and triethylamine (47.4 g, 469 mmol) in CH$_2$Cl$_2$ (140 mL) was added over two h to a stirred solution of MsCl (53.7 g, 469 mmol) in CH$_2$Cl$_2$ (250 mL) in 1 L 4-neck flask while maintaining a temperature between −10 to 0° C. The resulting slurry was stirred for 3 h between −5 to 0° C. After this time, the reaction mixture was poured into a mixture of ice water (700 mL) and 2N HCl (120 mL) in a 0 to 5° C. cold bath. After transferring to a separatory funnel, the organic layer was separated and the aqueous layer was subsequently extracted with CH$_2$Cl$_2$ (2×250 mL). The combined organic layers were washed with brine (2×100 mL), then the volatiles were removed under reduced pressure to afford 65 g of a yellow solid. The solid was recrystallized from CH$_3$OH (120 mL) to yield 45.6 g of the desired compound. Recrystallization of material remaining in the mother liquor afforded an additional 4.3 g of product, affording the desired compound in 89% (45.9 g) as a white solid:

$^1$H NMR (400 MHz, CDCl$_3$) δ 4.32-4.24 (m, 2H), 4.23-4.10 (m, 2H), 3.03 (s, 6H), 1.92-1.65 (m, 6H), 1.37-1.23 (m, 4H);

$^{13}$C{$^1$H} NMR (101 MHz, CDCl$_3$) δ 71.98, 38.56, 37.25, 29.22, 25.29.

I2-2. Preparation of rac-(1R,2R)-1,2-bis((2-bromo-4-fluorophenoxy)methyl)cyclohexane

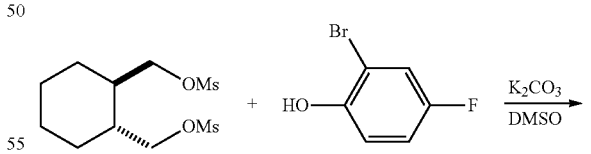

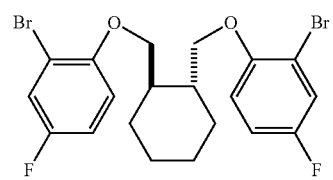

A 2000 mL flask equipped with a mechanical stirrer, a condenser, and a thermometer was charged with 2-bromo- 4-fluorophenol (47.7 g, 250 mmol), anhydrous K$_2$CO$_3$ (34.5 g, 250 mmol), and DMSO (650 mL). The mixture was stirred for 1 h while it was warmed to 50° C. using a heating mantle. After this time, rac-((1R,2R)-cyclohexane-1,2-diyl) bis(methylene) dimethanesulfonate (30 g, 100 mmol) was added to the stirred solution as a solution in DMSO (50 mL). The mixture was stirred while the temperature was maintained at 50° C. and was monitored by GC. After 21 h, the reaction mixture was allowed to cool to ambient temperature and was then poured into ice water (1000 mL). The water layer of the mixture was extracted with EtOAc (3×750 mL). The combined organic layer was washed with 1N NaOH (750 mL) and brine (2×). The volatiles were removed under reduced pressure, and the product was dried under vacuum to yield 46 g (94%) the desired compound as a white solid:

$^1$H NMR (400 MHz, CDCl$_3$) δ 7.26 (dd, J=7.8, 3.0 Hz, 2H), 6.94 (ddd, J=9.1, 7.8, 3.1 Hz, 2H), 6.81 (dd, J=9.0, 4.8 Hz, 2H), 4.07-3.91 (m, 4H), 1.99-1.79 (m, 6H), 1.50-1.27 (m, 4H);

$^{13}$C{$^1$H} NMR (101 MHz, CDCl$_3$) δ 156.43 (d, $J_{CF}$=242.7 Hz), 152.00 (d, $J_{CF}$=2.8 Hz), 120.29 (d, $J_{CF}$=25.7 Hz), 114.57 (d, $J_{CF}$=22.7 Hz), 113.19 (d, $J_{CF}$=8.2 Hz), 112.01 (d, $J_{CF}$=9.6 Hz), 72.84, 39.93, 30.06, 25.97.

I2-3. Preparation of Inventive Catalyst I2 Ligand rac-[6',6'''-((((1R,2R)-cyclohexane-1,2-diyl)bis (methylene))bis(oxy))bis(3-(9H-carbazol-9-yl)-5-(decyldimethylsilyl)-3'-fluoro-[1,1'-biphenyl]-2-ol)]

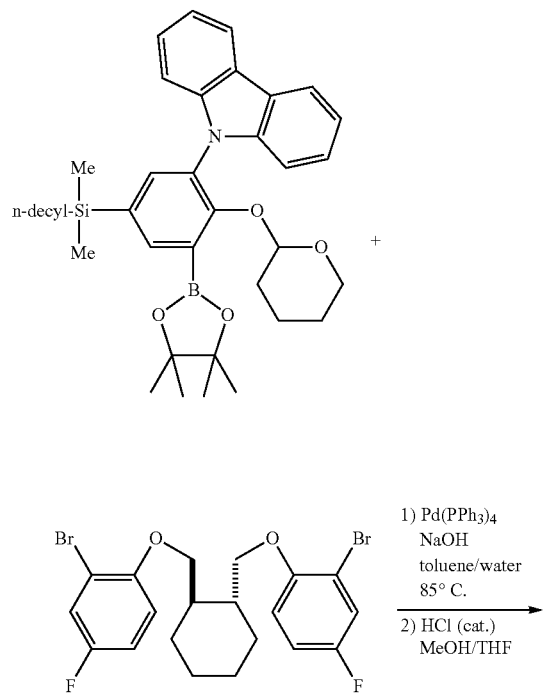

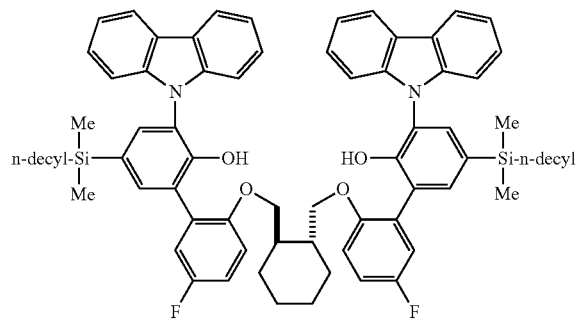

Degassed toluene (10 mL) and degassed water (2 mL) were added to a 40 mL vial charged with 9-(5-(decyldimethylsilyl)-2-((tetrahydro-2H-pyran-2-yl)oxy)-3-(4,4,5,5-tetramethyl-1,3,2-dioxaborolan-2-yl)phenyl)-9H-carbazole (1.05 g, 1.57 mmol), rac-(1R,2R)-1,2-bis((2-bromo-4-fluorophenoxy)methyl)cyclohexane (0.350 g, 0.714 mmol), and solid NaOH (0.171 g, 4.28 mmol). The mixture was sparged with nitrogen for 5 min then solid (Pd(PPh$_3$)$_4$) (0.016 g, 0.014 mmol) was added to the vial. The reaction was then heated to 85° C. and maintained at this temperature for 18 h while stirring vigorously. After this time, the reaction was cooled to room temperature. The mixture was transferred to a separatory funnel, toluene (10 mL) and water (8 mL) were added, and the layers were separated. The organics were washed with water (5 mL), brine (5 mL), dried (Na$_2$SO$_4$), and filtered.

Part 2:

MeOH (8 mL) was added to the toluene solution from above then concentrated HCl (1 drop) was added. The flask was fitted with a condenser then the mixture was heated to 50° C. and maintained at this temperature for 3 h. After this time, the reaction was cooled to room temperature, and about half of the solvent volume was removed under reduced pressure. Water (10 mL) and CH$_2$Cl$_2$ (15 mL) were added to the crude residue, then the phases were transferred to a separatory funnel and separated. The aqueous phase was further extracted with CH$_2$Cl$_2$ (15 mL) and the combined organic extracts were dried (Na$_2$SO$_4$) then passed through a SiO$_2$ plug. The plug was washed with CH$_2$Cl$_2$ (40 mL) to ensure all material was collected (monitored by TLC).

The crude residue was directly loaded onto a CELITE-packed precolumn and purified using reverse phase flash column chromatography (50 g C$_{18}$, 15% THF to 90% THF in CH$_3$CN) to afford the desired compound (0.415 g, 47%) as a white solid:

$^1$H NMR (400 MHz, CDCl$_3$) δ 8.15 (dd, J=7.8, 1.1 Hz, 4H), 7.53 (d, J=1.6 Hz, 2H), 7.44 (d, J=1.6 Hz, 2H), 7.40-7.31 (m, 4H), 7.27 (td, J=7.5, 1.0 Hz, 4H), 7.17-7.08 (m, 6H), 6.83 (ddd, J=9.0, 7.8, 3.1 Hz, 2H), 6.56 (dd, J=9.0, 4.5 Hz, 2H), 5.96 (s, 2H), 3.68 (qd, J=9.6, 9.0, 2.7 Hz, 4H), 1.58-0.79 (m, 48H), 0.78-0.69 (m, 4H), 0.25 (s, 12H);

$^{13}$C{$^1$H} NMR (101 MHz, CDCl$_3$) δ 157.43 (d, J=240.9 Hz), 151.71 (d, J=2.1 Hz), 150.87, 141.32, 141.28, 136.51, 134.63, 132.18, 128.42 (d, J=7.7 Hz), 126.68, 126.66, 125.90, 125.88, 124.72, 123.41, 123.38, 120.33, 120.31, 119.83, 118.53 (d, J=23.4 Hz), 115.54 (d, J=22.8 Hz), 114.40 (d, J=8.4 Hz), 109.96, 109.87, 73.28, 39.50, 33.56, 31.92, 29.82, 29.67, 29.62, 29.39, 29.33, 25.55, 23.97, 22.68, 15.86, 14.11, −2.81;

$^{19}$F{$^1$H} NMR (376 MHz, CDCl$_3$) δ −121.89.

I2-4. Preparation of Inventive Catalysts I2

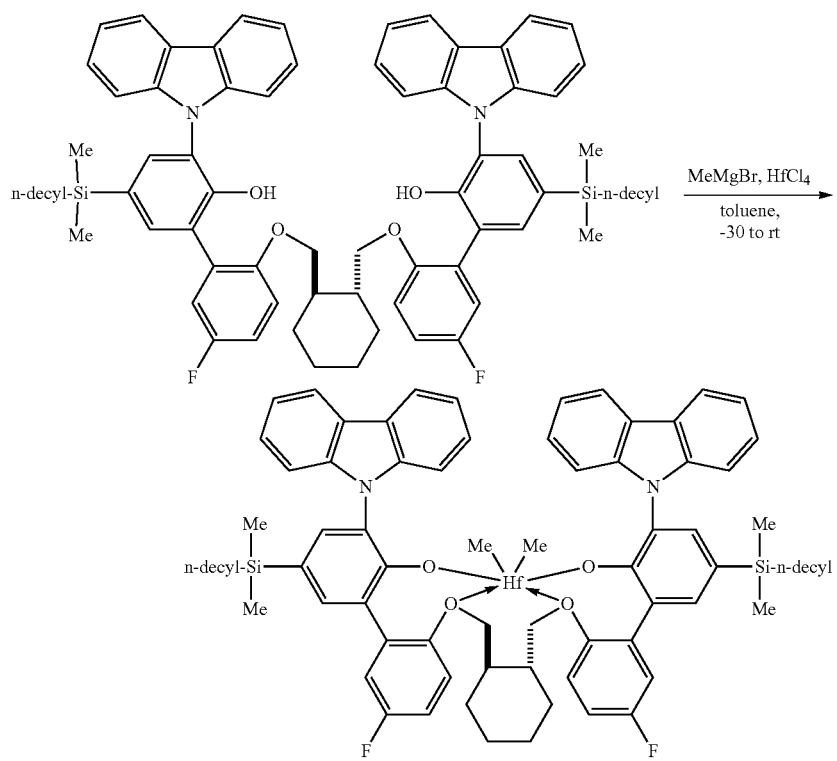

In a glovebox, in an oven dried 40 mL scintillation vial with a stir bar suspended HfCl₄ (0.098 g, 0.306 mmol) in toluene (6 mL). Cooled mixture to −30° C. in freezer, removed from the freezer, then added MeMgBr (0.458 mL, 1.38 mmol, 3 M in Et₂O) with stirring. The solution was stirred for 5 min, then rac-[6',6"-((((1R,2R)-cyclohexane-1,2-diyl)bis(methylene))bis(oxy))bis(3-(9H-carbazol-9-yl)-5-(decyldimethylsilyl)-3'-fluoro-[1,1'-biphenyl]-2-ol)] in toluene (2 mL) was added. The reaction was stirred while slowly warming to room temperature, and stirring was continued for 18 h. The reaction was filtered through a fritted funnel containing a pad of CELITE and the solid was washed with toluene (5 mL). Removed solvent under vacuum to yield a tan solid. Added hexanes (15 mL) to solid, and then filtered this material through a fritted funnel containing a small pad of CELITE. Washed solid with hexanes (10 mL). The combined hexanes layers were concentrated to dryness under reduced pressure to provide the desired compound (0.41 g, 93%) as an off-white powder as a mixture of isomers (about 4:1):

$^1$H NMR (400 MHz, C₆D₆) δ 8.19-8.10 (m, 2H), 8.08-7.98 (m, 2H), 7.91-7.75 (m, 2H), 7.63-7.54 (m, 4H), 7.54-7.36 (m, 4H), 7.32-7.11 (m, 6H), 7.00-6.92 (m, 2H), 6.69-6.51 (m, 2H), 4.78 (dd, J=9.1, 4.8 Hz, 1.6H), 4.64 (dd, J=9.1, 4.9 Hz, 0.4H), 4.14 (dd, J=12.2, 8.6 Hz, 1.6H), 3.71 (d, J=11.0 Hz, 0.4H), 3.30 (d, J=12.3 Hz, 1.6H), 3.17 (dd, J=11.3, 3.5 Hz, 0.4H), 1.44-0.65 (m, 52H), 0.26-0.19 (m, 12H), −1.09 (s, 4.8H), −1.16 (s, 1.2H);

$^{19}$F{$^1$H} NMR (376 MHz, C₆D6) δ −115.76, −115.93.

Solubility Test of Inventive Catalyst I2:

Hexanes (10 mL) was added to this material and the solution was allowed to settle overnight. 5.1 grams of the clear supernatant hexanes was removed from the vial, then the hexanes was removed from this clear solution to leave behind 140 mg of product. This is about 2.7% w/w solubility.

Inventive Catalyst I3

I3-1. Preparation of decyldimethyl(4-((tetrahydro-2H-pyran-2-yl)oxy)-3-(4,4,5,5-tetramethyl-1,3,2-dioxaborolan-2-yl)phenyl)silane

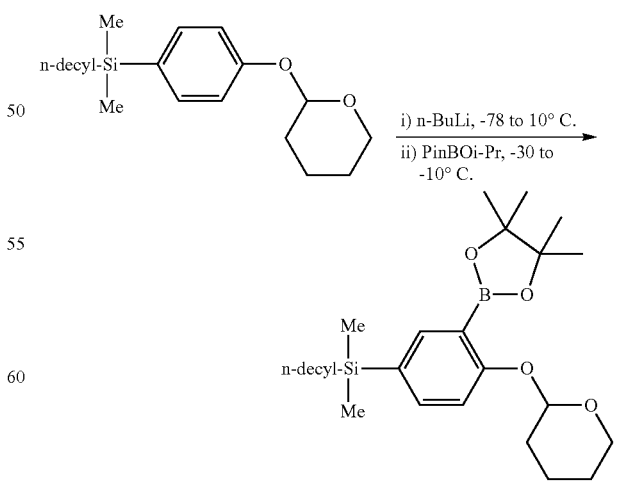

A dry 250 mL flask was charged with decyldimethyl(4-((tetrahydro-2H-pyran-2-yl)oxy)phenyl)silane (8.00 g, 21.2 mmol) in THF (60 mL) and put under nitrogen. The solution was cooled to −78° C. (dry ice/acetone) then n-BuLi (2.4 M in hexanes) (9.3 mL, 22.3 mmol) was slowly added. The mixture was stirred at this temperature for 15 min then transferred to a 10° C. bath, and stirred for 2 h at 10-15° C. The solution turned an amber color. After this time, the reaction was cooled to −30° C. then PinBOi-Pr (4.77 mL, 23.4 mmol) was added dropwise. Color began to fade. The reaction was stirred for 1.5 h while the cold bath slowly warmed to −10° C. The reaction was quenched with the addition of sat. aq. NaHCO$_3$ (20 mL) then Et$_2$O (25 mL) was added. The phases were transferred to a separatory funnel and separated. The aqueous phase was further extracted with Et$_2$O (30 mL) and the combined organic extracts were washed with sat. aq. NaHCO$_3$ (20 mL), water (20 mL), brine (20 mL), dried (Na$_2$SO$_4$), filtered and concentrated to dryness to provide the desired compound (10.5 g, 98%) as a colorless oil:

$^1$H NMR (400 MHz, CDCl$_3$) δ 7.77 (d, J=1.8 Hz, 1H), 7.51 (dd, J=8.2, 1.8 Hz, 1H), 7.09 (d, J=8.2 Hz, 1H), 5.54 (t, J=2.9 Hz, 1H), 3.99 (td, J=11.1, 2.8 Hz, 1H), 3.66-3.48 (m, 1H), 2.30-2.12 (m, 1H), 2.00-1.91 (m, 1H), 1.91-1.79 (m, 1H), 1.75-1.51 (m, 3H), 1.37 (s, 12H), 1.30-1.24 (m, 16H), 0.97-0.83 (m, 3H), 0.73 (dd, J=9.7, 5.8 Hz, 2H), 0.24 (s, 6H);

$^{13}$C{$^1$H} NMR (101 MHz, CDCl$_3$) δ 162.31, 141.78, 137.89, 131.32, 114.66, 96.15, 83.39, 61.62, 33.79, 32.08, 30.39, 29.82, 29.77, 29.49, 25.64, 25.15, 25.00, 24.07, 22.84, 18.26, 16.04, 14.26, −2.63.

I3-2. Preparation of decyldimethyl(5'-phenyl-6-((tetrahydro-2H-pyran-2-yl)oxy)-[1,1':3',1''-terphenyl]-3-yl)silane

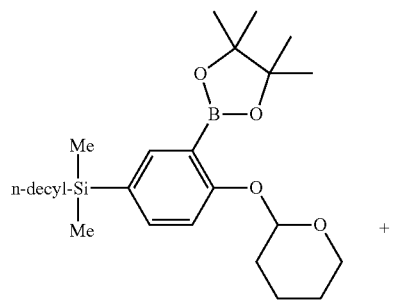

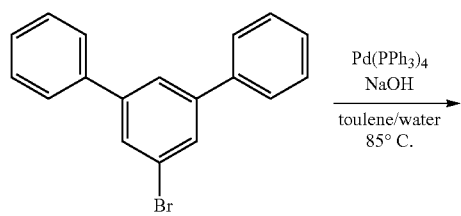

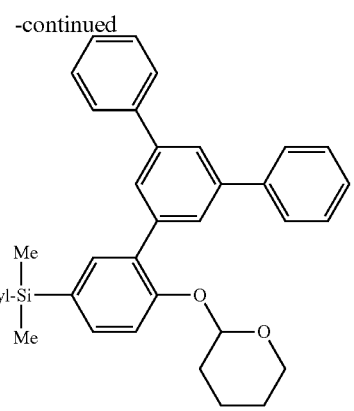

A solution of 5'-bromo-1,1':3',1''-terphenyl (6.23 g, 20.2 mmol) and NaOH (2.30 g, 57.6 mmol) in degassed toluene (50 mL) and degassed water (10 mL) was prepared and degassed for 5 min using a nitrogen stream. Pd(PPh$_3$)$_4$ (0.444 g, 0.384 mmol) was added and warming of the solution to 85° C. was started. During this time a solution of decyldimethyl(4-((tetrahydro-2H-pyran-2-yl)oxy)-3-(4,4,5,5-tetramethyl-1,3,2-dioxaborolan-2-yl)phenyl)silane (9.65 g, 19.2 mmol) in toluene (25 mL) was slowly added via syringe over 3 h. The reaction was maintained at this temperature for 15 h. After cooling to room temperature, the reaction was treated with sat. aq. NaHCO$_3$ (30 mL). Et$_2$O (40 mL) was added then the phases were transferred to a separatory funnel and separated. The aqueous phase was further extracted with Et$_2$O (30 mL) and the combined organic extracts were washed with brine (25 mL), dried (Na$_2$SO$_4$), filtered and concentrated to dryness. The crude residue was purified using flash column chromatography (40 g CELITE load cartridge, 120 g SiO$_2$, 0% EtOAc to 15% EtOAc in hexanes) to afford the desired compound (10.9 g, 94%) as a clear viscous oil:

$^1$H NMR (400 MHz, CDCl$_3$) δ 7.81-7.76 (m, 3H), 7.73-7.67 (m, 4H), 7.55 (d, J=1.7 Hz, 1H), 7.47 (dddd, J=6.7, 5.0, 2.5, 1.2 Hz, 5H), 7.40-7.34 (m, 2H), 7.26 (d, J=8.2 Hz, 1H), 5.51 (d, J=2.5 Hz, 1H), 3.85 (td, J=10.9, 2.6 Hz, 1H), 3.60 (dd, J=9.3, 5.4 Hz, 1H), 1.84-1.14 (m, 22H), 0.87 (t, J=6.9 Hz, 3H), 0.74 (d, J=9.2 Hz, 2H), 0.26 (s, 6H);

$^{13}$C{$^1$H} NMR (101 MHz, CDCl$_3$) δ 154.78, 141.50, 141.38, 140.03, 136.35, 134.55, 132.49, 130.88, 128.93, 127.73, 127.47, 127.39, 124.69, 115.15, 96.66, 62.11, 33.81, 32.07, 30.48, 29.81, 29.79, 29.52, 29.49, 25.35, 24.12, 22.84, 18.58, 16.07, 14.27, −2.60.

I3-3. Preparation of decyldimethyl(5'-phenyl-6-((tetrahydro-2H-pyran-2-yl)oxy)-5-(4,4,5,5-tetramethyl-1,3,2-dioxaborolan-2-yl)-[1,1':3',1''-terphenyl]-3-yl)silane

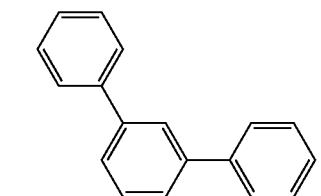

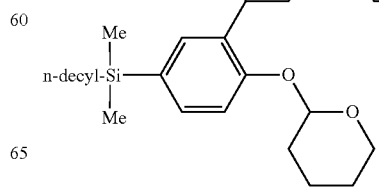

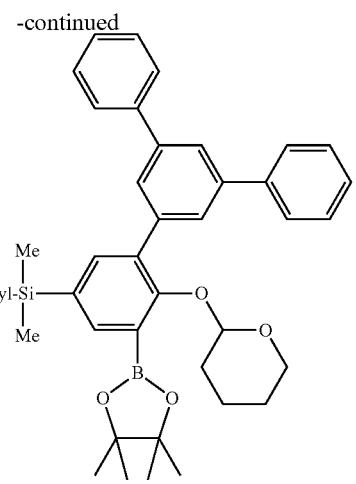

A dry 250 mL flask was charged with decyldimethyl(5'-phenyl-6-((tetrahydro-2H-pyran-2-yl)oxy)-[1,1':3',1"-terphenyl]-3-yl)silane (10.9 g, 18.0 mmol) in THF (51 mL) and put under nitrogen. The solution was cooled to −78° C. (dry ice/acetone) then n-BuLi (2.4 M in hexanes) (10.5 mL, 25.2 mmol) was slowly added. The mixture was stirred at this temperature for 15 min then transferred to a 0° C. bath, and stirred an additional 4 h at 0° C. (temperature of the bath rose to about 10° C.). After this time, additional ice was used to lower the temperature back to 0° C. then PinBOi-Pr (5.33 mL, 26.1 mmol) was added dropwise. The reaction was stirred while the cold bath expired overnight (18 h). The reaction was quenched with the addition of sat. aq. NaHCO$_3$ (40 mL), Et$_2$O (40 mL) was added then the phases were transferred to a separatory funnel and separated. The aqueous phase was further extracted with Et$_2$O (2×30 mL) and the combined organic extracts were washed with sat. aq. NaHCO$_3$ (25 mL), brine (30 mL), dried (Na$_2$SO$_4$), filtered and concentrated to dryness to provide the desired compound (12.4 g, 94%) as a sticky viscous oil:

$^1$H NMR (400 MHz, CDCl$_3$) δ 7.86 (d, J=1.8 Hz, 1H), 7.81 (d, J=1.8 Hz, 2H), 7.78-7.76 (m, 1H), 7.73-7.66 (m, 4H), 7.62 (d, J=1.8 Hz, 1H), 7.47 (app t, J=7.6 Hz, 4H), 7.41-7.34 (m, 2H), 5.05 (app t, J=3.1 Hz, 1H), 3.14-2.96 (m, 2H), 1.71-1.14 (m, 34H), 0.87 (t, J=6.7 Hz, 3H), 0.78-0.73 (m, 2H), 0.26 (s, 6H).

I3-4. Preparation of 2-bromo-3,4,5-trifluorophenol

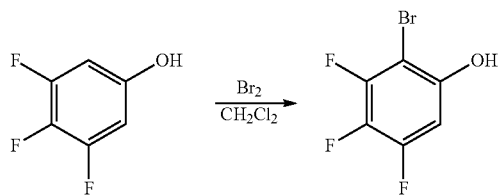

To a jar equipped with a stir bar was added the trifluorophenol (25 g, 168 mmol, 1 equiv) dissolved in CH$_2$Cl$_2$ (500 mL). Bromine (Br$_2$) (12.9 mL, 253 mmol, 1.5 equiv) was added dropwise at room temperature and the solution allowed to stir overnight. The reaction monitored by $^1$H NMR, and quenched with sat aq. sodium bisulfite (NaHSO$_3$) when complete. The biphasic solution was stirred until the red color completely dissipated and the layers were then separated. The organic layer was washed with brine, was filtered through a SiO$_2$ plug and eluted with CH$_2$Cl$_2$. The filtrate was concentrated to give the desired compound as a clear colorless compound (36.5 g, 95%):

$^1$H NMR (400 MHz, C$_6$D$_6$) δ 5.98 (ddd, J=11.3, 6.5, 2.3 Hz, 1H), and 4.65 (s, 1H);

$^{19}$F{$^1$H} NMR (376 MHz, C$_6$D$_6$) δ−126.15 (dd, J=21.8, 6.0 Hz), −134.45 (dd, J=22.0, 5.4 Hz), and −167.51 (t, J=20.8 Hz);

$^{13}$C{$^1$H} NMR (101 MHz, CDCl$_3$) δ 151.02 (ddd, J$_{CF}$=248, 11, 5 Hz), 148.82 (ddd, J$_{CF}$=249, 12, 6 Hz), 148.70 (dt, J$_{CF}$=13, 4 Hz), 135.20 (dt, J$_{CF}$=249, 16 Hz), 99.85 (ddd, J$_{CF}$=22, 4, 2 Hz), 94.00 (dd, J$_{CF}$=21, 4 Hz).

I3-5. Preparation of 5,5'-(((meso)-pentane-2,4-diyl)bis(oxy))bis(4-bromo-1,2,3-trifluorobenzene

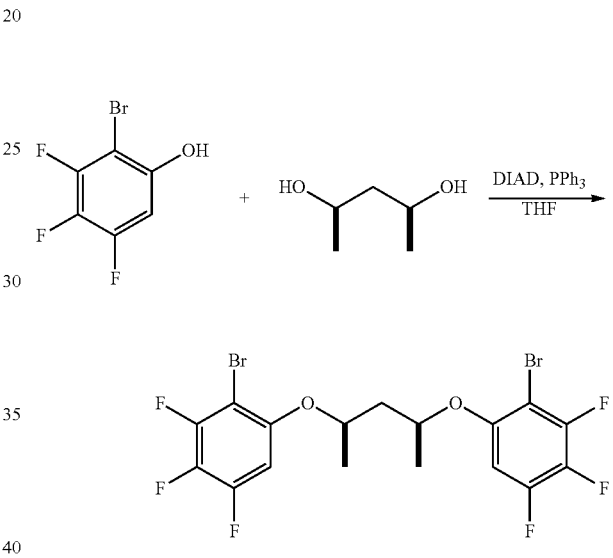

In a 100 mL round bottomed flask was placed the diol (0.5 g, 4.8 mmol, 1 equiv) dissolved in THF (30 mL). The flask was cooled to 0° C., add the phenol (2.3 g, 10.1 mmol, 2.1 equiv) followed by PPh$_3$ (2.64 g, 10.1 mmol, 2.1 equiv) and DIAD (1.96 g, 10.1 mmol, 2.1 equiv). The reaction was allowed to warm to 23° C. and stirred overnight. When complete by TLC, the reaction was quenched with sat. aq. NH$_4$C$_1$, extracted with Et$_2$O, washed with brine, dried (MgSO$_4$), filtered and concentrated to dryness. Trituration with pentanes to remove triphenylphosphine oxide (PPh$_3$O) followed by concentration to remove the pentanes provided the desired compound as a white solid (61% yield):

$^1$H NMR (400 MHz, C$_6$D$_6$) δ 6.20 (ddd, J=11.9, 6.3, 2.3 Hz, 2H), 3.89 (sextet, J=6.2 Hz, 2H), 1.92 (dt, J=14.2, 6.6 Hz, 1H), 1.25 (dt, J=14.2, 5.8 Hz, 1H), 0.83 (d, J=6.0 Hz, 6H);

$^{19}$F{$^1$H} NMR (376 MHz, C$_6$D$_6$) δ−123.98 (dd, J=22.3, 4.3 Hz), −134.54 (dd, J=22.8, 5.5 Hz), and −166.82 (t, J=22.3 Hz);

$^{13}$C{$^1$H} NMR (101 MHz, CDCl$_3$) δ 151.57, 151.52, 151.47, 151.42, 150.96, 150.90, 150.84, 150.78, 150.10, 150.06, 150.02, 150.00, 149.96, 149.93, 149.11, 149.06, 149.00, 148.95, 148.50, 148.45, 148.39, 148.33, 136.35, 136.19, 133.89, 133.73, 98.21, 98.18, 97.99, 97.96, 96.81, 96.76, 96.62, 96.57, 72.62, 41.55, 18.91.

I3-6. Preparation of Inventive Catalyst I3 Ligand [6,6''''-(((meso)-pentane-2,4-diyl)bis(oxy))bis(5'-(decyldimethylsilyl)-2,3,4-trifluoro-5''-phenyl-[1,1': 3',1'':3'',1'''-quaterphenyl]-2'-ol)]

Decyldimethyl(5'-phenyl-6-((tetrahydro-2H-pyran-2-yl)oxy)-5-(4,4,5,5-tetramethyl-1,3,2-dioxaborolan-2-yl)-[1,1': 3',1''-terphenyl]-3-yl)silane (7.50 g, 10.3 mmol) was dissolved in THF/MeOH (1:1 80 mL), then 3 drops of concentrated HCl were added. The solution was stirred at

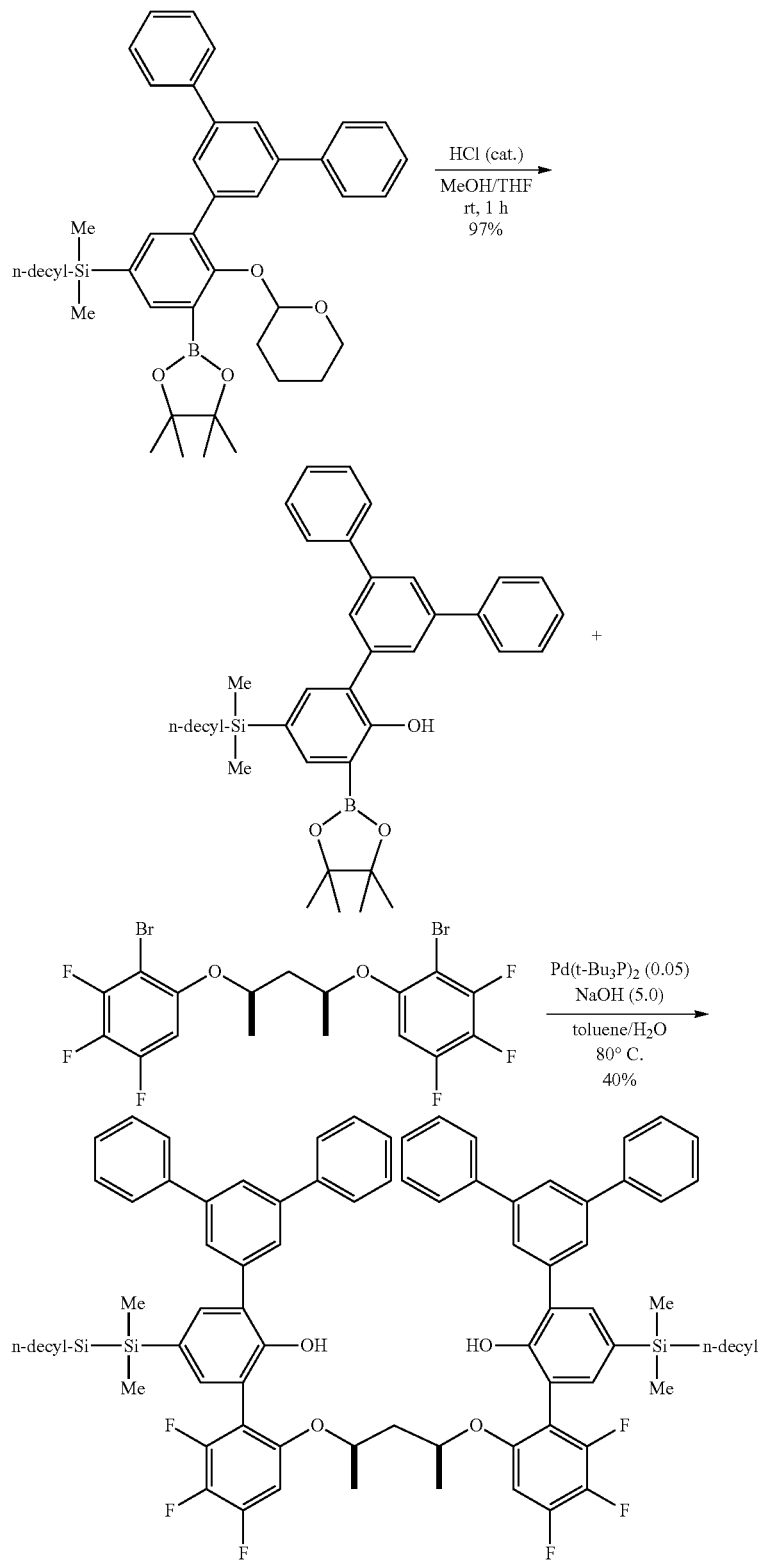

room temperature for 2 h. The reaction was diluted with the addition of water (25 mL), Et$_2$O (30 mL) was added then the phases were transferred to a separatory funnel and separated. The aqueous phase was further extracted with Et$_2$O (30 mL), and the combined organic extracts were washed with brine (20 mL), dried (Na$_2$SO$_4$), filtered and concentrated to dryness. 5-(decyldimethylsilyl)-5'-phenyl-3-(4,4,5,5-tetramethyl-1,3,2-dioxaborolan-2-yl)-[1,1':3',1''-terphenyl]-2-ol was isolated in 98% (6.5 g) as a sticky semi-solid that was used in the next reaction without any further purification. When the material was placed in a 0° C. fridge overnight, a white solid was obtained. However, sitting at room temperature for an extended period of time resulted in the reformation of a sticky semi-solid:

$^1$H NMR (400 MHz, CDCl$_3$) δ 8.33 (d, J=0.6 Hz, 1H), 7.80-7.75 (m, 4H), 7.72-7.62 (m, 5H), 7.51-7.42 (m, 4H), 7.39-7.34 (m, 2H), 1.38 (s, 12H), 1.36-1.16 (m, 16H), 0.87 (t, J=6.8 Hz, 3H), 0.78-0.72 (m, 2H), 0.27 (s, 6H).

Suzuki Coupling Reaction:

Degassed toluene (90 mL) and degassed water (15 mL) were added to a 250 mL flask charged with 5-(decyldimethylsilyl)-5'-phenyl-3-(4,4,5,5-tetramethyl-1,3,2-dioxaborolan-2-yl)-[1,1':3',1''-terphenyl]-2-ol (6.41 g, 9.91 mmol), 5,5'-((pentane-2,4-diyl)bis(oxy))bis(4-bromo-1,2,3-trifluorobenzene) (2.30 g, 4.41 mmol), bis(tri-tert-butylphosphine)palladium(0) (Pd(tBu$_3$P)$_2$) (0.113 g, 0.220 mmol), and NaOH (0.881 g, 22.0 mmol). The reaction was warmed to 77° C. Stirring was continued at this temperature for 18 h. The reaction was then warmed to 80° C. and stirring continued for 3 h. The heating was stopped and the flask was cooled to room temperature.

The reaction was diluted with the addition of aqueous 1M HCl (30 mL), Et$_2$O (30 mL) was added then the phases were transferred to a separatory funnel and separated. The aqueous phase was further extracted with Et$_2$O (2×30 mL) and the combined organic extracts were washed with brine (25 mL), dried (Na$_2$SO$_4$), filtered and concentrated to dryness. The crude residue was directly loaded onto a CELITE-packed precolumn using CH$_3$CN and purified using reverse phase flash column chromatography (100 g C$_{18}$, 10% THF to 100% THF in CH$_3$CN) to afford product that needed further purification. The material was directly loaded onto a CELITE-packed precolumn using hexanes and purified using normal phase flash column chromatography (80 g SiO$_2$, 0% EtOAc to 55% EtOAc in hexanes) to afford the desired compound (2.5 g, 41%) as a white solid:

$^1$H NMR (400 MHz, CDCl$_3$) δ 7.83 (dt, J=6.7, 1.7 Hz, 2H), 7.67 (dddd, J=14.1, 12.5, 8.2, 3.4 Hz, 12H), 7.59-7.25 (m, 16H), 6.45-6.29 (m, 2H), 5.43 (app dd, J=19.7, 17.5 Hz, 2H), 4.29-4.16 (m, 2H), 2.09-1.87 (m, 1H), 1.59-1.44 (m, 1H), 1.34-1.05 (m, 38H), 0.95-0.68 (m, 10H), 0.34-0.13 (m, 12H);

$^{19}$F{$^1$H} NMR (376 MHz, CDCl$_3$) δ −131.85 (ddd, J=24.0, 17.9, 6.2 Hz), −132.09 (ddd, J=22.3, 15.7, 6.2 Hz), −133.25 (ddd, J=43.4, 22.2, 6.2 Hz), −133.55 (td, J=21.7, 6.1 Hz), −168.45 (t, J=22.4 Hz), −168.67 (t, J=22.5 Hz), −169.02 (t, J=22.5 Hz), −169.33 (t, J=22.5 Hz)

I3-7. Preparation of Inventive Catalysts I3

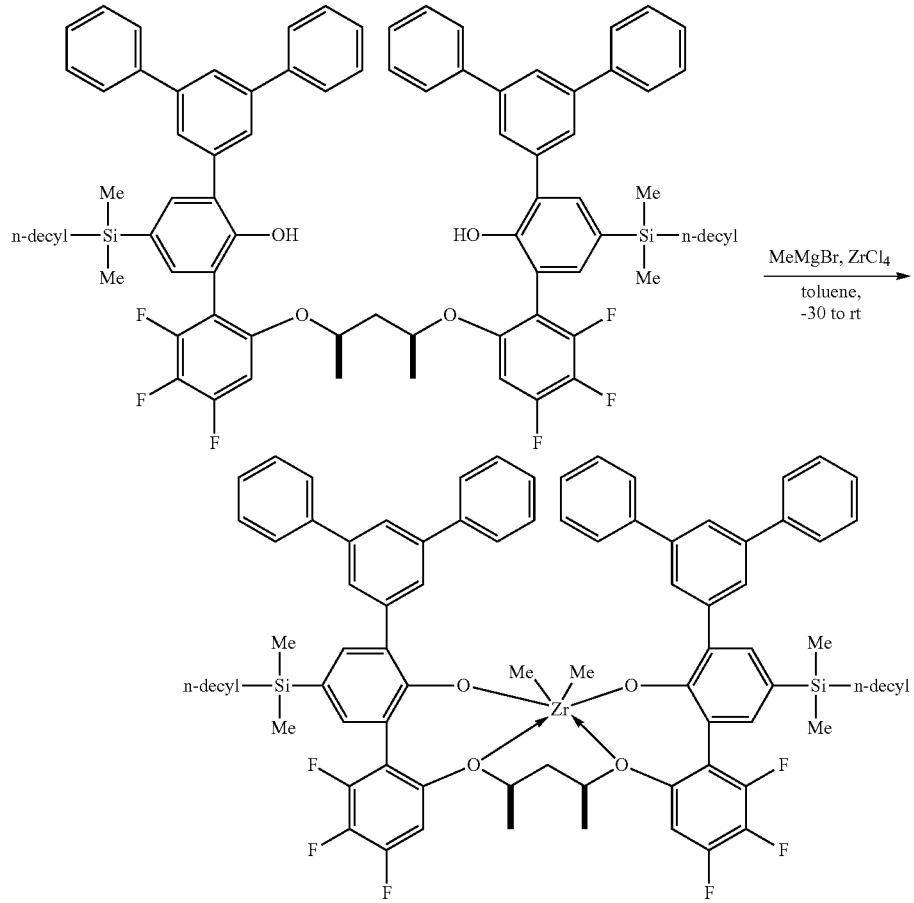

In a glovebox, in an oven dried flask with a stir bar was suspended ZrCl$_4$ (0.337 g, 1.45 mmol) in toluene (65 mL). Cooled mixture to −30° C. in freezer, removed from the freezer, then added MeMgBr (1.88 mL, 5.65 mmol, 3 M in Et$_2$O) with stirring. The solution was stirred for 6 min, then added solid 6,6"-(((meso)-pentane-2,4-diyl)bis(oxy))bis(5'-(decyldimethylsilyl)-2,3,4-trifluoro-5"-phenyl-[1,1':3',1": 3",1'"-quaterphenyl]-2'-ol (1.93 g, 1.38 mmol) to the reaction and rinsed the vial containing the ligand with toluene (5 mL). The reaction was stirred while slowly warming to room temperature over 1.5 h. The reaction was filtered through a fritted funnel containing a pad of CELITE and the solid was washed with toluene (2×10 mL). Removal of the solvent under reduced pressure indicated that the reaction did not completely convert starting material to product. The material dissolved in toluene (30 mL), cooled to −30° C., then MeMgBr (0.05 mL, 0.151 mmol, 3 M in Et$_2$O) was added. The reaction was stirred for 1 h then subsequently filtered into a bottle through a fitted funnel containing a pad of CELITE. The pad was washed with toluene (2×10 mL). The solvent was removed to provide an oil. Hexanes (8 mL) was added to this oil, then removed under reduced pressure. This was repeated four times, which provided 1.9 g (91%) of the inventive catalyst I3 as an off-white powder:

$^1$H NMR (400 MHz, C$_6$D$_6$) δ 8.34 (br s, 2H), 8.21-8.09 (m, 4H), 7.99 (dd, J=19.0, 1.7 Hz, 2H), 7.80-7.71 (m, 8H), 7.71-7.64 (m, 1H), 7.51-7.40 (m, 1H), 7.32-7.08 (m, 12H), 5.34-5.21 (m, 1H), 5.07-4.98 (m, 1H), 4.11-3.94 (m, 1H), 3.58-3.39 (m, 1H), 1.53-1.19 (m, 34H), 0.98-0.74 (m, 10H), 0.40 (d, J=6.0 Hz, 3H), 0.35 (d, J=2.2 Hz, 6H), 0.31 (d, J=6.4 Hz, 6H), 0.09 (d, J=6.7 Hz, 3H), −0.15 (s, 3H), −0.26 (s, 3H);

$^{19}$F{$^1$H} NMR (376 MHz, C$_6$D$_6$) δ−134.22 (app ddd, J=28.8, 22.7, 5.2 Hz), −134.49 (dd, J=22.3, 5.4 Hz), −134.97 (dd, J=22.6, 5.1 Hz), −158.88 (t, J=22.5 Hz), −159.21 (t, J=22.6 Hz).

Solubility test of Inventive Catalyst I3:

About 950 mg of pre-catalyst used. Added ISOPAR-E (40 mL). Swirled solution then allowed insoluble material to settle to the bottom of the jar overnight. Removed 5.06 grams of ISOPAR-E solution into a vial. Solvent was removed and 120 mg of pre-catalyst was obtained. This is about a 2.3% w/w solubility in ISOPAR E.

Inventive Catalyst I4

I4-1. Preparation of 4-bromo-1-(methoxymethoxy)-2-methylbenzene

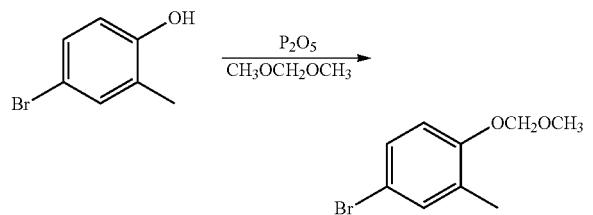

To a stirred solution of 4-bromo-2-methylphenol (20.0 g, 107 mmol) and dimethoxymethane (60 g, 0.7 mol) in CH$_2$Cl$_2$ (200 mL) was added the phosphorous pentoxide (P$_2$O$_5$) (37.9 g, 267 mmol) in portions and the mixture was stirred for 1.5 h. The mixture was decanted into water (100 mL) and the organic layer was washed with brine, aqueous NaOH (5%), dried and concentrated under reduced pressure to yield the crude product as brown oil. The crude material was purified by column chromatography on SiO$_2$ using an ISCO CombiFlash system with hexane: Et$_2$O as eluant to yield 22.2 g (89%) of the desired compound as colorless oil:

$^1$H NMR (400 MHz, C$_6$D$_6$) δ 7.10 (s, 1H), 7.07-7.04 (m, 1H), 6.67 (d, J=8.5 Hz, 1H), 4.64 (s, 2H), 2.99 (s, 3H), 1.96 (s, 3H);

$^{13}$C{$^1$H} NMR (101 MHz, C$_6$D$_6$) δ 154.93, 133.70, 129.81, 127.74, 115.69, 114.09, 94.39, 55.50, 16.05.

I4-2. Preparation of (4-(methoxymethoxy)-3-methylphenyl)dimethyl(octyl)silane

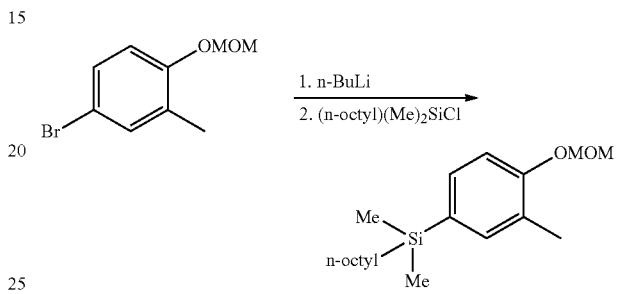

To a stirred solution of 4-bromo-1-(methoxymethoxy)-2-methylbenzene (10.0 g, 43.3 mmol) in THF (30 mL) cooled to −70° C. (dry ice-acetone bath) was added a solution of 1.6 M n-BuLi in hexanes (32.5 mL, 51.9 mmol) and allowed to stir for 20 min. Chloro(dimethyl)octylsilane (10.5 g, 51.9 mmol) was added to the reaction mixture over 10 min and the mixture was allowed to warm up to room temperature. The reaction mixture was diluted with Et$_2$O and washed with brine. The organic layer was dried and concentrated to yield the crude product as oil. The crude product was purified by column chromatography on SiO$_2$ with hexane and Et$_2$O (0 to 3% gradient) using ISCO CombiFlash system to yield 13.3 g (85%) of the desired compound as a colorless oil:

$^1$H NMR (400 MHz, C$_6$D$_6$) δ 7.38-7.35 (m, 1H), 7.31-7.27 (m, 1H), 7.08 (s, 1H), 4.85 (s, 2H), 3.08 (s, 3H), 2.27 (s, 3H), 1.43-1.27 (m, 4H), 1.20 (s, 8H), 0.86-0.81 (m, 3H), 0.76-0.70 (m, 2H), 0.24 (s, 6H);

$^{13}$C{$^1$H} NMR (101 MHz, C$_6$D$_6$) δ 156.85, 136.45, 133.00, 131.49, 126.65, 113.69, 94.21, 55.48, 34.08, 32.31, 29.71, 29.70, 24.40, 23.06, 16.59, 16.35, 14.33, −2.61.

I4-3. Preparation of (3-iodo-4-(methoxymethoxy)-5-methylphenyl)dimethyl(octyl)silane

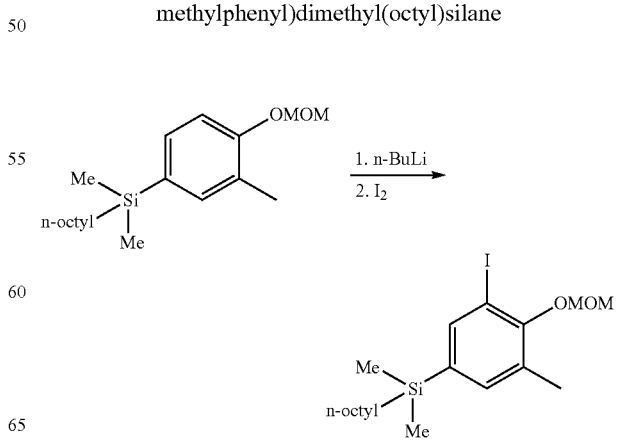

To a stirred and cooled (−2 to 0° C.) solution of (4-(methoxymethoxy)-3-methylphenyl)dimethyl(octyl)silane (18.0 g, 55.8 mmol) in THF (20 mL) was added a solution of 2.5 M n-BuLi in hexanes (31.3 mL, 78.1 mmol,) and the mixture was stirred for another 1 h at that temperature. A solution of iodine (19.9 g, 78.1 mmol) in THF (25 mL) was added drop-wise and the mixture was allowed to warm up to room temperature overnight. The reaction mixture was quenched with 10% aqueous sodium thiosulfate (15 mL) solution and diluted with Et$_2$O (70 mL). The organic phase was washed with brine, dried over anhydrous MgSO$_4$ and concentrated under reduced pressure to yield dark oil. This material was purified by column chromatography on SiO$_2$ using an ISCO CombiFlash system with hexane:Et$_2$O (0 to 6%) as eluant to yield 2 fractions containing the desired compound: Fraction-1, 4.24 g (88% pure) and Fraction-2, 17.15 g (97% pure):

$^1$H NMR (500 MHz, C$_6$D$_6$) δ 7.94 (s, 1H), 7.20 (s, 1H), 4.87 (s, 2H), 3.28 (s, 3H), 2.19 (s, 3H), 1.21 (bm, 12H), 0.87 (m, 3H), 0.64 (m, 2H), 0.12 (s, 6H);

$^{13}$C{$^1$H} NMR (126 MHz, C$_6$D$_6$) δ 157.16, 142.45, 138.17, 136.66, 132.72, 127.93, 127.83, 127.64, 127.55, 127.44, 99.75, 93.95, 79.76, 79.75, 57.00, 33.53, 31.93, 29.31, 29.25, 23.81, 22.70, 17.37, 15.48, 13.98, −3.34.

I4-4. Preparation of 4-(dimethyl(octyl)silyl)-2-iodo-6-methylphenol

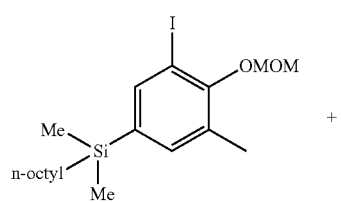

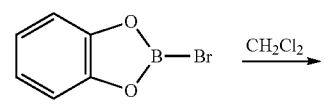

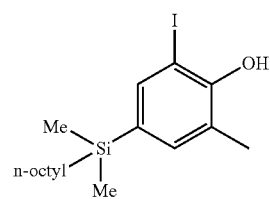

To a cooled (−60 to −65° C., dry ice acetone bath), stirred solution of the (3-iodo-4-(methoxymethoxy)-5-methylphenyl)dimethyl(octyl)silane (17.0 g, 37.9 mmol) in anhydrous CH$_2$Cl$_2$ (60 mL) was added a solution of 2-bromobenzo[d][1,3,2]dioxaborole (7.54 g, 37.9 mmol) in CH$_2$Cl$_2$ (30 mL) over a period of 1 h. The mixture was stirred for 1 h and was worked up by pouring into ice-cold sat. aq. NaHCO$_3$ solution. The organic layer was separated, dried and concentrated under reduced pressure to yield the crude product. The crude material was diluted with hexane and chromatographed on SiO$_2$ using an ISCO CombiFlash system with hexane: Et$_2$O (0-4%) as eluant to yield 12.3 g (80%) of the desired compound as colorless oil:

$^1$H NMR (500 MHz, C$_6$D$_6$) δ 7.68 (dd, J=1.4, 0.6 Hz, 1H), 7.18-7.03 (m, 1H), 5.15 (d, J=0.4 Hz, 1H), 2.15 (s, 3H), 1.34-1.14 (m, 12H), 0.86 (m, 3H), 0.70-0.58 (m, 2H), 0.13 (s, 6H);

$^{13}$C{$^1$H} NMR (126 MHz, C$_6$D$_6$) δ 153.71, 140.90, 136.67, 133.38, 124.83, 87.40, 33.54, 31.93, 29.32, 29.27, 23.85, 22.71, 16.79, 15.67, 13.98, −3.20.

I4-5. Preparation of I,3-bis(4-(dimethyl(octyl)silyl)-2-iodo-6-methylphenoxy)propane

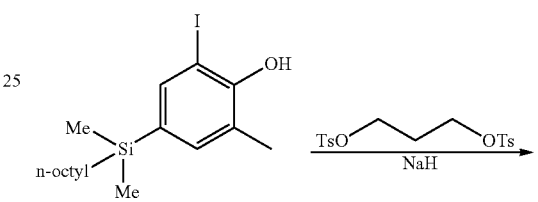

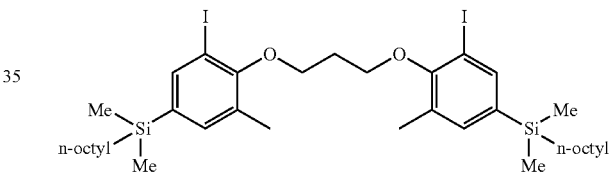

To a cooled, stirred solution of 4-(dimethyl(octyl)silyl)-2-iodo-6-methylphenol (12.0 g, 29.67 mmol) in DMF (30 mL) was added sodium hydride powder (0.78 g, 32.64 mmol, >95% dry solid) and stirred for 30 min after which propane-1,3-diyl bis(4-methylbenzenesulfonate) (5.48 g, 14.24 mmol) was added and the mixture heated to 55° C. for 16 h. The reaction mixture was diluted with water and extracted with CH$_2$Cl$_2$. The organic layer was dried and concentrated and the oil was chromatographed on SiO$_2$ using ISCO CombiFlash system with hexane: diethyl ether (0 to 6%) as eluant to yield the product as clear oil, 10.3 g (85%):

$^1$H NMR (400 MHz, CDCl$_3$) δ 7.71 (dd, J=1.5, 0.6 Hz, 2H), 7.23 (dd, J=1.6, 0.8 Hz, 2H), 4.15 (t, J=6.4 Hz, 4H), 2.47 (p, J=6.5 Hz, 2H), 2.36 (s, 6H), 1.37-1.20 (m, 24H), 0.92-0.85 (m, 6H), 0.76-0.66 (m, 4H), 0.23 (s, 12H);

$^{13}$C{$^1$H} NMR (101 MHz, C$_6$D$_6$) δ 158.42, 142.73, 138.23, 137.12, 132.36, 128.22, 127.98, 127.74, 94.02, 70.07, 33.90, 32.29, 31.92, 31.63, 29.68, 29.61, 24.18, 23.07, 23.01, 17.28, 15.87, 14.36, 14.32, −2.94.

HRMS (EI) m/z: Calcd for C$_{37}$H$_{62}$I$_2$O$_2$Si$_2$ (M+Na$^+$) 871.228, found 871.229.

I4-6. Preparation of I4 Ligand [2',2'''-(propane-1,3-diylbis(oxy))bis(3-(2,7-di-tert-butyl-9H-carbazol-9-yl)-5'-(dimethyl(octyl)silyl)-3'-methyl-5-(2,4,4-trimethylpentan-2-yl)-[1,1'-biphenyl]-2-ol)]

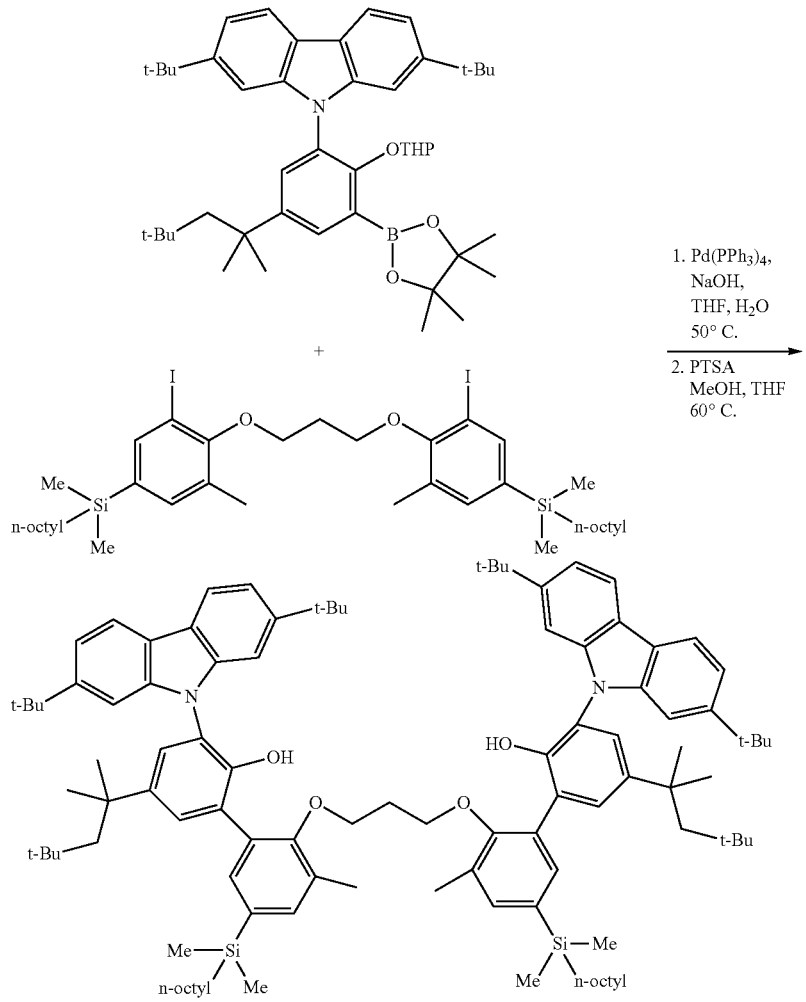

A three necked round bottom flask was equipped with a magnetic stir bar, septa, a condenser, and a nitrogen gas inlet. The flask was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (6.94 g, 10.0 mmol), a solution of NaOH (1.32 g, 33.1 mmol) in water (26 mL), THF (192 mL), and 1,3-bis(4-(dimethyl(octyl) silyl)-2-iodo-6-methylphenoxy)propane (4.01 g, 4.73 mmol). The reaction was placed under nitrogen atmosphere, purged with nitrogen for 45 min, and then Pd(PPh$_3$)$_4$ (0.390 g, 0.337 mmol) was added. The reaction was refluxed at 85° C. The reaction was monitored by high resolution mass spectrometry (HRMS) analysis for completion. Ultimately, after 15 h, the HRMS analysis showed some mono-coupled protected product and a very small amount of the bis-iodo fragment remaining. Therefore the reaction was determined to be complete and was allowed to cool to room temperature. The reaction was transferred to a separatory funnel for a phase separation. The phases were separated. The organic phase was dried over MgSO$_4$, filtered by vacuum filtration, and concentrated by rotary evaporation to afford a crude orange semi-solid (12.5 g). The solid was dissolved in a mixture of THF (128 mL) and isopropanol (26 mL). The reaction was heated at reflux 85° C. and PTSA monohydrate was added (0.184 g, 0.969 mmol). The reaction was monitored by $^1$H NMR analysis for completion. After 3 h, the $^1$H NMR analysis showed formation of the deprotected ligand with what appeared to be the protected ligand still remaining. Therefore additional PTSA monohydrate (0.192 g, 1.01 mmol) was added and the reaction stirred for an additional hour. After that hour, the $^1$H NMR analysis showed little to no progress. Therefore additional PTSA monohydrate (0.188 g, 0.990 mmol) was added and the reaction stirred for an additional hour. After that hour, the $^1$H NMR analysis still showed little to no progress. After a total of 5 h, the reaction was allowed to cool to room temperature. The reaction was concentrated by rotary evaporation to afford a crude orange solid (11.2008 g). The solid was analyzed by $^1$H NMR. The solid was dissolved in CHCl$_3$ and SiO$_2$ was added. The slurry was concentrated by rotary evaporation to afford a dry powdery mixture. The powdery mixture was loaded onto the ISCO CombiFlash system and was run using a 330 g RediSep High Performance Gold Column and a gradient of 20% CH$_2$Cl$_2$ in hexanes until the product eluted. The fractions were analyzed by TLC. The fractions containing the product were combined and concentrated by rotary evaporation to afford an off white crystalline solid. The solid was analyzed by $^1$H NMR which showed a mixture of the product with other impurities. The $^1$H NMR analysis showed that the ligand was not fully deprotected. The solid was dissolved in a mixture of THF (128 mL) and isopropanol (16 mL). The reaction was heated at reflux 85° C. (heating mantle temperature) and PTSA monohydrate was added (0.316 g, 1.66 mmol) was added. The reaction was sampled for $^1$H NMR analysis for completion. After 1.5 h, the $^1$H NMR analysis still showed the protected ligand still remaining. Therefore additional PTSA monohydrate (0.183 g, 0.959 mmol) was added and the reaction stirred for an additional 1.5 h. After that 1.5 h, the $^1$H NMR analysis showed little to no progress. After 4 h, the 1H NMR analysis showed little to no progress. The ligand would not fully deprotect. The reaction was allowed to cool to room temperature. The reaction was transferred to a separatory funnel, diluted with Et$_2$O (50 mL), and washed with sat. aq. NaHCO$_3$ (75 mL). The phases were separated. The organic phase was dried over MgSO$_4$, filtered by vacuum filtration, and concentrated by rotary evaporation to afford a crude off white solid (3.25 g). The solid was analyzed by $^1$H NMR. The oil was dissolved in THF and CELITE was added. The slurry was concentrated by rotary evaporation to afford a dry powdery mixture in preparation for reverse phase purification. The powdery mixture was loaded onto the ISCO CombiFlash system and was run using a C18 415 g Gold Column and a slow gradient of 70-90% THF in water until the product eluted. The fractions were run on the liquid chromatograph (LC) to find the product. The fractions containing the product were combined and concentrated by rotary evaporation to afford a mixture of water with a yellow oil. The mixture was transferred to a separatory funnel and CH$_2$Cl$_2$ was added. The phases were separated. The organic phase was dried over MgSO$_4$, filtered by vacuum filtration, and concentrated by rotary evaporation to afford an off white crystalline solid (3.20 g). The solid was analyzed by $^1$H NMR which showed a mixture of the product with an impurity. The solid was dissolved in hexanes and CELITE was added. The slurry was concentrated by rotary evaporation to afford a dry powdery mixture in preparation for diol column purification. The powdery mixture was loaded onto the ISCO CombiFlash system and was run using a Diol 415 g Gold Column and a gradient of 0-5% Et$_2$O in hexanes until the product eluted. The fractions containing the product were combined and concentrated by rotary evaporation to afford an off white crystalline solid. The solid was analyzed by $^1$H NMR which showed that the impurity had been removed and a clean product remained. The solid was placed under high vacuum to afford 1.70 g (23%) of the desired compound as an off white crystalline solid:

$^1$H NMR (400 MHz, C$_6$D$_6$) δ 8.11 (d, J=8.2 Hz, 4H), 7.69-7.70 (m, 4H), 7.49 (d, J=2.5 Hz, 2H), 7.48 (d, J=1.6 Hz, 4H), 7.38 (dt, J=8.2, 1.2 Hz, 4H), 7.30 (d, J=1.5 Hz, 2H), 6.54 (s, 2H), 3.87 (t, J=6.3 Hz, 4H), 1.96 (s, 6H), 1.96-1.90 (m, 2H), 1.63 (s, 4H), 1.44-1.25 (m with a s at 1.29, 73H), 0.96-0.90 (m, 3H), 0.89 (s, 18H), 0.79-0.72 (m, 4H), 0.26 (s, 9H);

$^{13}$C{$^1$H} NMR (101 MHz, C$_6$D$_6$) δ 155.61, 149.26, 148.95, 142.90, 142.64, 136.87, 136.25, 136.13, 131.33, 131.29, 129.96, 125.93, 121.87, 120.08, 118.16, 106.95, 71.00, 57.25, 38.32, 35.20, 34.11, 32.67, 32.33, 32.14, 31.96, 31.75, 31.54, 29.75, 24.40, 23.07, 16.40, 16.08, 14.35, −2.79;

$^1$H RMS (EI) m/z: Calcd for C$_{105}$H$_{15}$N$_2$O$_4$Si$_2$$^+$ (M+H$^+$) 1560.121, found 1560.128.

I4-7. Preparation of Inventive Catalyst I4

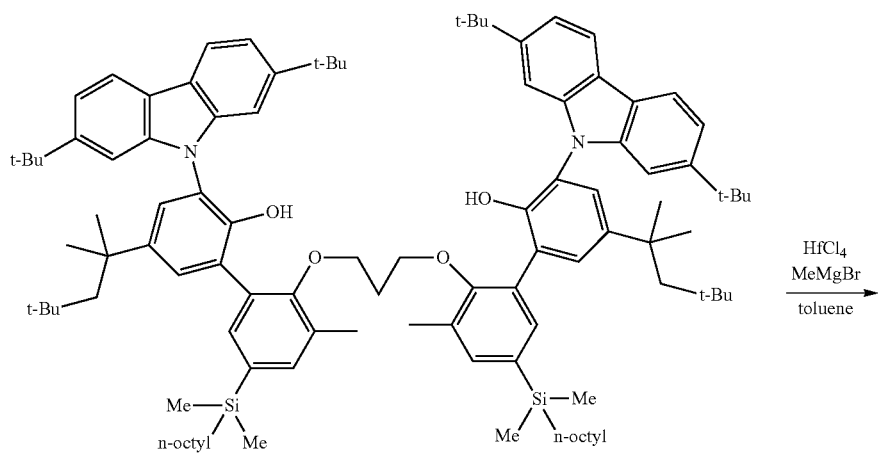

-continued

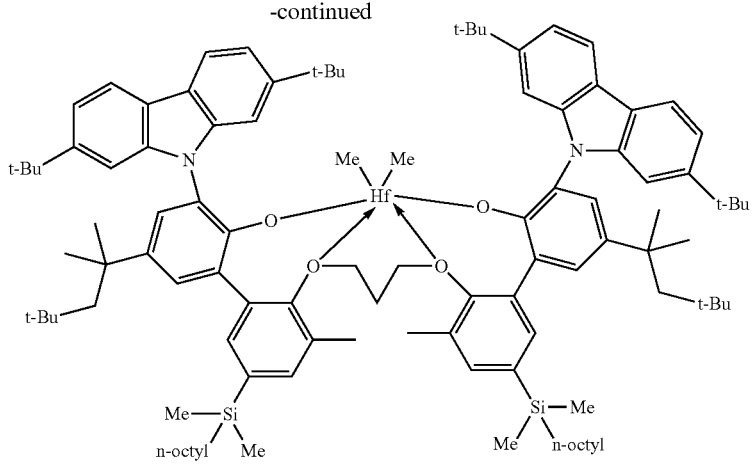

Reaction was set up in a glove box under nitrogen atmosphere. A jar was charged with HfCl$_4$ (0.483 g, 1.51 mmol) and toluene (60 mL). To the stirring slurry was added 3.0 M MeMgBr in Et$_2$O (2.2 mL, 6.6 mmol) at room temperature. The mixture was stirred strongly for 5 min. The solid went in solution but the reaction solution was cloudy and brown. To the mixture was added the ligand (2.34 g, 1.50 mmol) as a toluene solution (7 mL). The resulting brown mixture was stirred at room temperature for 2.5 h. To the mixture was added hexanes (60 mL) and filtered. The pale brown solution was concentrated under vacuum to afford the crude Hf-complex as a pale brown solid. $^1$H-NMR of the crude product showed that desired complex was obtained but impure. To the solid was added hexanes (15 mL) and stirred for about 30 min. The white solid was collected by vacuum filtration and dried under high vacuum to afford 1.10 g of the pure complex (crop 1) as shown by the $^1$H-NMR. The mother liquor was concentrated under vacuum to give a brown solid. To the solid was added hexanes (5 mL) and stirred for 1.5 h. The white solid was collected by vacuum filtration and dried under high vacuum to afford 0.166 g of the pure complex (crop 2) as shown by the $^1$H-NMR. The mother liquor, a brown mixture, was heated at 70° C. for 20 min in attempt to dissolved solids. Homogeneous solution was not observed. The solution was removed from the heating and allowed to cool to room temperature. The off white solid was collected by vacuum filtration and dried under high vacuum to afford 0.140 g of the pure complex (crop 3) as shown by the $^1$H-NMR. Overall yield of the desired compound (1.40 g, 53%):

$^1$H NMR (500 MHz, C$_6$D$_6$) δ 8.19 (d, J=8.2 Hz, 2H), 8.01 (d, J=1.7 Hz, 2H), 7.99 (d, J=8.3 Hz, 2H), 7.89 (d, J=2.6 Hz, 2H), 7.74 (d, J=1.6 Hz, 2H), 7.64 (d, J=2.6 Hz, 2H), 7.55 (d, J=1.7 Hz, 2H), 7.51 (dd, J=8.2, 1.6 Hz, 2H), 7.30 (dd, J=8.2, 1.7 Hz, 2H), 7.06 (dd, J=1.6, 0.8 Hz, 2H), 3.68 (dt, J=9.9, 4.8 Hz, 2H), 3.43 (dt, J=10.4, 5.4 Hz, 2H), 1.79 (d, J=14.4 Hz, 2H), 1.67 (d, J=14.3 Hz, 2H), 1.60 (s, 18H), 1.47 (s, 6H), 1.45-1.38 (m, 8H), 1.38-1.18 (m, 48H), 0.93 (m, 24H), 0.64-0.56 (m, 4H), 0.10 (s, 6H), 0.08 (s, 6H), −0.82 (s, 6H);

$^{13}$C{$^1$H} NMR (101 MHz, C$_6$D$_6$) δ 154.28, 154.11, 149.23, 147.75, 142.33, 141.59, 140.13, 138.99, 137.45, 136.25, 133.59, 132.00, 131.96, 126.54, 123.46, 120.86, 120.29, 119.71, 118.78, 117.41, 109.74, 107.94, 75.70, 57.88, 50.26, 38.27, 35.44, 35.20, 34.01, 33.20, 32.76, 32.36, 32.02, 31.97, 31.63, 30.32, 30.09, 29.77, 29.74, 24.31, 23.09, 16.42, 15.86, 14.38, −3.06, −3.20.

Solubility Measurement of I4:

To 72.3 mg of the solid in a vial was added 0.9 mL of ISOPAR E. The solution was stirred for about 1 h. The mixture was filtered and the solution was weighted (0.2934 g). The filtrate was concentrated under high vacuum to afford 0.0061 g of the solid resulting in 2.08% w/w solubility.

Inventive Catalyst I5

I5-1. Preparation of 4-(2,4,4-trimethylpentan-2-yl)phenyl trifluoromethanesulfonate (using the method described in Han, Xiaoqing; Zhang, Yanzhong; Wang, Kung K. *J. Org. Chem.* 2005, 70, 2406-2408)

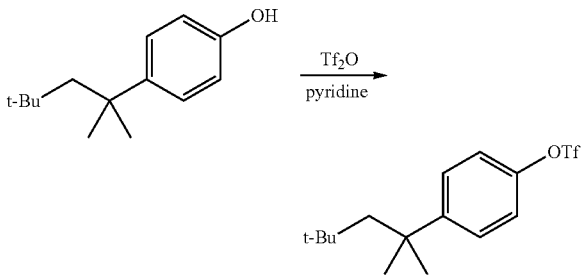

A three-necked round bottom flask was equipped with a magnetic stir bar, septa, and a nitrogen gas inlet. The flask was placed under nitrogen atmosphere and was charged with 4-(2,4,4-trimethylpentan-2-yl)phenol (15.0 g, 68.1 mmol) and pyridine (40 mL) dried over molecular sieves. The solution was cooled to 0° C. (ice water bath). Trifluoromethanesulfonic anhydride (TfO$_2$) (20 mL, 119 mmol) was added drop-wise to the solution. Some solid precipitated during the addition. The reaction was allowed to warm up to room temperature and was stirred at room temperature overnight. After 19 h, the reaction was monitored by $^1$H NMR for completion. The reaction was poured into a flask containing a 1:1 mixture of water (150 mL) and Et$_2$O (150 mL). The mixture was transferred to a separatory funnel and the phases were separated. The organic phase was washed with water (150 mL) and then 5% HCl (150 mL). The organic phase was then dried over MgSO$_4$, filtered by vacuum filtration, and concentrated by rotary evaporation to afford 22.8 g (98%) of the desired compound as a crude yellow oil:

$^1$H NMR (500 MHz, CDCl$_3$) δ 7.43 (d, J=9.1 Hz, 2H), 7.17 (d, J=8.9 Hz, 2H), 1.74 (s, 2H), 1.37 (s, 6H), 0.70 (s, 9H);

$^{13}$C{$^1$H} NMR (101 MHz, CDCl$_3$) δ 150.82, 147.34, 127.91, 120.40, 56.99, 38.62, 32.35, 31.72, 31.42.

I5-2. Preparation 4,4'-di-tert-octyl-1,1'-biphenyl

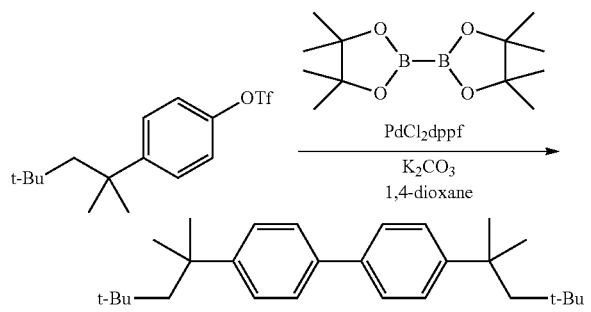

In a glove box, a three necked round bottom flask equipped with a magnetic stir bar and septa was charged with the aryltriflate (23.4 g, 69.3 mmol), bis(pinacolato) diboron (8.80 g, 34.6 mmol), anhydrous K$_2$CO$_3$ (28.7 g, 208 mmol), [1,1'-bis(diphenylphosphino)ferrocene]dichloropalladium(II), CH$_2$Cl$_2$ adduct (2.27 g, 2.78 mmol), and anhydrous 1,4-dioxane (360 mL). The flask was taken to the hood and was equipped with a condenser and a nitrogen gas inlet. The reaction was placed under nitrogen atmosphere, heated at 80° C. The reaction was monitored by GC/MS. Additional [1,1'-bis(diphenylphosphino)ferrocene]dichloropalladium (II), CH$_2$Cl$_2$ adduct was added after 24 h (2.2670 g, 2.78 mmol), and 42 h (2.27 g, 2.78 mmol). After 66 h total, completion was not achieved. The reaction was allowed to cool to room temperature and was filtered via vacuum filtration. The solids were washed with three 50-mL portions of CH$_2$Cl$_2$. The filtrate was concentrated by rotary evaporation and was then dissolved in EtOAc (250 mL). The solution was transferred to a separatory funnel and was washed with water (360 mL). An emulsion formed. Small amounts of aqueous sodium chloride solution were added until the emulsion finally broke. The phases were separated and the organic phase was washed with a 25% aqueous NaOH solution (360 mL). The phases were separated. The organic phase was dried over MgSO$_4$, filtered by vacuum filtration and concentrated by rotary evaporation to afford a crude black solid. The crude solid was stirred in acetone for about 30 min and then placed in the freezer overnight. The solids were filtered by vacuum filtration and washed with three 15-mL portions of cold acetone. The black solids were dissolved in CHCl$_3$ and filtered through a pad of SiO$_2$. The SiO$_2$ was washed with hexanes to remove any product that remained. The filtrate was concentrated by rotary evaporation to afford an off white solid. To remove traces of acetone, the solid was dissolved in CH$_2$Cl$_2$ and concentrated by rotary evaporation to afford an off white solid (repeated twice). The solid was dried under high vacuum to afford 5.88 g (45%) of the desired compound:

$^1$H NMR (500 MHz, CDCl$_3$) δ 7.53 (d, J=8.1 Hz, 4H), 7.42 (d, J=8.2 Hz, 4H), 1.77 (s, 4H), 1.42-1.37 (m, 12H), 0.74 (s, 18H);

$^{13}$C{$^1$H} NMR (101 MHz, CDCl$_3$) δ 149.09, 137.83, 126.62, 126.28, 57.11, 38.57, 32.57, 32.00, 31.72.

I5-3. Preparation of 4,4'-di-tert-octyl-2-nitro-1,1'-biphenyl

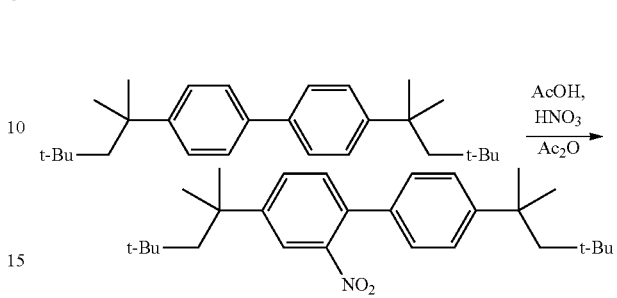

A three-necked round bottom flask was equipped with a magnetic stir bar, a thermowell, an addition funnel, septa, and a nitrogen gas inlet. The flask was placed under nitrogen atmosphere and was charged with 4,4'-di-tert-octyl-1,1'-biphenyl (5.00 g, 13.2 mmol) and acetic anhydride (Ac$_2$O) (71 mL). To the stirred mixture was added CHCl$_3$ (30 mL). The reaction was cooled using an ice water bath (internal temperature 5.3° C.). A mixture of nitric acid (HNO$_3$), 90% (1.4 mL, 29.6 mmol) and acetic acid (AcOH) (2.2 mL, 38.4 mmol) was added drop-wise to the cooled reaction (internal temperature monitored not to exceed 10° C.). The mixture was allowed to warm up to room temperature and was stirred at room temperature for 3.5 h. The reaction was monitored by GC/MS. After 3.5 h the reaction was determined to be complete. The reaction was added to a beaker of ice water (350 mL), mostly ice, and was stirred for 1.5 h. The mixture was transferred to a separatory funnel for a phase separation and CHCl$_3$ (30 mL) was added. The phases were separated. The organic phase was washed with two 55-mL portions of water, dried over MgSO$_4$, filtered by vacuum filtration, and concentrated by rotary evaporation to afford the crude product as a yellow oil. The oil was dissolved into a small amount of hexanes and was purified by column chromatography on the Isco CombiFlash system using a 330 g Grace column and a gradient of 5-10% CH$_2$Cl$_2$ in hexanes until the product eluted. The pure fractions were combined and concentrated by rotary evaporation to afford the product as a yellow oil. To remove traces of hexanes, the oil was dissolved in CH$_2$Cl$_2$ and concentrated by rotary evaporation to afford yellow oil (repeated twice). The oil was dried under high vacuum to afford 4.80 g (86%) of the desired compound:

$^1$H NMR (400 MHz, CDCl$_3$) δ 7.80 (d, J=2.0 Hz, 1H), 7.59 (dd, J=8.1, 2.0 Hz, 1H), 7.41 (d, J=8.4 Hz, 2H), 7.35 (d, J=8.1 Hz, 1H), 7.23 (d, J=8.3 Hz, 2H), 1.80 (s, 2H), 1.76 (s, 2H), 1.42 (s, 6H), 1.39 (s, 6H), 0.77 (s, 9H), 0.74 (s, 9H);

$^{13}$C{$^1$H} NMR (101 MHz, CDCl$_3$) δ 151.03, 149.99, 149.12, 134.16, 133.14, 131.19, 129.93, 127.31, 126.40, 121.62, 57.05, 56.63, 38.73, 38.48, 32.39, 32.38, 31.86, 31.75, 31.39, 31.26.

I5-4. Preparation of 2,7-di-tert-octyl-9H-carbazole

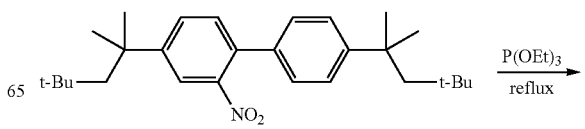

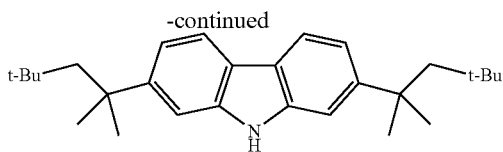

In a glove box, a three-necked round bottom flask equipped with a magnetic stir bar was charged with 4,4'-di-tert-octyl-2-nitro-1,1'-biphenyl (7.41 g, 17.5 mmol) and triethylphosphite (P(OEt)$_3$) (21 mL, 122 mmol). The flask was equipped with septa and transfer to a hood on where it was equipped with a condenser and a nitrogen gas inlet. The yellow solution was placed under nitrogen atmosphere and was heated at reflux (175° C.) for 4 h. The reaction was monitored by GC/MS analysis. After 4 h, the reaction was allowed to cool to room temperature. The yellow solution was transferred to a one-necked round bottom flask equipped with a magnetic stir bar and a short path distillation head. Excess triethylphosphite was removed by distillation under high vacuum. The mixture was heated from 75 to 125° C. until no further distillation occurred. The mixture was allowed to cool to room temperature and a thick yellow oil remained. A 1:1 solution of MeOH (32 mL) and ice water (32 mL) was added to the oil followed by CH$_2$Cl$_2$ (59 mL). Once the oil dissolved the mixture was transferred to a separatory funnel for a phase separation. A small emulsion formed between the two phases therefore CH$_2$Cl$_2$ was slowly added until the emulsion separated. The phases were separated. The organic phase was dried over MgSO$_4$, filtered by vacuum filtration, and concentrated by rotary evaporation to afford the crude product as a thick yellow oil. The oil was dissolved in a small amount of hexanes and EtOAc. The yellow solution was loaded onto the ISCO CombiFlash system using a 330 g Grace column and a gradient of 2-10% CH$_2$Cl$_2$ in hexanes until the product eluted. The pure fractions were combined and concentrated by rotary evaporation to afford an off white solid. To remove traces of hexanes, the solid was dissolved in CH$_2$Cl$_2$ and concentrated by rotary evaporation to afford the product as an off white solid (repeated twice). The solid was dried under high vacuum to afford 4.43 g (65%) of the desired compound:

$^1$H NMR (400 MHz, CDCl$_3$) δ 8.00 (d, J=8.3 Hz, 2H), 7.85 (s, 1H), 7.46 (d, J=1.2 Hz, 1H), 7.35 (dd, J=8.3, 1.6 Hz, 2H), 1.92 (s, 4H), 1.54 (s, 12H), 0.81 (s, 18H);

$^{13}$C{$^1$H} NMR (101 MHz, CDCl$_3$) δ 147.87, 139.93, 120.82, 119.14, 118.32, 107.93, 57.25, 38.94, 32.42, 32.04, 31.80.

I5-5. Preparation of 9-(2-((tetrahydro-2H-pyran-2-yl)oxy)-5-(2,4,4-trimethylpentan-2-yl)phenyl)-2,7-bis(2,4,4-trimethylpentan-2-yl)-9H-carbazole

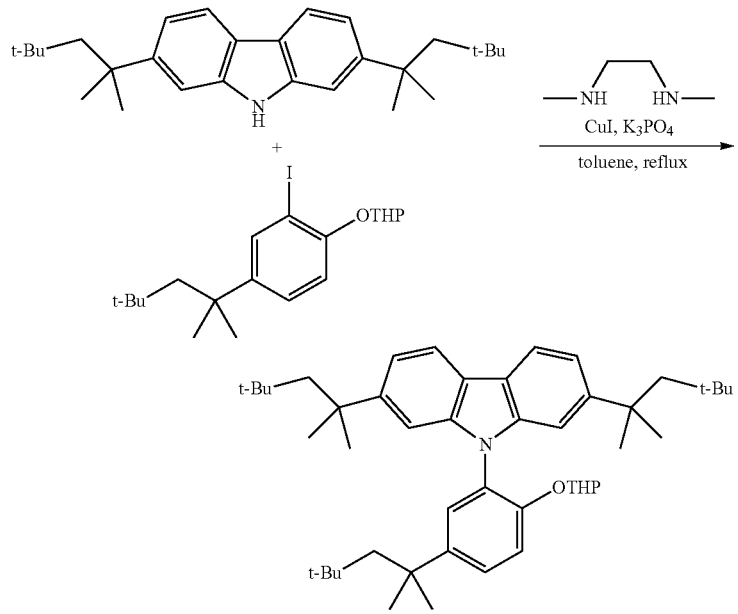

In a glove box, a three-necked round bottom flask equipped with a magnetic stir bar and septa was charged with 2,7-di-tert-octyl-9H-carbazole (6.79 g, 17.3 mmol), 2-(2-iodo-4-(2,4,4-trimethylpentan-2-yl)phenoxy)tetrahydro-2H-pyran (10.5 g, 31.7 mmol), K$_3$PO$_4$ (14.4 g, 34.7 mmol), and dried toluene (44 mL). A mixture of anhydrous CuI (0.112 g, 0.589 mmol), N,N'-dimethylethylenediamine (0.243 mL, 2.25 mmol), and anhydrous toluene (1 mL) was added to the flask. The flask was taken out of the glove box to the hood and was equipped with a condenser and a nitrogen gas inlet. The reaction was placed under nitrogen atmosphere and was heated at 125° C. for 163 h. The reaction was monitored by ultra performance liquid chromatography (UPLC) analysis throughout that time: Additional reagents were added after 24 h [CuI (0.113 g, 0.593 mmol) slurried in dried toluene (1 mL) and N,N'-dimethylethylenediamine (0.243 mL, 2.25 mmol)]; after 48 h, [CuI (0.111 g, 0.585 mmol) slurried in dried toluene (1 mL) and N,N'-dimethylethylenediamine (0.243 mL, 2.25 mmol)], and after 72 h [CuI (0.110 g, 0.577 mmol) slurried in dried toluene (1 mL) and N,N'-dimethylethylenediamine (0.243 mL, 2.25 mmol)] due to starting carbazole remaining. After 163 h, the reaction was allowed to cool to room temperature. The reaction mixture was filtered by vacuum filtration through a small SiO$_2$ plug. The plug was washed with three 20-mL portions of THF. The filtrate was concentrated by rotary evaporation to afford a crude reddish-brown oil. The oil was stirred and placed under vacuum for 5-10 min to remove excess toluene. The resulting brown solids (13.7 g) were triturated in hot $CH_3CN$ and were stirred for 5-10 min. The slurry was allowed to cool to room temperature and was placed in the freezer. The solids were scraped off the sides of the flask, filtered by vacuum filtration, and wash with three 10-mL portions of cold $CH_3CN$. To remove traces of $CH_3CN$, the solid was dissolved in $CH_2Cl_2$ and concentrated by rotary evaporation to afford a light brown crystalline solid (repeated twice). The solid was dried under high vacuum to afford 11.5 g (98%) of the desired compound:

$^1$H NMR (400 MHz, $CDCl_3$) δ 7.99 (d, J=8.2 Hz, 2H), 7.50 (dd, J=8.6, 2.5 Hz, 1H), 7.46 (d, J=2.4 Hz, 1H), 7.37 (d, J=8.6 Hz, 1H), 7.30 (dt, J=8.3, 1.4 Hz, 2H), 7.14 (d, J=1.5 Hz, 1H), 7.07 (d, J=1.5 Hz, 1H), 5.26 (t, J=2.6 Hz, 1H), 3.62 (td, J=11.0, 2.8 Hz, 1H), 3.41 (dt, J=11.2, 3.9 Hz, 1H), 1.86-1.73 (m, 6H), 1.43 (s, 6H), 1.41-1.38 (m, 12H), 1.26-1.17 (m, 2H), 1.13 (dp, J=8.7, 4.4, 3.9 Hz, 2H), 0.82 (s, 9H), 0.71 (s, 9H), 0.70 (s, 9H);

$^{13}C\{^1H\}$ NMR (101 MHz, $CDCl_3$) δ 151.33, 147.56, 147.39, 144.39, 142.09, 142.06, 128.13, 126.85, 126.84, 120.57, 120.52, 118.78, 118.76, 118.15, 118.10, 117.05, 107.51, 107.48, 97.04, 61.49, 57.23, 57.16, 57.08, 38.95, 38.92, 38.20, 32.54, 32.44, 32.37, 32.34, 31.84, 31.75, 31.74, 31.69, 31.66, 31.58, 31.52, 29.90, 24.93, 17.78.

I5-6. Preparation of 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(2,4,4-trimethylpentan-2-yl)-9H-carbazole

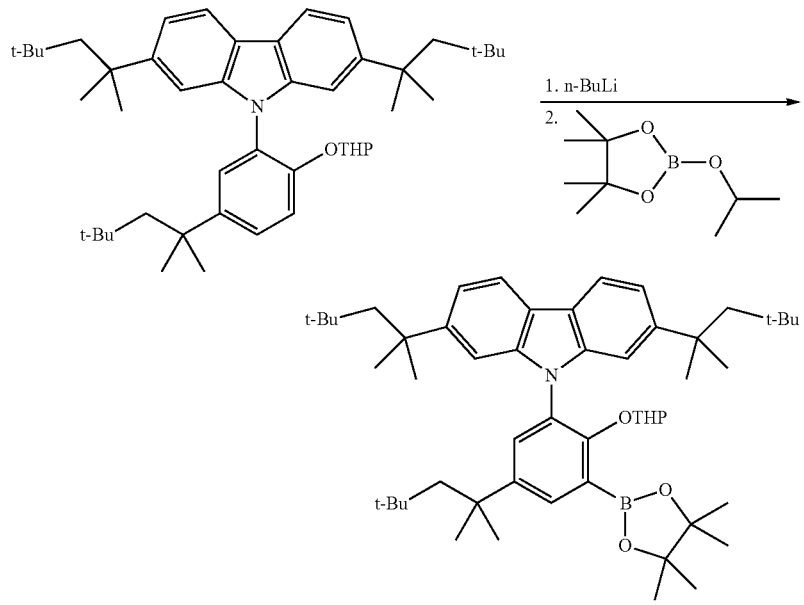

In a glove box, a three-necked round bottom flask equipped with a magnetic stir bar and septa was charged with 9-(2-((tetrahydro-2H-pyran-2-yl)oxy)-5-(2,4,4-trimethylpentan-2-yl)phenyl)-2,7-bis(2,4,4-trimethylpentan-2-yl)-9H-carbazole (11.1 g, 16.3 mmol) and dried THF (105 mL). The flask was transferred to the hood and was equipped with a nitrogen gas inlet. The reaction was placed under nitrogen atmosphere and was cooled to 0-10° C. (ice water bath) for 15 min. A solution of 2.5M n-BuLi in hexanes (16.8 mL, 42.0 mmol) was slowly added via syringe. The brown solution turned to a murky solution and then to an orange slurry. After stirring for 4 h at 0-10° C., PinBOi-Pr (8.5 mL, 41.7 mmol) was slowly added via syringe. The orange slurry turned to an orange murky solution. The reaction stirred for 1 h at 0-10° C. before allowing the reaction to warm up to room temperature and continued to stir overnight. A cold solution of sat. aq. $NaHCO_3$ (92 mL) was added to the resulting orange solution. The mixture was transferred to a separatory funnel. The phases were separated and the aqueous phase was extracted with three 64-mL portions of $CH_2Cl_2$. The organic phases were combined and washed with cold aqueous sodium bicarbonate (242 mL), and then brine (242 mL). The organic phase was dried over $MgSO_4$, filtered by vacuum filtration, and concentrated by rotary evaporation to afford the product as a crude orange sticky solid. The crude solid was dried under vacuum for 30 min to 1 h. $CH_3CN$ (42 mL) was added to the sticky solid and was placed in the freezer overnight. The solids were scraped off the sides of the flask and the resulting slurry was stirred for 30 min before isolating the light orange solids by vacuum filtration. The powdery solids were washed with five 10-mL portions of cold $CH_3CN$. To remove traces of $CH_3CN$, the white solids were dissolved in $CH_2Cl_2$ and concentrated by rotary evaporation to afford a light orange crystalline solid (repeated twice). The solid was dried under high vacuum to afford 11.5 g (88%) of the desired compound:

$^1$H NMR (400 MHz, $CDCl_3$) δ 7.97 (dd, J=8.2, 1.2 Hz, 2H), 7.85 (d, J=2.6 Hz, 1H), 7.50 (d, J=2.6 Hz, 1H), 7.30 (ddd, J=8.3, 3.2, 1.6 Hz, 2H), 7.23 (d, J=1.5 Hz, 1H), 7.18 (d, J=1.5 Hz, 1H), 5.01 (t, J=2.7 Hz, 1H), 2.87 (td, J=10.8, 2.9 Hz, 1H), 2.72 (dt, J=11.0, 3.7 Hz, 1H), 1.81 (s, 3H), 1.78 (d, J=15.0 Hz, 2H), 1.75 (d, J=15.0 Hz, 2H), 1.42 (d, J=8.6 Hz, 30H), 0.81 (s, 9H), 0.74-0.70 (m, 21H);

$^{13}C\{^1H\}$ NMR (101 MHz, $CDCl_3$) δ 156.40, 147.56, 147.49, 145.59, 141.63, 133.44, 130.39, 129.39, 120.67, 120.39, 118.65, 118.62, 118.06, 118.01, 108.34, 107.97, 101.23, 83.52, 61.26, 57.09, 57.07, 57.06, 38.95, 38.34, 32.48, 32.36, 32.05, 32.01, 31.89, 31.80, 31.78, 31.74, 31.69, 31.11, 29.84, 25.01, 24.99, 24.89, 18.17.

I5-7. Preparation of I5 Ligand

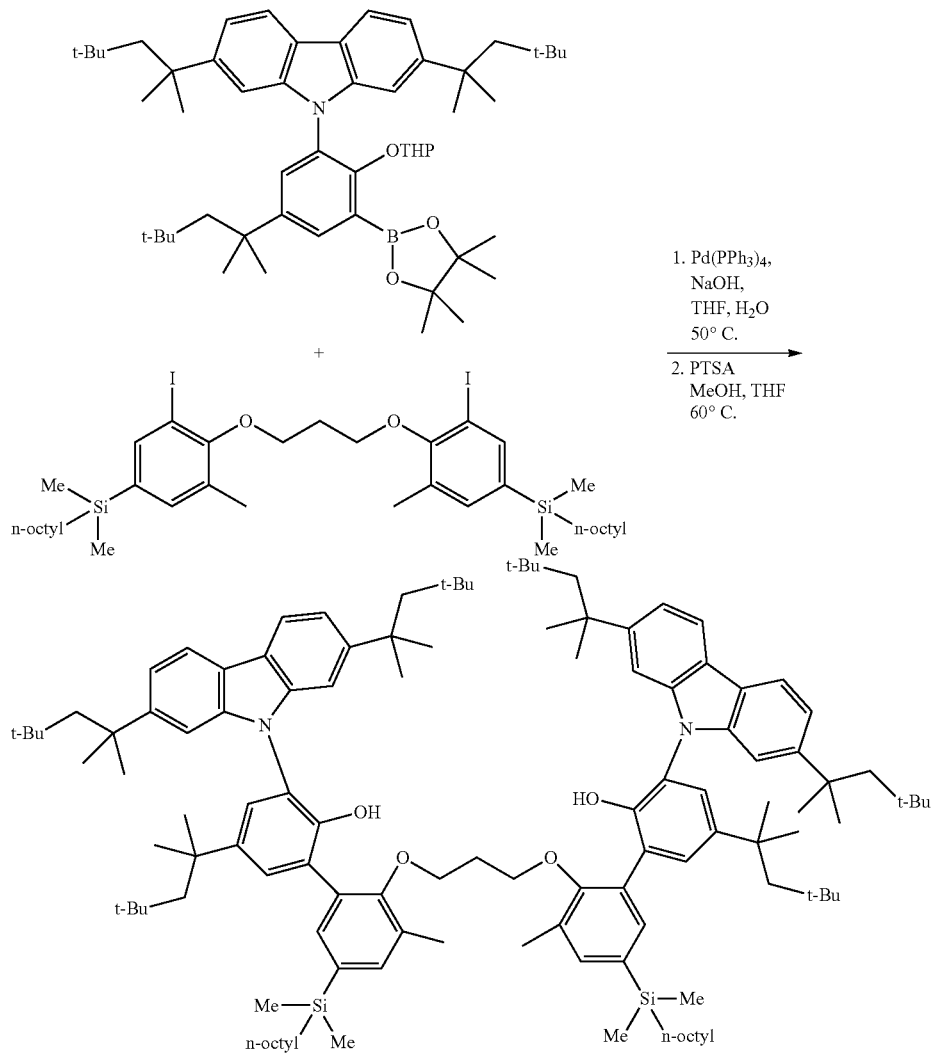

To a two-necked round bottom flask equipped with a magnetic stir bar, a reflux condenser, nitrogen inlet and a rubber septum was added 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(2,4,4-trimethylpentan-2-yl)-9H-carbazole (2.61 g, 3.24 mmol), a solution of NaOH (0.41 g, 10.38 mmol) in water (8 mL), THF (60 mL) and 1,3-bis(4-(dimethyl(octyl)silyl)-2-iodo-6-methylphenoxy)propane (1.25 g, 1.47 mmol). The solution was stirred and purged with nitrogen for 30 min and a solution of tetrakis(triphenylphosphine)palladium(0) (0.119 g, 0.103 mmol) in THF was added and the mixture was heated to reflux for 24 h. The reaction mixture was worked up by diluting with Et$_2$O and washing with brine. The Et$_2$O layer was dried over anhydrous MgSO$_4$, filtered and the filtrate was concentrated under reduced pressure to yield the crude product. The product was dissolved in THF (40 mL) and isopropanol (5 mL), and PTSA monohydrate (160 mg) was added. The mixture was heated to reflux for 4 h. The mixture was diluted with Et$_2$O and washed with sat. aq. NaHCO$_3$. The Et$_2$O layer was separated, dried over anhydrous MgSO$_4$ and filtered. The filtrate was concentrated under reduced pressure to yield the crude product. The product was purified by chromatography on SiO$_2$ using ISCO with a gradient of 0 to 12% hexane and Et$_2$O as eluant to yield 2.88 g of a colorless oil, which by LC was still a mixture of materials. This mixture was subjected to reverse phase chromatography using ISCO with a gradient of 55 to 100% THF in water to yield 1.02 g of colorless oil. The NMR spectra indicated still mixture of materials and hence were subjected to chromatography on Diol-based SiO$_2$ column with hexane:Et$_2$O as eluant to yield 0.478 g (18%) of the desired compound:

$^1$H NMR (400 MHz, C$_6$D$_6$) δ 8.06 (d, J=8.2 Hz, 4H), 7.68 (d, J=2.4 Hz, 2H), 7.66 (d, J=1.6 Hz, 2H), 7.48 (d, J=2.4 Hz, 2H), 7.45 (d, J=1.5 Hz, 4H), 7.36 (dd, J=8.3, 1.5 Hz, 4H), 7.31 (s, 2H), 6.45 (s, 2H), 3.92 (t, J=6.3 Hz, 4H), 2.01 (s, 6H), 1.96 (p, J=6.3 Hz, 2H), 1.82 (d, J=14.6 Hz, 4H), 1.75 (d, J=14.5 Hz, 4H), 1.65 (s, 4H), 1.48-1.24 (m, 54H), 0.95-0.90 (t with s, 24H), 0.79 (s with m, 40H), 0.26 (s, 12H);

$^{13}$C{$^1$H} NMR (101 MHz, C$_6$D$_6$) δ 155.30, 148.47, 147.74, 142.42, 142.12, 136.46, 135.78, 135.68, 130.83, 130.81, 129.50, 125.42, 121.42, 119.39, 118.71, 107.57, 70.57, 56.98, 56.83, 38.82, 37.93, 33.75, 32.31, 32.26, 32.18, 31.97, 31.85, 31.71, 31.44, 29.39, 24.02, 22.71, 16.19, 15.71, 14.01, −3.14;

HRMS (EI) m/z: Calcd for $C_{121}H_{183}N_2O_4Si_2$ (M+H$^+$) 1784.364, found 1784.376.

I5-8. Preparation of I5

1.6 Hz, 2H), 7.08 (d, J=1.6 Hz, 2H), 3.74 (dt, J=9.9, 4.8 Hz, 2H), 3.47 (dt, J=10.5, 5.4 Hz, 2H), 2.06 (d, J=14.6 Hz, 2H), 2.01 (d, J=14.6 Hz, 2H), 1.86 (d, J=14.7 Hz, 2H), 1.78 (d, J=14.4 Hz, 2H), 1.71-1.60 (m, 16H), 1.56 (s, 6H), 1.48-1.19 (m, 52H), 1.02 (s, 18H), 0.95 (t, J=6.9 Hz, 6H), 0.92 (s, 18H), 0.66 (s, 18H), 0.60 (q, J=5.0 Hz, 4H), 0.09 (s, 6H), 0.08 (s, 6H), −0.71 (s, 6H);

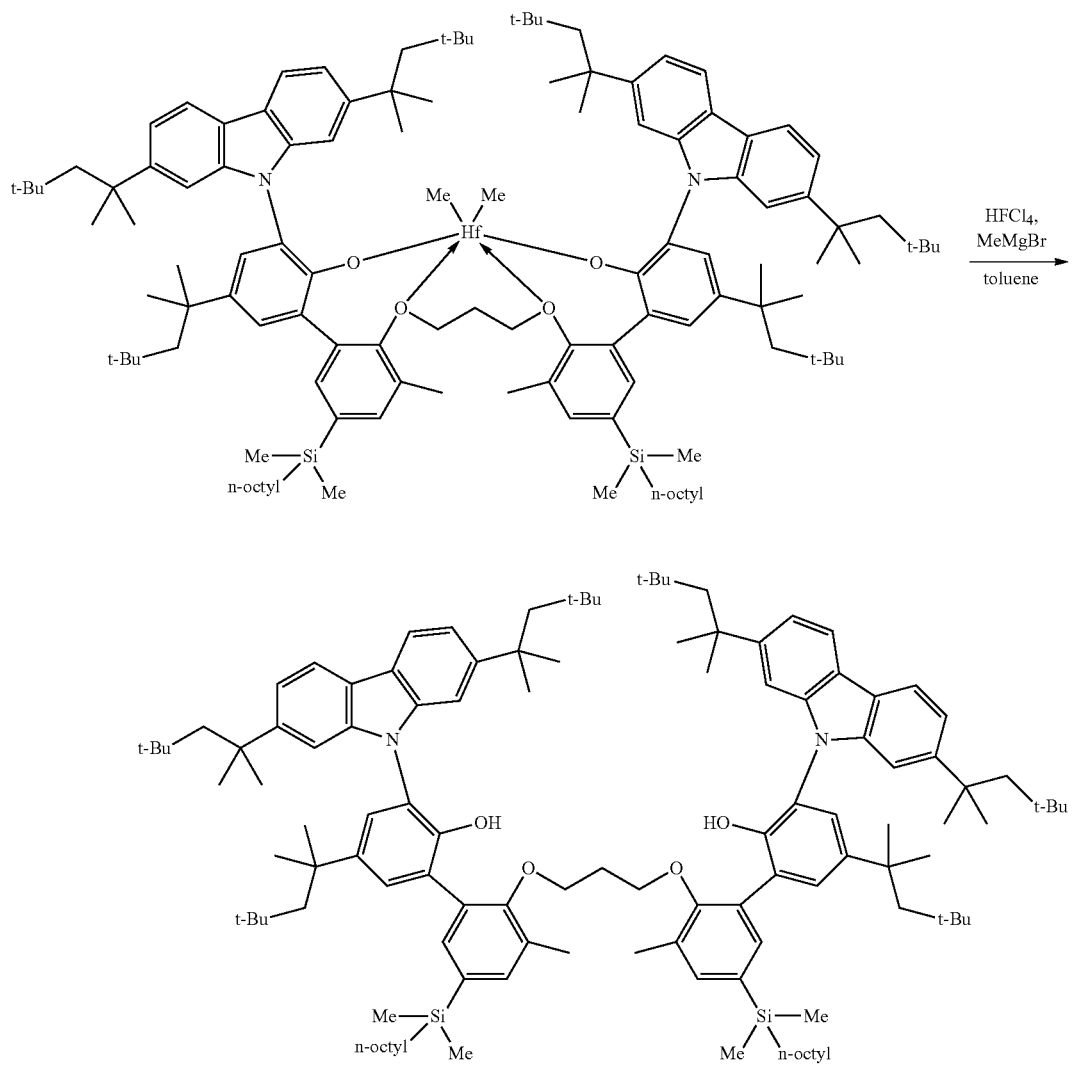

Reaction was set up in a glove box under nitrogen atmosphere. A jar was charged with HfCl$_4$ (0.155 g, 0.485 mmol) and toluene (30 mL). To the stirring slurry was added 3.0 M MeMgBr in Et$_2$O (0.7 mL, 2.1 mmol) at room temperature. The mixture was stirred strongly for 5 min. The solid went in solution but the reaction solution was cloudy and brown. To the mixture was added the ligand (0.849 g, 0.476 mmol) as a toluene solution (6 mL). The resulting dark brown mixture was stirred at room temperature for 3.5 h. To the mixture was added hexanes (15 mL) and filtered. The solution was concentrated under vacuum to afford 0.924 g (98%) of the desired compound as a white solid:

$^1$H NMR (400 MHz, C$_6$D$_6$) δ 8.14 (d, J=8.2 Hz, 2H), 7.98 (d, J=1.5 Hz, 2H), 7.94 (d, J=8.3 Hz, 2H), 7.87 (d, J=2.5 Hz, 2H), 7.75 (d, J=1.5 Hz, 2H), 7.64 (d, J=2.5 Hz, 2H), 7.54 (d, J=1.7 Hz, 2H), 7.47 (dd, J=8.2, 1.5 Hz, 2H), 7.31 (dd, J=8.3, $^{13}$C{$^1$H} NMR (126 MHz, c$_6$d$_6$) δ 154.46, 154.16, 148.67, 146.93, 142.45, 141.98, 140.06, 139.12, 137.55, 136.33, 133.68, 132.15, 132.03, 128.90, 126.78, 123.45, 120.90, 120.09, 119.69, 119.39, 118.75, 110.39, 108.80, 75.88, 57.86, 57.54, 56.85, 50.76, 39.58, 39.40, 38.31, 34.08, 33.74, 33.31, 33.05, 32.87, 32.81, 32.62, 32.42, 32.40, 32.20, 32.13, 30.38, 30.33, 30.21, 29.85, 29.80, 24.37, 23.17, 16.91, 15.90, 14.46, −2.99, −3.13.

Solubility Measurement of 15:

A 20-mL vial was charged with 82.0 mg of the Hf-complex and 0.8 mL of ISOPAR E. The mixture was stirred for 2 h and it was filtered via syringe filter. The colorless solution was weight and then concentrated under vacuum for 3 h. The white solid was weight to obtained 0.0217 g for a 6.2 w/w % solubility.

Inventive Catalyst I6

I6-1. Preparation of 4,4'-dibromo-2-nitro-1,1'-biphenyl

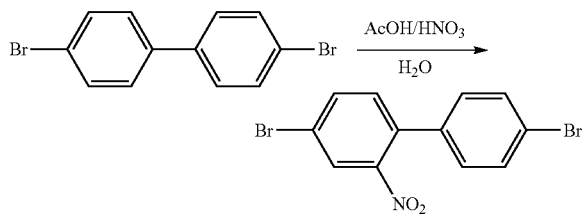

A three-necked round bottom flask was equipped with a magnetic stir bar, a condenser, an addition funnel capped and a septum. The condenser was equipped with a gas inlet on the top with a Y split connected to the nitrogen and the scrubber with 1M aqueous NaOH. The flask was placed under nitrogen atmosphere and was charged with 4,4'-dibromobiphenyl (30.0 g, 96.2 mmol) and acetic acid (452 mL, 7.89 mol). The addition funnel was charged with $HNO_3$ (113 mL, 2.39 mol). The suspension was heated to 100° C. The nitric acid was slowly added while monitoring the internal temperature (not exceeding 120° C.). The reaction was stirred at 100° C. for 6 h while sampling the reaction for GC/MS analysis for completion. After 6 h, the reaction was determined to be complete. The reaction was allowed to cool to room temperature overnight. A yellow solid remained after sitting at room temperature overnight. The solid was dissolved in $CH_2Cl_2$ (296 mL) and transferred to a separatory funnel for a phase separation. The phases were separated. The organic phase was washed with two 296-mL portions of water and then two 296-mL portions 1M aqueous NaOH. The organic phase was dried over $MgSO_4$, filtered by vacuum filtration, and concentrated by rotary evaporation to afford a crude yellow solid (33.0 g). The solid was dissolved in $CHCl_3$ and $SiO_2$ was added. The slurry was concentrated by rotary evaporation to afford a dry powder mixture. The mixture was split into three parts. Each part was loaded onto the ISCO CombiFlash system and was run using a 330 g Grace Column and a gradient between 15-100% $CH_2Cl_2$ in hexanes until the product eluted. All fractions containing the product were combined and concentrated by rotary evaporation to afford a yellow solid. To remove traces of hexanes, the solid was dissolved in $CH_2Cl_2$ and concentrated by rotary evaporation to afford a yellow solid (repeated twice). The solid was analyzed by $^1H$ NMR which showed impurities present that were carried over into the next reaction. The solid was dried under high vacuum to afford 30.4 g (89%) of the desired compound:

$^1H$ NMR (400 MHz, $CDCl_3$) δ 8.02 (d, J=2.0 Hz, 1H), 7.75 (dd, J=8.2, 2.0 Hz, 1H), 7.58-7.53 (m, 2H), 7.28 (d, J=8.2 Hz, 1H), 7.19-7.11 (m, 2H).

I6-2. Preparation of 2,7-dibromo-9H-carbazole

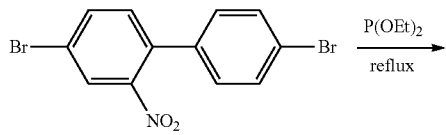

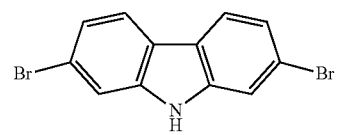

In a nitrogen glove box, a three-necked round bottom flask equipped with a magnetic stir bar and septa was charged with 4,4'-dibromo-2-nitro-1,1'-biphenyl (15.9 g, 44.5 mmol) and triethyl phosphite ($P(OEt)_3$) (54 mL, 0.31 mol). The flask was taken out of the glove box to in the hood and was placed under nitrogen atmosphere. The yellow slurry was heated at reflux (175° C. heating mantle temperature). The slurry eventually changed to a brown solution while heating to reflux. The reaction was stirred at reflux for 4 h while sampling the reaction for GC/MS analysis for completion. After 4 h, the reaction was determined to be complete. The reaction was allowed to cool to room temperature overnight. The reaction was transferred to a one-necked round bottom flask equipped with a magnetic stir bar and a short path distillation head. The reaction was distilled under high vacuum to remove the excess triethyl phosphite. The flask was slowly heated (75-125° C.) while under vacuum until no further distillation occurred. A thick brown sticky oil remained. The oil was allowed to cool to room temperature. A 1:1 solution of MeOH (82 mL) and ice water (82 mL) was added to the oil and then $CH_2Cl_2$ (150 mL) was added. Once the oil dissolved, the mixture was transferred to a separatory funnel. The phases were separated. The organic phase was dried over $MgSO_4$, filtered by vacuum filtration, and concentrated by rotary evaporation to afford a crude brown oil (18.3 g). The oil was dissolved in $CHCl_3$ and $SiO_2$ was added. The slurry was concentrated by rotary evaporation to afford a dry powdery mixture. The powdery mixture was split into two parts. Each part was loaded onto the ISCO CombiFlash system and was run using a 330 g Grace Column and a gradient of 2-5% EtOAc in hexanes for the first part and 2-10% EtOAc in hexanes for the second part until the product eluted. The pure fractions were combined and concentrated by rotary evaporation to afford a light yellow solid. To remove traces of hexanes, the solid was dissolved in $CH_2Cl_2$ and concentrated by rotary evaporation to afford a light yellow solid (repeated twice). The solid was dried under high vacuum to afford 7.75 g (54%) of the desired compound:

$^1H$ NMR (500 MHz, acetone-$d_6$) δ 10.58 (s, 1H), 8.02 (d, J=8.3 Hz, 2H), 7.72 (d, J=1.7 Hz, 2H), 7.33 (dd, J=8.3, 1.7 Hz, 2H);

$^{13}C\{^1H\}$ NMR (126 MHz, acetone-$d_6$) δ 142.06, 123.35, 122.62, 122.55, 120.00, 114.95.

I6-3. Preparation of 2,7-dibromo-9-(tert-butyldimethylsilyl)-9H-carbazole

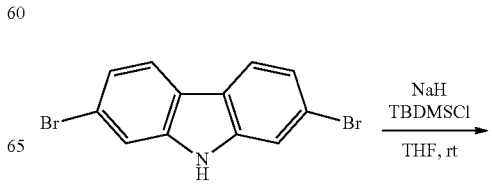

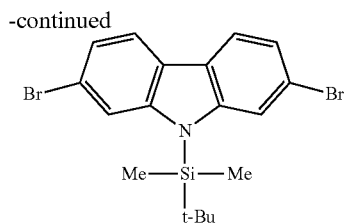

A glass jar with a stir bar was charged in a glove box with 2,7-dibromo-9H-carbazole (2.01 g, 6.18 mmol) followed by dry THF (50 mL). Sodium hydride powder (0.180 g, 7.50 mmol, >95% dry solid) was added slowly in portions to the solution over a period of 20 min. After allowing to stir at room temperature for 60 min, t-butyldimethylsilylchloride (TBDMSCl) (1.35 g, 8.96 mmol) was added to the reaction mixture. The solution was stirred 17 h at room temperature, followed by filtration and concentration in-vacuo. The resulting crude product was purified by column chromatography over SiO$_2$, eluting with 100% hexanes. Fractions containing the product were concentrated to afford 2.25 g (83%) of the desired compound as a white solid:

$^1$H NMR (500 MHz, CDCl$_3$) δ 7.86 (d, J=8.3 Hz, 2H), 7.73 (d, J=1.5 Hz, 2H), 7.35 (dd, J=8.3, 1.5 Hz, 2H), 1.05 (s, 10H), 0.76 (s, 6H);

$^{13}$C{$^1$H} NMR (126 MHz, CDCl$_3$) δ 145.98, 124.59, 123.22, 120.80, 119.18, 117.13, 26.49, 20.46, −1.28.

I6-4. Preparation of 9-(tert-butyldimethylsilyl)-2,7-bis(diisopropyhoctyl)silyl)-9H-carbazole

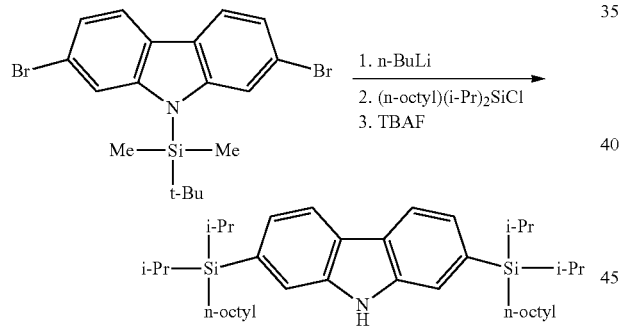

A solution of 2,7-dibromo-9-(tert-butyldimethylsilyl)-9H-carbazole (11.0 g, 25.0 mmol) in dry Et$_2$O (150 mL) was cooled to 0° C. in a schlenk flask under nitrogen atmosphere. A 1.6 M solution of n-BuLi in hexanes (37.5 mL, 60.0 mmol) was added slowly over 60 min, resulting in the formation of a white precipitate. Progress of the lithiation was monitored by GC/MS of MeOH quenched aliquots. The solution was allowed to stir with cooling for 17 h. The reaction vessel was sealed and moved to a nitrogen atmosphere glove box. Hexanes (200 mL) were added to the flask and the precipitates allowed to settle. The precipitate was collected by vacuum filtration and transferred to a round bottomed flask. Dry THF (200 mL) was added resulting in slurry, followed by slow addition of n-octyldiisopropylchlorosilane ((n-octyl)(iPr)$_2$SiCl) (11.5 g, 43.9 mmol). The reaction was stirred at room temperature for 17 h followed by removal to a fume hood where it was quenched with sat. aq. NaHCO$_3$ solution (25 mL). The product was extracted with EtOAc (100 mL), dried over anhydrous MgSO$_4$, filtered and concentrated to afford the crude intermediate. The crude material was taken up into CH$_2$Cl$_2$ (75 mL) and the solution cooled to 0° C. with an ice bath. A solution of tetrabutylammonium fluoride (6.87 g, 26.3 mmol) in THF (30 mL) was then added via addition funnel over a period of 30 min. After an additional 30 min, sat. aq. NaHCO$_3$ (50 mL) was added to the reaction mixture. The organic layer was isolated using a separatory funnel, dried over anhydrous MgSO$_4$, filtered and concentrated under reduced pressure. The resulting crude product was purified via column chromatography over SiO$_2$, eluting with 100% hexanes. Fractions containing the product were combined and concentrated in-vacuo to afford 7.92 g (51%) of the desired compound as clear viscous oil:

$^1$H NMR (500 MHz, CDCl$_3$) δ 8.08 (d, J=7.7 Hz, 2H), 7.98 (s, 1H), 7.58 (d, J=0.9 Hz, 2H), 7.37 (dd, J=7.7, 0.8 Hz, 2H), 1.54-1.46 (m, 4H), 1.46-1.39 (m, 4H), 1.39-1.26 (m, 20H), 1.10 (d, J=7.4 Hz, 12H), 1.06 (d, J=7.4 Hz, 12H), 1.04-0.98 (m, 4H), 0.96-0.89 (m, 6H);

$^{13}$C{$^1$H} NMR (126 MHz, CDCl$_3$) δ 139.21, 133.37, 125.64, 123.65, 119.41, 116.95, 34.44, 31.98, 29.35, 29.26, 24.38, 22.71, 18.32, 18.23, 14.13, 11.24, 9.72.

I6-5. Preparation of 2,7-bis(diisopropyl(octyl)silyl)-9-(2-((tetrahydro-2H-pyran-2-yl)oxy)-5-(2,4,4-trimethylpentan-2-yl)phenyl)-9H-carbazole

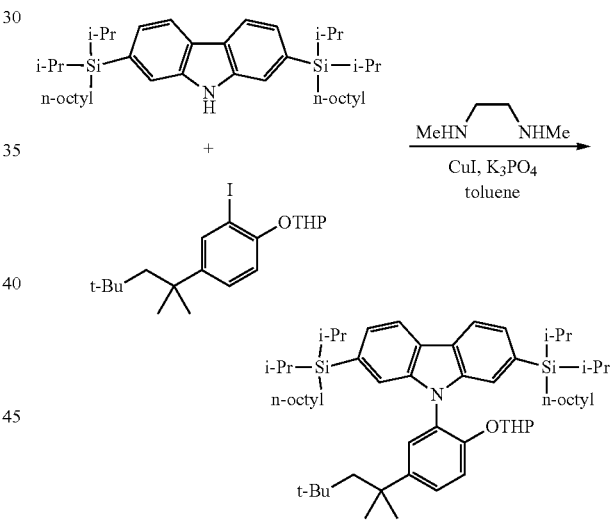

A two necked round bottomed flask outfitted with a magnetic stir bar, rubber septum and condenser with attached nitrogen inlet was charged (in a nitrogen atmosphere glovebox) with 2,7-bis(diisopropyl(octyl)silyl)-9H-carbazole (6.08 g, 9.80 mmol), 2-(2-iodo-4-(2,4,4-trimethylpentan-2-yl)phenoxy)tetrahydro-2H-pyran (5.74 g, 13.8 mmol), toluene (20 mL), CuI (0.411 g, 2.16 mmol), N,N'-dimethylethane-1,2-diamine (0.75 mL, 6.97 mmol) and K$_3$PO$_4$ (6.38 g, 30.1 mmol). The vessel was moved to a fume hood and placed under a blanket of nitrogen. The heterogeneous solution was stirred for 17 h at 105° C. The solution was filtered, concentrated and purified via column chromatography over SiO$_2$, eluting with 100% hexanes. Fractions containing the product were combined and concentrated. This residue was then stirred with hot CH$_3$CN followed by cooling in a freezer (−28° C.). The impurity laden CH$_3$CN was decanted off to yield 7.01 g (80%) of the desired compound as clear viscous oil which slowly solidified to a waxy solid after days of sitting:

¹H NMR (400 MHz, CDCl₃) δ 8.11 (d, J=7.7 Hz, 2H), 7.50-7.44 (m, 2H), 7.37 (dd, J=7.7, 1.0 Hz, 2H), 7.35-7.31 (m, 2H), 7.23 (s, 1H), 5.20 (t, J=2.9 Hz, 1H), 3.46 (td, J=11.1, 2.7 Hz, 1H), 3.31 (dt, J=11.3, 3.6 Hz, 1H), 1.75 (s, 2H), 1.46-1.371 (m, 9H), 1.37-1.04 (m, 32H), 1.04-0.94 (m, 24H), 0.92-0.86 (m, 9H), 0.77 (s, 9H);

¹³C{¹H} NMR (101 MHz, CDCl₃) δ 151.13, 144.42, 141.19, 141.12, 133.04, 132.87, 127.79, 126.93, 126.72, 125.52, 125.47, 123.39, 123.33, 119.05, 119.04, 117.10, 116.57, 116.46, 97.09, 61.42, 56.95, 38.18, 34.37, 32.38, 31.96, 31.82, 31.77, 31.52, 29.90, 29.35, 29.21, 24.93, 24.35, 22.70, 18.34, 18.25, 18.24, 18.21, 18.19, 17.73, 14.14, 11.22, 11.21, 11.15, 9.64, 9.62.

I6-6. Preparation of 2,7-bis(diisopropyl(octyl)silyl)-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole

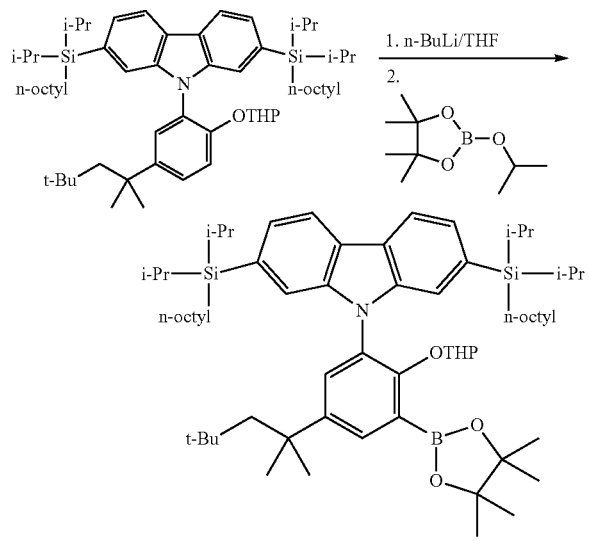

A round bottomed flask with a septum lid, a magnetic stir bar and condenser with attached nitrogen inlet was charged with 2,7-bis(diisopropyl(octyl)silyl)-9-(2-((tetrahydro-2H-pyran-2-yl)oxy)-5-(2,4,4-trimethylpentan-2-yl)phenyl)-9H-carbazole (6.95 g, 7.65 mmol) and dry THF (25 mL) which had been filtered through basic alumina. The solution was cooled to −78° C. (dry-ice/acetone bath), followed by addition of a solution of 1.6 M n-BuLi in hexanes (9.2 mL, 23 mmol) over 25 min. The solution was then warmed to 0° C. and allowed to stir for 4 h with cooling, during which time the color transitioned from colorless, to light yellow, to pale orange/brown. To the reaction mixture was added PinBOi-Pr (4.7 mL, 23 mmol), resulting in the formation of a white precipitate. The solution was allowed to slowly warm to room temperature over 17 h. The solution was quenched with a cold sat. aq. NaHCO₃ (10 mL) followed by extraction with additional THF. The organic layer was dried over anhydrous MgSO₄, filtered and concentrated under reduced pressure. The resulting crude material was stirred with hot CH₃CN followed by cooling in a freezer (−28° C.). The impurity laden CH₃CN was decanted off to yield 7.53 g (95%) of the desired compound as a clear viscous oil:

¹H NMR (400 MHz, CDCl₃) δ 8.07 (d, J=7.8 Hz, 2H), 7.84 (d, J=2.5 Hz, 1H), 7.53 (d, J=2.6 Hz, 1H), 7.44 (s, 1H), 7.38-7.31 (m, 3H), 5.00 (t, J=2.8 Hz, 1H), 2.50 (dt, J=11.4, 3.8 Hz, 1H), 2.40 (td, J=11.2, 2.7 Hz, 1H), 1.79-1.67 (m, 2H), 1.67-1.59 (m, 1H), 1.44-1.16 (m, 54H), 1.05-0.94 (m, 21H), 0.94-0.83 (m, 11H), 0.73 (s, 9H);

¹³C{¹H} NMR (101 MHz, CDCl₃) δ 156.25, 145.56, 140.31, 140.29, 133.94, 132.95, 132.75, 129.69, 129.47, 125.52, 125.47, 123.57, 123.01, 118.93, 118.79, 117.76, 116.66, 101.58, 83.45, 60.85, 56.97, 38.32, 34.35, 32.42, 31.95, 31.92, 31.78, 30.96, 29.73, 29.34, 29.22, 29.20, 25.05, 24.93, 24.86, 24.35, 24.31, 22.70, 18.35, 18.29, 18.28, 18.26, 18.23, 18.20, 18.17, 17.98, 14.13, 11.26, 11.13, 11.11, 11.08, 9.81, 9.67.

I6-7. Preparation of DOC-6190 Ligand [2',2'''-(propane-1,3-diylbis(oxy))bis(3-(2,7-bis(diisopropyl(octyl)silyl)-9H-carbazol-9-yl)-5'-fluoro-3'-methyl-5-(2,4,4-trimethylpentan-2-yl)-[1,1'-biphenyl]-2-ol))]

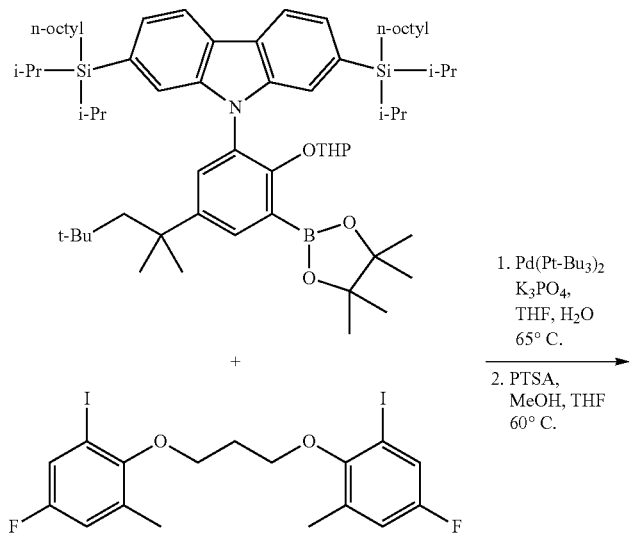

-continued

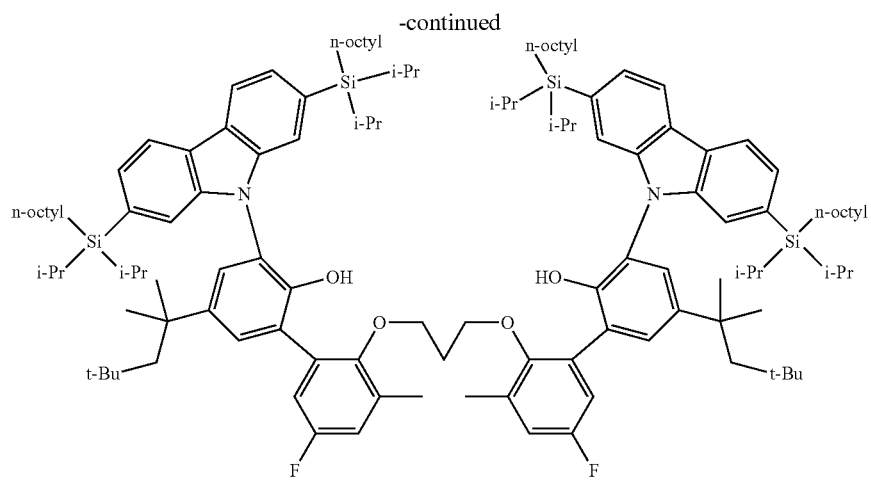

A two necked round bottomed flask with a magnetic stir bar, rubber septa and attached nitrogen inlet was charged with 2,7-bis(diisopropyl(octyl)silyl)-9-(2-((tetrahydro-2H-pyran-2-yl)oxy)-5-(2,4,4-trimethylpentan-2-yl)phenyl)-9H-carbazole (11.7 g, 11.3 mmol), 1,3-bis(4-fluoro-2-iodo-6-methylphenoxy)propane (2.75 g, 5.06 mmol), THF (24 mL), water (2.5 mL) and $K_3PO_4$ (4.24 g, 20.0 mmol). The solution was then degassed for 30 min via a constant stream of nitrogen bubbled through the solution. A solution of bis(tri-tert-butylphosphine)palladium (0.162 g, 0.32 mmol) in THF (2.5 mL) was added to the solution, followed by heating to 65° C. where it was held constant until completion of the reaction. After 18 h the reaction mixture was transferred to a separatory funnel and the product extracted with $CH_2Cl_2$. The organic layer was isolated, dried over anhydrous $MgSO_4$, filtered and concentrated in-vacuo to afford the crude intermediate. The intermediate was purified via reverse phase chromatography on $C_{18}$ media. A gradient of 55 to 100% THF in water was employed. The purified THP protected intermediate was dissolved in MeOH/THF (1:1) (30 mL), followed by the addition of PTSA monohydrate (0.357 g, 1.88 mmol). The reaction mixture was heated to 60° C. After 3 h, the reaction solution was treated with sat. aq. $NaHCO_3$ (30 mL). The organic layer was isolated, dried over anhydrous $MgSO_4$, filtered and concentrated in-vacuo to afford the crude product as yellow viscous oil. The product was purified via reverse phase chromatography on $C_{18}$ media eluting with a gradient of 55 to 100% THF in water. Fractions containing the desired product were combined and concentrated in-vacuo to afford 10.2 g (54%) of the desired compound as clear viscous oil:

$^1$H NMR (400 MHz, $CDCl_3$) δ 8.10 (d, J=7.7 Hz, 4H), 7.43 (d, J=2.4 Hz, 2H), 7.40 (d, J=2.3 Hz, 2H), 7.35 (d, J=7.7 Hz, 4H), 7.25 (s, 4H), 6.91 (dd, J=8.8, 3.1 Hz, 2H), 6.79 (dd, J=8.6, 3.1 Hz, 2H), 3.59 (t, J=6.3 Hz, 4H), 2.16 (s, 6H), 1.89 (s, 6H), 1.71 (s, 4H), 1.63 (p, J=5.9 Hz, 2H), 1.52 (s, 3H), 1.43 (s, 3H), 1.41-1.06 (m, 64H), 0.96-0.79 (m, 60H), 0.74 (s, 18H);

$^{19}$F{$^1$H} NMR (376 MHz, $CDCl_3$) δ −118.56 (t, J=8.8 Hz).

I6-8. Preparation of Inventive Catalyst I6

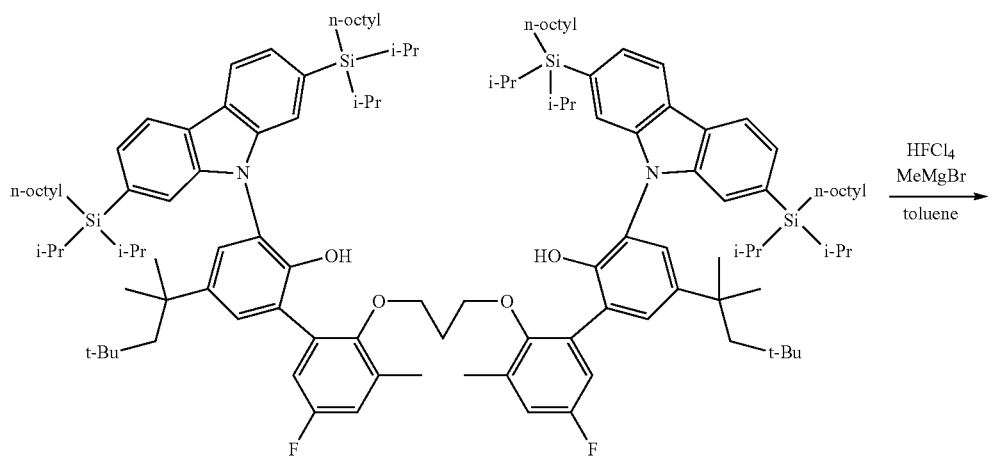

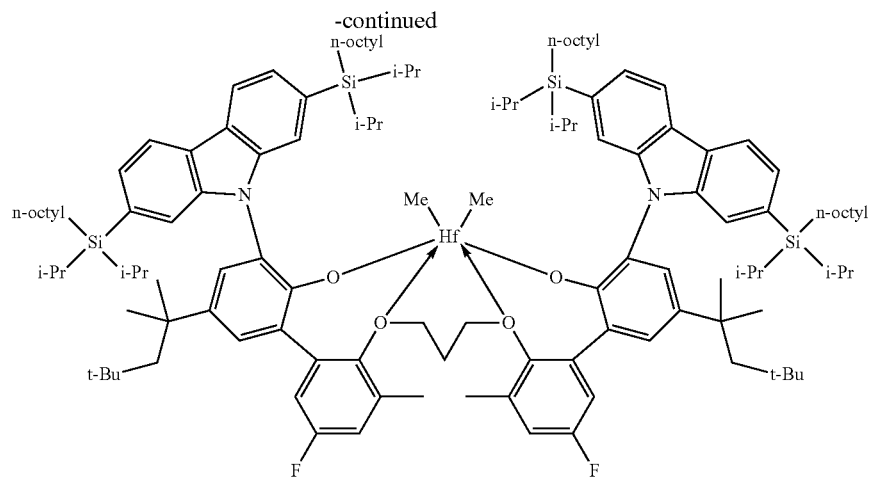

Reaction was set up in a glove box under nitrogen atmosphere. A jar was charged with HfCl$_4$ (0.545 g, 1.70 mmol) and toluene (70 mL) at room temperature. To the stirring slurry was added 3.0 M MeMgBr in Et$_2$O (2.5 mL, 7.5 mmol). The mixture was stirred strongly for 5 min. The solid went in solution but the reaction solution was cloudy and brownish. To the mixture was added the ligand (3.26 g, 1.68 mmol) as a toluene solution (7 mL). The resulting brown mixture was stirred at room temperature for 2.5 h. To the mixture was added hexanes (80 mL) and filtered. The brown solution was concentrated under vacuum to afford 3.54 g of the crude Hf-complex as a brown solid. The solid was purified by recrystallization using the following procedure: The solid was mostly dissolved in a mixture of hexanes (14 mL) and toluene (1 mL). The mixture was filtered and the solution was placed in the freezer at −25° C. overnight. The mother liquor was separated from the solid by immediately pouring into a filter funnel. The solid was washed with a small portion of cold hexanes (stored in the freezer at −25° C.). The solid was placed under high vacuum to dry to afford 1.80 g (49%) of the desired compound. The mother liquor was concentrated under vacuum. The solid was re-dissolved in hexanes (8 mL) and the solution was placed in the freezer overnight. However, only traces of solid were observed:

$^1$H NMR (400 MHz, C$_6$D$_6$) δ 8.26 (d, J=7.7 Hz, 2H), 8.13 (d, J=7.7 Hz, 2H), 8.04 (s, 2H), 7.92 (s, 2H), 7.69 (d, J=2.5 Hz, 2H), 7.64 (d, J=7.8 Hz, 2H), 7.54 (d, J=7.8 Hz, 2H), 7.36 (d, J=2.5 Hz, 2H), 7.01 (dd, J=8.7, 3.3 Hz, 2H), 6.20 (dd, J=8.1, 3.2 Hz, 2H), 3.80 (dt, J=9.8, 4.7 Hz, 2H), 3.56 (dt, J=10.5, 5.3 Hz, 2H), 1.74-1.41 (m, 17H), 1.41-1.12 (m, 104H), 1.07 (d, J=7.3 Hz, 6H), 1.04-0.86 (m, 21H), 0.79 (s, 18H), −0.69 (s, 6H);

$^{13}$C{$^1$H} NMR (126 MHz, C$_6$D$_6$) δ 161.60, 159.63, 154.24, 149.20, 149.18, 141.92, 141.44, 140.72, 136.19, 136.12, 135.31, 135.23, 134.98, 131.96, 130.55, 126.72, 126.45, 126.38, 123.89, 120.39, 119.69, 119.39, 117.54, 117.30, 117.12, 76.17, 57.22, 51.22, 38.09, 34.92, 34.59, 33.21, 32.52, 32.36, 32.33, 31.98, 30.56, 30.45, 30.19, 29.98, 29.81, 29.79, 29.68, 29.58, 25.11, 24.67, 23.16, 23.06, 19.15, 18.93, 18.82, 18.69, 18.66, 18.56, 17.01, 14.44, 14.34, 11.92, 11.81, 11.74, 11.69, 10.50, 9.66;

$^{19}$F{$^1$H} NMR (376 MHz, C$_6$D$_6$) δ−114.98 (t, J=8.4 Hz).

Solubility Measurement of I6 in ISOPAR E:

The following procedure was carried out to demonstrate that the Hf-complex was at least 10% soluble: In a glove box atmosphere 0.0247 g of the solid in a jar were completely dissolved in 0.1401 g of ISOPAR E. This is a solubility of about 14.9% w/w in ISOPAR E.

I7-1. Preparation of 2-iodo-4-methylphenol

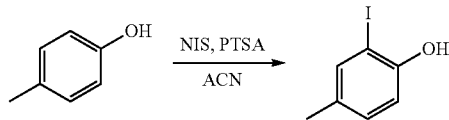

Procedure taken from: Bovonsombat, P.; Leykajarakul, J.; Khan, C.; Pla-on, K.; Krause, M. M.; Khanthapura, P.; Doowa, N.; Ali, R. *Tetrahedron* 2009, 50, 2664-2667.

A 250-mL three necked round bottomed flask was charged with p-cresol (9.98 g, 92.3 mmol), PTSA monohydrate (18.51 g 82.27 mmol) and CH$_3$CN (90 ml). The flask was cooled using an ice bath. The internal temperature was monitored using a thermo couple. NIS (21.8 g, 96.9 mmol) was added slowly so that the internal temperature of the reaction did not exceed 5° C. After the final addition of NIS, the reaction was removed from the ice bath and allowed to warm to room temperature. After 1 hour, the reaction was monitored by GC/MS and it was not complete. After 2 hours another GC/MS was taken and the reaction was not complete. The reaction was quenched with 20 wt % aq. sodium thiosulfate. The reaction mixture was then extracted with CH$_2$Cl$_2$, washed with sodium thiosulfate and then a sodium bicarbonate solution. The crude residue was purified by flash column chromatography (330 g SiO$_2$, 0% CH$_2$Cl$_2$ to 50% CH$_2$Cl$_2$ in hexanes) to afford 12.6 g (58%) of the desired compound as a solid:

$^1$H NMR (500 MHz, CDCl$_3$) δ 7.45 (d, J=2.0 Hz, 1H), 7.01 (dd, J=8.3, 1.8 Hz, 1H), 6.86 (d, J=8.3 Hz, 1H), 5.17 (s, 1H), 2.23 (s, 3H);

$^{13}$C NMR (126 MHz, CDCl$_3$) δ 152.66, 138.37, 132.04, 130.92, 114.80, 85.52, 20.07.

I7-2. Preparation of 2-(2-iodo-4-methylphenoxy)tetrahydro-2H-pyran

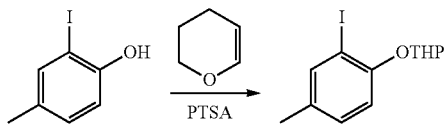

A three-necked round bottom flask was equipped with two septa, stir bar, and a nitrogen gas inlet. The flask was charged with 2-iodo-4-methylphenol (12.6 g, 53.8 mmol), and 3,4-dihydro-2H-pyran (13.7 mL, 161.5 mmol) then cooled to 0° C. using an ice bath. To the mixture was added PTSA (0.11 g, 0.57 mmol) and the solution was then stirred for 30 min. After 30 min, the reaction was allowed to warm up to room temperature and stirred overnight. Et$_2$O and 1N NaOH were added the next day. The aqueous layer was extracted with Et$_2$O (2×). The combined organics were washed with brine and dried over anhydrous MgSO$_4$. The organic layer was then dried under reduced pressure. The crude product was purified by flash column chromatography (240 g Al$_2$O$_3$ pH=7, 5% EtOAc to 8% EtOAc then to 50% EtOAc in hexanes). A second purification was performed using flash column chromatography (240 g Al$_2$O$_3$ pH=7, 0% EtOAc to 2% EtOAc then to 50% EtOAc in hexanes). The pure fractions were combined to afford 8.95 g (67%) of the desired compound as an oil.

$^1$H NMR (500 MHz, CDCl$_3$) δ 7.60 (dq, J=1.3, 0.7 Hz, 1H), 7.07 (ddq, J=8.3, 2.2, 0.7 Hz, 1H), 6.96 (d, J=8.3 Hz, 1H), 5.48 (t, J=3.0 Hz, 1H), 3.89 (td, J=11.1, 2.9 Hz, 1H), 3.59 (dddd, J=11.4, 4.5, 3.1, 1.6 Hz, 1H), 2.26 (d, J=0.7 Hz, 3H), 2.21-2.09 (m, 1H), 1.98 (dddd, J=15.7, 6.6, 3.3, 1.9 Hz, 1H), 1.90-1.85 (m, 1H), 1.78-1.59 (m, 3H);

$^{13}$C NMR (126 MHz, CDCl$_3$) δ 153.44, 139.52, 132.93, 129.88, 115.10, 96.65, 87.39, 61.68, 30.22, 25.28, 20.03, 18.33.

I7-3. Preparation of 2,7-bis(diisopropyl(octyl)silyl)-9-(5-methyl-2-((tetrahydro-2H-pyran-2-yl)oxy)phenyl)-9H-carbazole

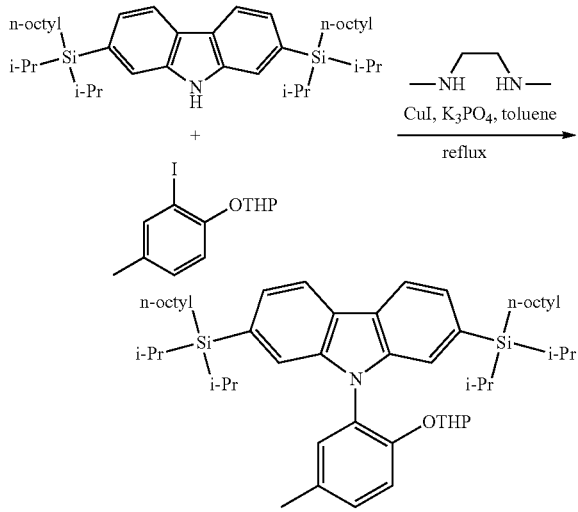

Glassware was oven dried. In a glove box, a three-necked round bottom flask equipped with a magnetic stir bar and septa was charged with 2,7-bis(diisopropyl(octyl)silyl)-9H-carbazole (1.50 g, 2.42 mmol), 2-(2-iodo-4-methylphenoxy)tetrahydro-2H-pyran (1.23 g, 3.88 mmol), K$_3$PO$_4$ (1.75 g, 8.24 mmol), and anhydrous toluene (9 mL). A mixture of anhydrous CuI (0.0382 g, 0.201 mmol), N,N-dimethylethylenediamine (0.0338 mL, 0.315 mmol), and anhydrous toluene (1 mL) was added to the flask. The flask was taken out of the glove box to the hood and was equipped with a condenser and a nitrogen gas inlet. The reaction was placed under nitrogen atmosphere and was heated at 125° C. (heating mantle temperature). The reaction was sampled for FIRMS analysis (0.1 mL sample, diluted in THF, filtered) for completion. After 4 h, the FIRMS analysis showed formation of the desired product with starting carbazole still remaining. After 22 h, the FIRMS analysis showed the desired product with some starting carbazole still remaining. Therefore, additional CuI (0.0190 g, 0.0998 mmol) slurried in anhydrous toluene (1 mL) and N,N'-dimethylethylenediamine (0.0338 mL, 0.315 mmol) was added and the reaction continued stirring at 125° C. for an additional 22.5 h. After 44.5 h, the FIRMS analysis showed consumption of the starting carbazole. Therefore the reaction was determined to be complete. The reaction was allowed to cool to room temperature. The reaction mixture was diluted with THF (10 mL) and filtered by vacuum filtration through a small SiO$_2$ plug. The plug was washed with THF (3×10 mL portions). The filtrate was concentrated by rotary evaporation to afford a crude orange oil. The oil was analyzed by $^1$H NMR. To remove impurities, CH$_3$CN was added to the oil and the mixture was mixed vigorously using a rotovap set at 50° C. for 30 min. The mixture was allowed to cool to room temperature and was placed in the freezer. The solvent was decanted. The sticky solid was washed with cold CH$_3$CN (3×10 mL portions) and decanted after each wash. To remove traces of CH$_3$CN, the solids was dissolved in CH$_2$Cl$_2$ and concentrated by rotary evaporation to afford a reddish-orange oil (repeated twice). The oil was analyzed by $^1$H NMR. To remove more impurities, CH$_3$CN was added to the oil and a magnetic stir bar was added. The mixture was stirred vigorously at 55° C. (heating mantle temperature) for 1 hour. The mixture was allowed to cool to room temperature and was placed in the freezer. The solvent was decanted. The sticky oil was washed with cold CH$_3$CN (3×10 mL portions) and decanted after each wash. To remove traces of CH$_3$CN, the oil was dissolved in CH$_2$Cl$_2$ and concentrated by rotary evaporation to afford a reddish-orange oil (repeated twice). The oil was analyzed by $^1$H NMR. The oil was dried under high vacuum to afford 1.79 g (91%) of the desired product:

$^1$H NMR (400 MHz, CDCl$_3$) δ 8.08 (d, J=7.7 Hz, 2H), 7.37 (s, 1H), 7.35 (d, J=7.7 Hz, 2H), 7.30 (dd, J=6.4, 1.9 Hz, 3H), 7.25 (dd, J=8.4, 2.1 Hz, 1H), 5.16-5.11 (m, 1H), 3.39 (td, J=11.1, 2.7 Hz, 1H), 3.25 (dt, J=11.2, 3.9 Hz, 1H), 2.39 (s, 3H), 1.44-1.21 (m, 30H), 1.17-1.15 (m, 1H), 1.13-1.11 (m, 1H), 1.11-0.95 (m, 26H), 0.92-0.86 (m, 10H);

$^{13}$C NMR (101 MHz, CDCl$_3$) δ 151.13, 141.11, 141.00, 133.19, 133.06, 132.39, 130.07, 129.69, 127.80, 125.79, 125.76, 123.70, 123.64, 119.18, 119.17, 118.61, 117.07, 116.97, 97.55, 61.52, 34.54, 34.53, 32.13, 30.02, 29.88, 29.50, 29.39, 25.08, 24.54, 22.86, 20.74, 18.51, 18.49, 18.48, 18.46, 18.38, 17.88, 14.29, 11.49, 11.46, 9.80, 9.75.

I7-4. Preparation of 2,7-bis(diisopropyhoctyl)silyl)-9-(5-methyl-2-((tetrahydro-2H-pyran-2-yl)oxy)-3-(4,4,5,5-tetramethyl-1,3,2-dioxaborolan-2-yl)phenyl)-9H-carbazole

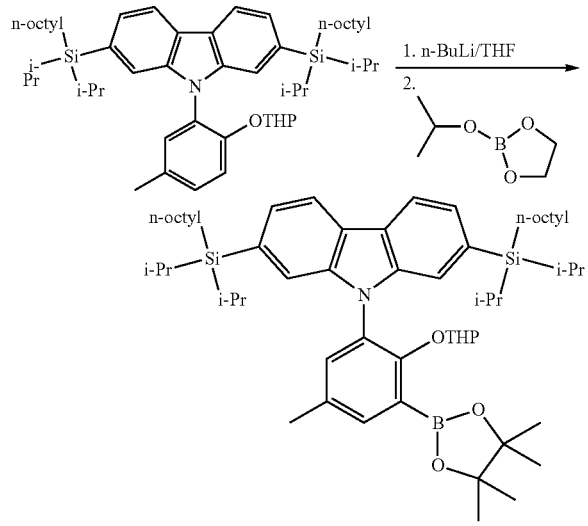

Glassware was oven dried. In a glove box, a three necked round bottom flask equipped with a magnetic stir bar and septa was charged with 2,7-bis(diisopropyl(octyl)silyl)-9-(5-methyl-2-((tetrahydro-2H-pyran-2-yl)oxy)phenyl)-9H-carbazole (1.71 g, 2.12 mmol) and anhydrous THF (13.5 mL). The flask was taken out of the glove box to the hood and was equipped with a nitrogen gas inlet. The reaction was placed under nitrogen atmosphere and was cooled to 0-10° C. (ice water bath) for 15 minutes. A solution of 2.5 M n-BuLi in hexanes (2.20 mL, 5.50 mmol) was slowly added via syringe. The reddish-orange solution turned to a brownish-orange solution. After stirring for 4 h at 0-10° C., PinBOi-Pr (8.7 mL, 42.6 mmol) was slowly added via syringe. The reaction was stirred for 1 hour at 0-10° C. before allowing the reaction to warm up to room temperature. The reaction continued to stir at room temperature overnight. A cold solution of sat. aq. NaHCO$_3$ (11.5 mL) was added to the murky orange solution. The mixture was transferred to a separatory funnel and the phases were separated. The aqueous phase was extracted with CH$_2$Cl$_2$ (3×8.5 mL portions). The organic phases were combined and washed with cold sat. aq. NaHCO$_3$ (31.5 mL) and then brine (31.5 mL). The organic phase was dried over MgSO$_4$, filtered by vacuum filtration, and concentrated by rotary evaporation to afford a crude orange sticky solid. The sticky solid was analyzed by $^1$H NMR. To remove impurities, CH$_3$CN was added to the sticky solid and the mixture was placed in the freezer. The solvent was decanted. The sticky solid was washed with cold CH$_3$CN (3×10 mL portions) and decanted after each wash. To remove traces of CH$_3$CN, the sticky solid was dissolved in CH$_2$Cl$_2$ and concentrated by rotary evaporation to afford a reddish-orange oil (repeated twice). The oil was analyzed by $^1$H NMR. The oil was dried under high vacuum to afford 1.81 g (91%) of the desired product:

$^1$H NMR (400 MHz, CDCl$_3$) δ 8.06 (d, J=7.7 Hz, 2H), 7.69 (s, 1H), 7.52 (s, 1H), 7.44-7.39 (m, 2H), 7.35 (dd, J=7.9, 3.1 Hz, 2H), 5.05 (t, J=2.5 Hz, 1H), 2.54 (dt, J=11.8, 3.1 Hz, 1H), 2.41-2.35 (m with overlapping s, 4H), 1.73-1.64 (m, 1H), 1.45-1.21 (broad m with overlapping s, 39H), 1.11-0.77 (m, 39H);

$^{13}$C NMR (101 MHz, CDCl$_3$) δ 156.30, 140.27, 140.25, 136.83, 133.41, 133.10, 132.97, 132.16, 130.39, 125.78, 123.88, 123.34, 119.12, 118.94, 118.15, 117.06, 101.91, 83.73, 61.01, 34.52, 34.50, 32.12, 29.87, 29.84, 29.49, 29.47, 29.41, 29.38, 25.19, 25.07, 24.56, 24.48, 22.85, 20.63, 18.55, 18.50, 18.47, 18.44, 18.40, 18.37, 18.36, 18.11, 14.28, 11.57, 11.45, 11.34, 9.98, 9.80.

I7-5. Preparation of 2',2'''-(propane-1,3-diylbis(oxy))bis(3-(2,7-bis(diisopropyl(octyl)silyl)-9H-carbazol-9-yl)-5'-fluoro-3',5-dimethyl-[1,1'-biphenyl]-2-ol)

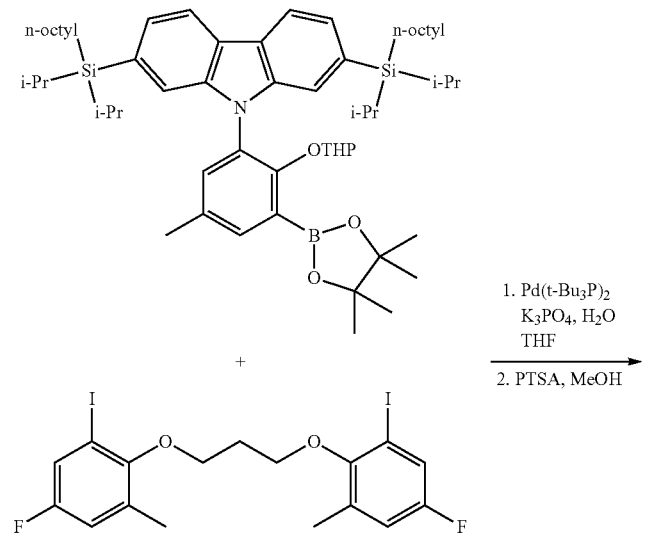

-continued

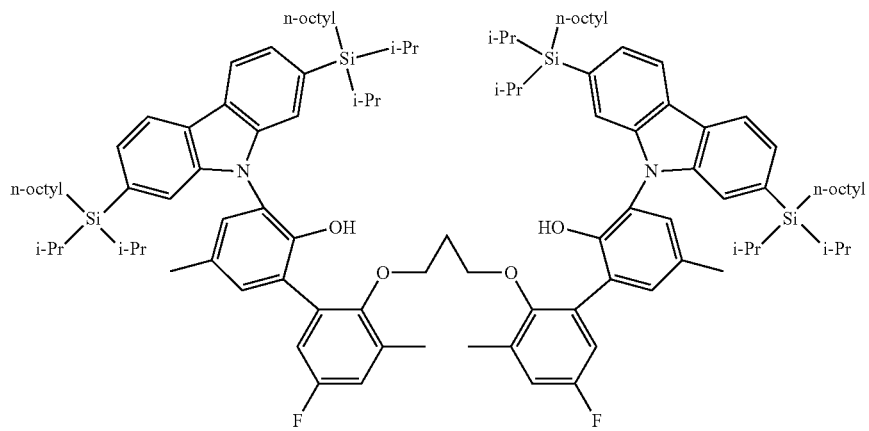

A three necked round bottom flask was equipped with a magnetic stir bar, septa, a condenser, and a nitrogen gas inlet. The flask was charged with 2,7-bis(diisopropyl(octyl) silyl)-9-(5-methyl-2-((tetrahydro-2H-pyran-2-yl)oxy)-3-(4,4,5,5-tetramethyl-1,3,2-dioxaborolan-2-yl)phenyl)-9H-carbazole (1.73 g, 1.85 mmol), a solution of potassium phosphate tribasic (0.717 g, 3.38 mmol) in water (0.5 mL), THF (5 mL), and 1,3-bis(4-fluoro-2-iodo-6-methylphenoxy) propane (0.458 g, 0.842 mmol). The reaction was placed under nitrogen atmosphere, purged with nitrogen for 45 minutes, and then a solution of Pd(Pt-Bu$_3$)$_2$ (0.0252 g, 0.0493 mmol) in THF (0.5 mL) was added. The reaction was heated at reflux at 65° C. (heating mantle temperature) for 101 h and was sampled for HRMS analysis (0.1 mL sample, diluted in THF, filtered) for completion. After 2 h, the HRMS analysis showed formation of the mono-coupled protected product and the bis-coupled protected product with the top fragment and bottom fragment remaining. After 66.5 h, the solvent was evaporated and solids precipitated out of solution therefore THF (5 mL) and water (0.5 mL) were added to redissolve the solids. After 66.5 h, the HRMS analysis showed mono-coupled protected product and top fragment remaining. Therefore Pd(Pt-Bu$_3$)$_2$ (0.0230 g, 0.0450 mmol) in THF (0.5 mL) was added and the reaction stirred for an additional 5 h. After 2 h, the HRMS showed a decrease in the amount of mono-coupled protected product and top fragment remaining. After 5 h, the HRMS showed little progress. After 101 h, the HRMS showed little progress. Therefore the reaction was determined to be complete and was allowed to cool to room temperature. The reaction was transferred to a separatory funnel, and the phases were separated. The organic phase was dried over MgSO$_4$, filtered by vacuum filtration, and concentrated by rotary evaporation to afford a crude orange oil. The oil was dissolved in THF and CELITE was added. The slurry was concentrated to a powdery mixture. The powdery mixture was loaded onto the ISCO CombiFlash system and was run using a C18 415 g Gold Column and a gradient of 70-100% THF in water until the product eluted. The fractions were analyzed by HRMS. The pure fractions were combined and concentrated by rotary evaporation to afford a yellow oil (0.988 g). The oil was dissolved in a mixture of THF (4.5 mL) and MeOH (4.5 mL). PTSA was added (0.0186 g, 0.0978 mmol) was added then the reaction was heated at reflux 60° C. (heating mantle temperature). The reaction was sampled for $^{19}$F NMR analysis for completion. After 2 h, the $^{19}$F NMR analysis showed formation of the deprotected ligand with consumption of the protected ligand. Therefore the reaction was determined to be complete and was allowed to cool to room temperature. To quench any remaining acid, sat. aq. NaHCO$_3$ (4.5 mL) was added to the reaction. The reaction was transferred to a separatory funnel, and the phases were separated. The organic phase was dried over MgSO$_4$, filtered by vacuum filtration, and concentrated by rotary evaporation to afford a crude orange oil (0.811 g). The oil was dissolved in hexanes and CELITE was added. The slurry was concentrated by rotary evaporation to afford a dry powdery mixture. The mixture was loaded onto the ISCO CombiFlash system and was run using a Diol 100 g Gold Column and a slow gradient of 0-2% diethyl ether in hexanes until the product eluted. The fractions were analyzed by HRMS. The pure fractions were combined and concentrated by rotary evaporation to afford a clear oil. The oil was placed under high vacuum to afford 0.448 g (31%) of the desired product:

$^1$H NMR (400 MHz, CDCl$_3$) δ 8.11 (dd, J=7.7, 0.7 Hz, 4H), 7.37 (dd, J=7.7, 0.8 Hz, 4H), 7.32 (s, 4H), 7.29 (d, J=2.2 Hz, 2H), 7.21 (d, J=1.8 Hz, 2H), 6.96 (dd, J=8.8, 3.1 Hz, 2H), 6.82 (dd, J=8.9, 3.0 Hz, 2H), 6.19 (s, 2H), 3.59 (t, J=6.2 Hz, 4H), 2.34 (s, 6H), 2.00 (s, 6H), 1.62 (p, J=6.3 Hz, 2H), 1.43-1.32 (m, 8H), 1.32-1.11 (m, 48H), 0.98-0.82 (m, 68H).

$^1$H NMR (400 MHz, CDCl$_3$) δ 8.11 (dd, J=7.7, 0.7 Hz, 4H), 7.37 (dd, J=7.7, 0.8 Hz, 4H), 7.32 (s, 4H), 7.29 (d, J=2.2 Hz, 2H), 7.21-7.19 (m, 2H), 6.96 (dd, J=8.8, 3.1 Hz, 2H), 6.82 (dd, J=8.9, 3.0 Hz, 2H), 6.19 (s, 2H), 3.59 (t, J=6.2 Hz, 4H), 2.34 (s, 6H), 2.00 (s, 6H), 1.62 (p, J=6.3 Hz, 2H), 1.43-1.32 (m, 9H), 1.32-1.11 (m, 42H), 0.98-0.82 (m, 58H) [Multiplicities due to Carbon-Fluorine coupling are not identified];

$^{19}$F NMR (376 MHz, CDCl$_3$) δ −118.78 (t, J=8.6 Hz).

I7-6. Preparation of Inventive Catalysts I7

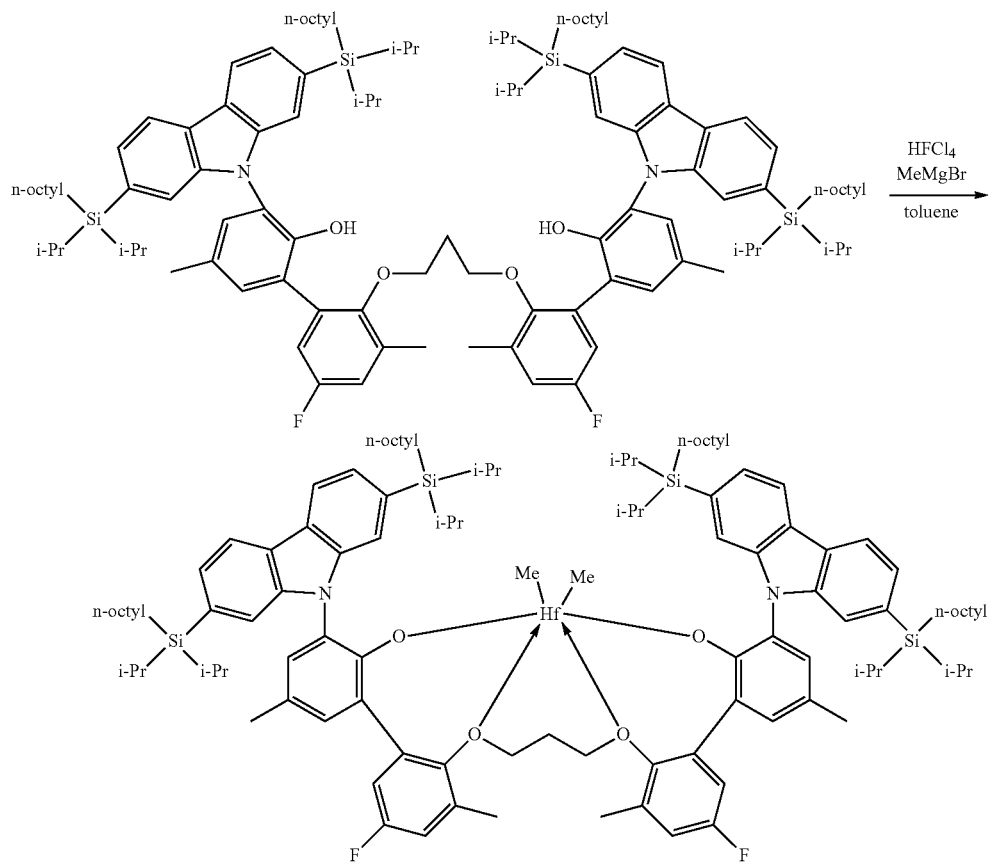

Reaction was set up in a glove box under nitrogen atmosphere. A jar was charged with HfCl$_4$ (0.0691 g, 0.216 mmol) and anhydrous toluene (10 mL). To the stirred slurry was added 3.0 M MeMgBr in Et$_2$O (0.320 mL, 0.960 mmol). The mixture was stirred strongly for 5 min. The solid went in solution but the reaction solution was cloudy and yellow. To the mixture was added a solution of the ligand (colorless oil, 0.369 g, 0.212 mmol) in toluene (5 mL). The resulting brown reaction mixture was stirred at room temperature for 3 h. To the resulting brown mixture was added hexanes (15 mL), then the solution was filtered. The brown solution was concentrated under vacuum overnight to afford 0.417 g of the crude product as a gray solid. $^1$H-NMR of the solid showed the desired product contaminated with solvents as well as potential impurities in the alkyl region due to the higher integration. [Note: The NMR sample in C$_6$D$_6$ showed black particles]. To the solid was added hexanes (12 mL) and stirred until most of the solid went in solution. The cloudy mixture was filtered (syringe filter). The filtrate, a transparent brown solution, was concentrated under high vacuum to afford 0.390 g (94%) of the product as an off white-pale gray solid:

$^1$H NMR (500 MHz, C$_6$D$_6$) δ 8.27 (d, J=7.8 Hz, 2H), 8.17 (d, J=7.7 Hz, 2H), 7.99 (s, 2H), 7.95 (s, 2H), 7.62 (d, J=7.8 Hz, 2H), 7.56 (d, J=7.8 Hz, 2H), 7.16 (m, 2H), 6.91 (d, J=2.4 Hz, 2H), 6.76 (dd, J=8.8, 3.2 Hz, 2H), 6.10 (dd, J=8.2, 3.2 Hz, 2H), 3.62 (dt, J=9.7, 4.6 Hz, 2H), 3.32 (dt, J=10.5, 5.4 Hz, 2H), 2.12 (s, 6H), 1.72-1.59 (m, 4H), 1.56-0.97 (m, 111H), 0.94 (t, J=7.1 Hz, 6H), 0.93-0.82 (m, 6H), −0.65 (s, 6H);

$^{13}$C NMR (126 MHz, C$_6$D$_6$) δ 161.50, 159.54, 154.32, 149.21, 149.19, 142.11, 141.71, 135.65, 135.58, 135.07, 135.02, 134.95, 131.80, 131.20, 131.04, 130.13, 128.32, 126.84, 126.53, 126.35, 124.18, 120.29, 119.68, 119.59, 118.23, 117.56, 117.37, 117.30, 117.12, 76.22, 51.25, 34.92, 34.65, 32.40, 32.39, 30.43, 29.88, 29.78, 29.74, 29.69, 25.12, 24.79, 23.21, 23.13, 20.32, 19.24, 19.05, 18.92, 18.79, 18.77, 18.74, 18.65, 18.61, 16.96, 14.51, 14.38, 12.04, 11.96, 11.90, 11.78, 10.55, 9.71;

$^{19}$F NMR (470 MHz, C$_6$D$_6$) δ −115.27 (t, J=8.7 Hz).

Solubility Measurement of I7 in ISOPAR E:

The following procedure was carried out to demonstrate that the Hf-complex was at least 9% soluble in ISOPAR E: 0.0231 g of the solid was weight in a vial. To the solid was added 0.2198 g of ISOPAR E and stirred for 1 hour. The solid completely dissolved to indicate a 9.5 wt % solubility in ISOPAR E.

Solubility Measurement of I7 in Hexanes:

To the Hf-complex was added 4 mL of hexane, and the solution was stirred for 4 hours. The solution was filtered via syringe to provide a weight of 2.0638 g. This solution was concentrated under vacuum to afford 0.3228 g of the solid 17 indicative of a 15.6 wt % solubility in hexanes.

Solubility Testing

Two Comparative Procatalysts (C1-C2) and six Inventive Procatalysts (I1-I7) were tested for solubility in three aliphatic hydrocarbon solvents. The structures of the procatalysts are shown below.

C1
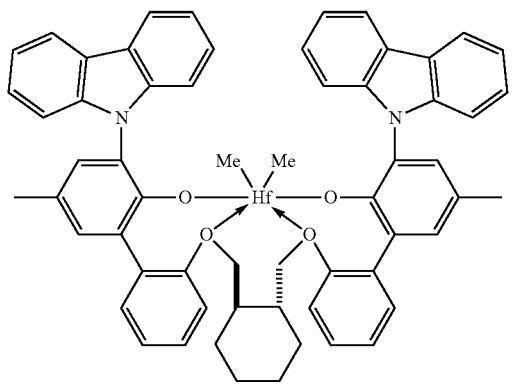
I1
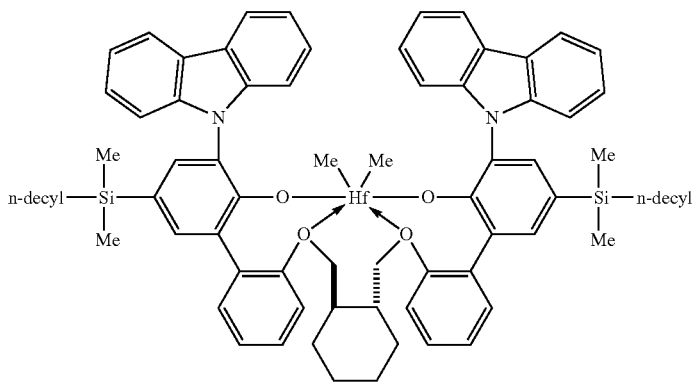
I2
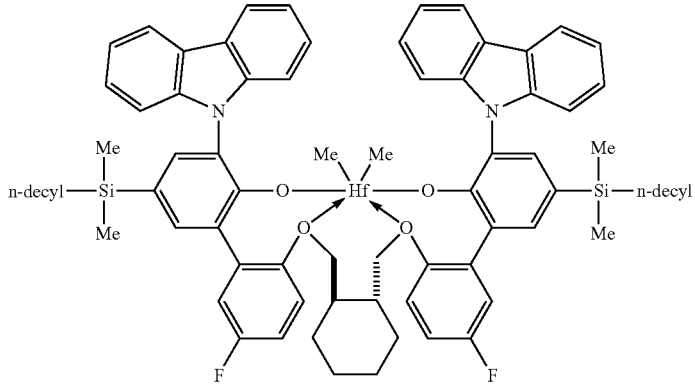
I3
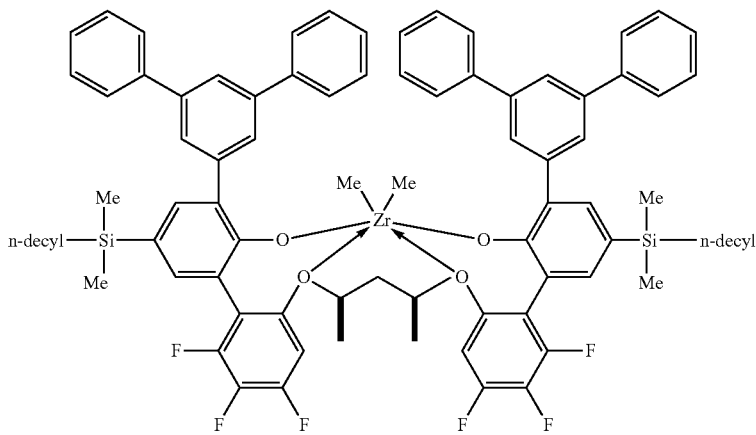

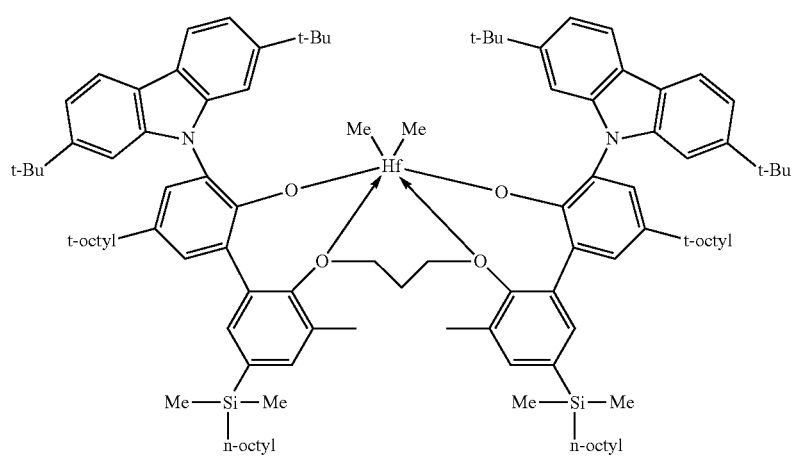
I4
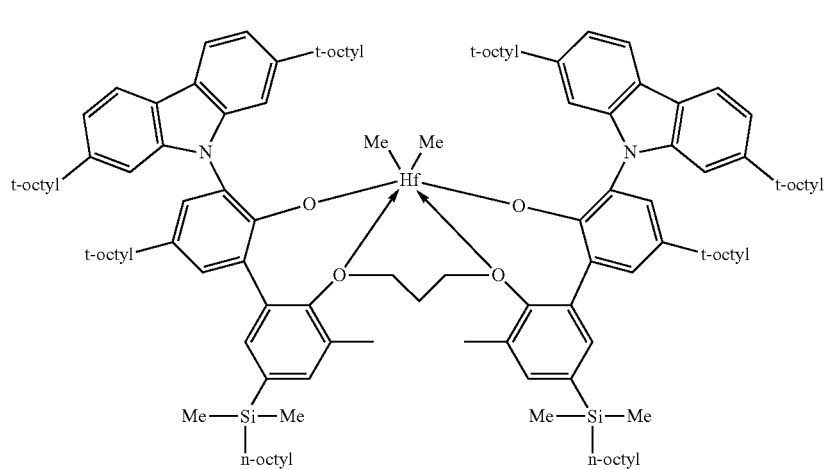
I5
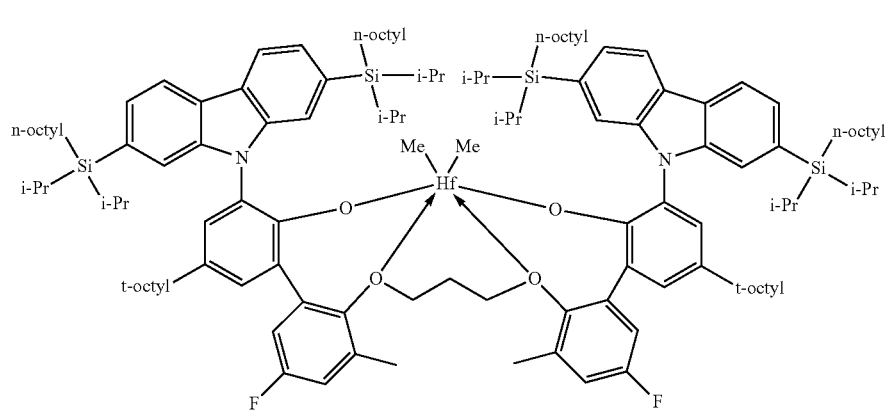
I6

-continued

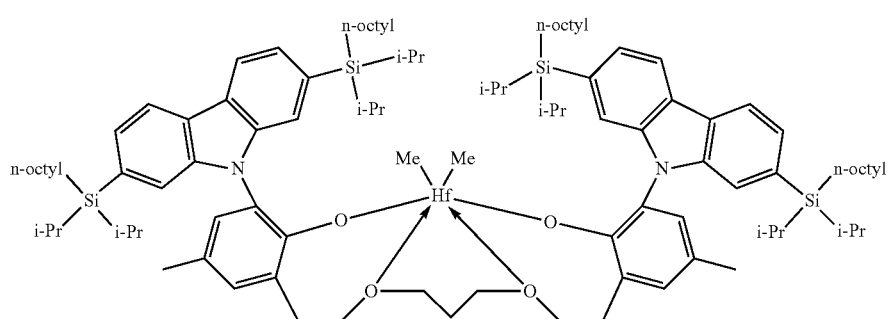

I7

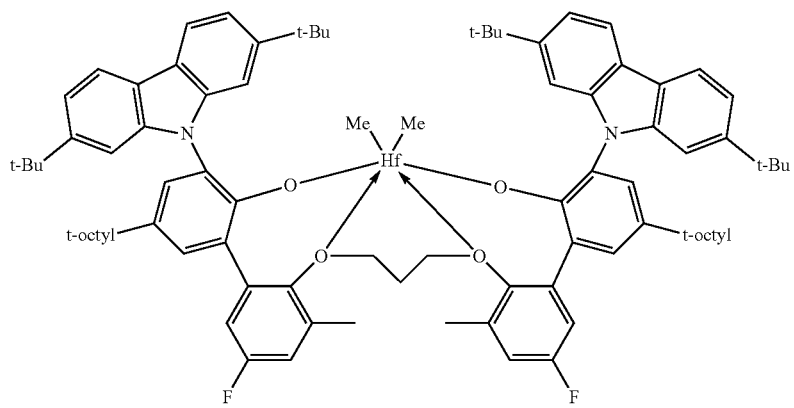

C2

Solubility was determined by either first forming a saturated solution of the procatalyst in one or more of the solvents as shown in Table 1. The insoluble portion of the procatalyst is allowed settle to the bottom of the container. A portion of the clear supernatant is removed, and the mass is recorded. The solvent is removed under reduced pressure. The mass of the resulting procatalyst that was in solution is recorded, allowing for calculation of a w/w % solubility in the indicated solvent. Alternatively, a known amount of solvent is added to a known amount of procatalyst and the solution is stirred for an indicated amount of time. After this period, the solution is filtered then weighted. The filtrate is concentrated to dryness under reduced pressure and the remaining procatalyst is weighted, allowing for calculation of a w/w % solubility in the indicated solvent.

Table 1 illustrates the solubility data. ISOPAR E is an isoparaffinic liquid which is commercially available from ExxonMobil Chemical Co.

TABLE 1

| Procatalyst | wt/wt % Solubility | | |
|---|---|---|---|
| | Hexanes | Methylcyclohexane | ISOPAR-E |
| C1 | 0.5 | 1.7 | 1.2 |
| I1 | 3.9 | | |
| I2 | 2.7 | | |
| I3 | | | 2.3 |
| C2 | | 0.2 | 0.1 |
| I4 | | | 2.1 |
| I5 | | | 6.2 |

TABLE 1-continued

| Procatalyst | wt/wt % Solubility | | |
|---|---|---|---|
| | Hexanes | Methylcyclohexane | ISOPAR-E |
| I6 | | | >10 |
| I7 | 15.6 | | 9.5 |

Polymerization

The procatalysts shown above were used to polymerize ethylene and 1-octene in a Parr batch polymerization reactor. All feeds were passed through columns of alumina and Q-5 catalyst (available from Engelhard Chemicals Inc.) prior to introduction into the polymerization reactor. Procatalyst and activator solutions were handled in a glove box under nitrogen atmosphere prior to addition to the polymerization reactor.

Table 2 illustrates the batch polymerizations results for each of $C_1$ and 11-12 under the following conditions: reactor temperature: 147° C.; ISOPAR-E: 1320 g; 1-octene: 250 g; ethylene pressure: 410 psi; Run time: 10 min; procatalyst to activator ratio is 1:1.2; activator=[HNMe($C_{18}H_{37}$)$_2$][B($C_6F_5$)$_4$]; procatalyst to MMAO ratio is 1:50;

TABLE 2

| Procatalyst | Efficiency | $T_C$ (° C.) | $T_M$ (° C.) | Density (g/cc) | MWD | Mw (g/mol) |
|---|---|---|---|---|---|---|
| C1 | 826,377 | 47.4 | 59.4 | 0.873 | 3.53 | 1,492,214 |
| I1 | 1,620,347 | 48.9 | 59.7 | 0.872 | 3.40 | 960,484 |

TABLE 2-continued

| Procatalyst | Efficiency | $T_C$ (° C.) | $T_M$ (° C.) | Density (g/cc) | MWD | Mw (g/mol) |
|---|---|---|---|---|---|---|
| I2 | 380,040 | 38.4 | 53.8 | 0.870 | 3.59 | 1,432,642 |
| I3[a] | 216,195 | 68.7 | 76.2 | 0.884 | 2.19 | 1,010,590 |

[a]batch polymerizations results for I3 under the following conditions: reactor temperature: 160° C.; ISOPAR-E: 1470 g; 1-octene: 100 g; ethylene pressure: 410 psi; Run time: 10 min; procatalyst to activator ratio is 1:1.2; activator = [HNMe($C_{18}H_{37}$)$_2$][B($C_6F_5$)$_4$]; procatalyst to MMAO ratio is 1:50.

Table 3 illustrates the batch polymerizations results for each C2 and I4 to I7 under the following conditions: reactor temperature: 190° C.; ISOPAR-E: 520 mL; 1-octene: 300 g; ethylene pressure: 400 psi; Run time: 10 min; procatalyst to activator ratio is 1:1.2; activator=[HNMe($C_{18}H_{37}$)$_2$][B($C_6F_5$)$_4$]; 10 μmol MMAO 50 μmoles.

TABLE 3

| Procatalyst | Efficiency | $T_M$ (° C.) | MWD | Mw (g/mol) |
|---|---|---|---|---|
| C2 | 2,160,985 | 118.8 | 2.24 | 203,057 |
| I4 | 5,210,376 | 119.3 | 2.05 | 243,671 |
| I5 | 5,901,358 | 121.1 | 2.39 | 257,837 |
| I6 | 2,447,885 | 121.7 | 2.08 | 171,229 |
| I7 | 2,689,226 | 121.5 | 2.17 | 192,239 |

Test Methods

Test methods include the following:

Density

Samples that are measured for density are prepared according to ASTM D-1928. Measurements are made within one hour of sample pressing using ASTM D-792, Method B.

$T_C$ and $T_M$ Determination

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 mL/min is used. Each sample is melt pressed into a thin film at about 175° C.; the melted sample is then air-cooled to room temperature (25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 min in order to remove its thermal history. Next, the sample is cooled to −40° C. at a 10° C./minute cooling rate and held isothermal at −40° C. for 3 min. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (Tm), and peak crystallization temperature (Tc).

Catalyst Efficiency (Efficiency)

The catalyst efficiency is calculated by dividing the number of grams of the polyolefin copolymer prepared by the total number of grams of metal M of ingredient (a) employed (i.e., metal M of the at least one metal-ligand complex of formula (I)) (i.e., catalyst efficiency=g polyolefin copolymer prepared/g metal M of metal-ligand complex(es) of formula (I) employed).

$M_W$ and MWD

Determination Number and weight-average molecular weights ($M_n$ and $M_w$, respectively) of the polymers were determined by Gel Permeation Chromatography (GPC). The chromatographic system consisted of either a Polymer Laboratories Model PL-210 or a Polymer Laboratories Model PL-220. The column and carousel compartments were operated at 140° C. Three Polymer Laboratories 10-micron Mixed-B columns were used with a solvent of 1,2,4-trichlorobenzene. The samples were prepared at a concentration of 0.1 g of polymer in 50 mL of solvent. The solvent used to prepare the samples contained 200 ppm of butylated hydroxytoluene (BHT). Samples were prepared by agitating lightly for 2 h at 160° C. The injection volume used was 100 μL and the flow rate was 1.0 mL/min. Calibration of the GPC column set was performed with narrow MWD polystyrene standards purchased from Polymer Laboratories. The polystyrene standard peak molecular weights were converted to polyethylene molecular weights using:

$$M_{polyethylene} = A(M_{polystyrene})^B$$

Where M is the molecular weight, A has a value of 0.4316, and B is equal to 1.0. Polyethylene equivalent molecular weight calculations were performed using Viscotek TriSEC software Version 3.0. The molecular weight distribution (MWD) is defined as $M_w/M_n$.

The present invention may be embodied in other forms without departing from the spirit and the essential attributes thereof, and, accordingly, reference should be made to the appended claims, rather than to the foregoing specification, as indicating the scope of the invention.

We claim:

1. A procatalyst for the polymerization of ethylene and optionally one or more alpha-olefins having the structure shown in formula (I) below:

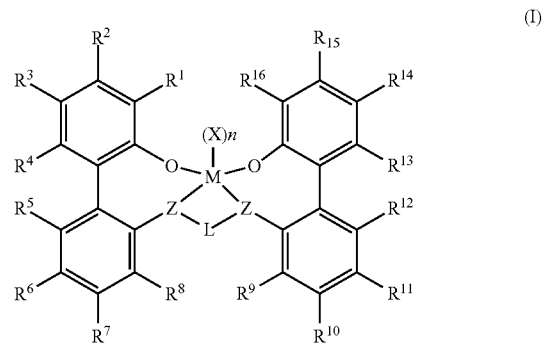

wherein:
  M is titanium, zirconium, or hafnium, each independently being in a formal oxidation state of +2, +3, or +4; and
  n is an integer of from 0 to 3, and wherein when n is 0, X is absent; and
  each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl; and L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is selected from the group consisting of ($C_1$-$C_{40}$)hydrocarbyl, each $R^P$ is ($C_1$-$C_{40}$)hydrocarbyl; and each $R^N$ is ($C_1$-$C_{40}$)hydrocarbyl or absent; and $R^{1-16}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen atom, hydrogen atom, and any combination thereof, provided that at least one of the $R^1$-$R^{16}$ is —Si($Y_1$)($Y_2$)($Y_3$) or ($C_1$-$C_{40}$)heterohydrocarbyl substituted with —Si($Y_1$)($Y_2$)($Y_3$); $Y_1$ is a ($C_3$-$C_{40}$)hydrocarbyl; $Y_2$ is a ($C_1$-$C_{40}$) hydrocarbyl; $Y_3$ is a ($C_1$-$C_{40}$)hydrocarbyl, with the further proviso that $Y_1$, $Y_2$ and $Y_3$ are not all isopropyl groups; and each of the hydrocarbyl, heterohydrocarbyl, Si($R^C$)$_3$, Ge($R^C$)$_3$, P($R^P$)$_2$, N($R^N$)$_2$, O$R^C$, S$R^C$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)hydrocarbylene wherein each R independently is an unsubstituted ($C_1$-$C_{18}$)hydrocarbyl; and optionally two or more R groups of the $R^{1-16}$ groups (for example, from $R^{1-8}$, $R^{9-16}$) can combine together into ring structures with such ring structures having from 2 to 50 atoms in the ring excluding any hydrogen atoms.

2. The procatalyst according to claim 1, having the structure shown below:

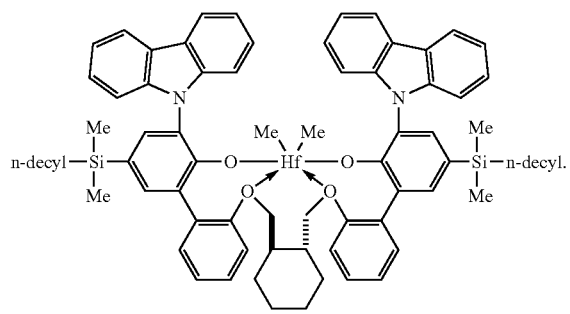

I1

3. The procatalyst according to claim 1, having the structure shown below:

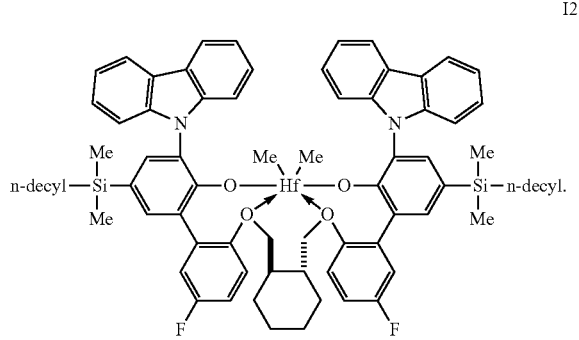

I2

4. The procatalyst according to claim 1, having the structure shown below:

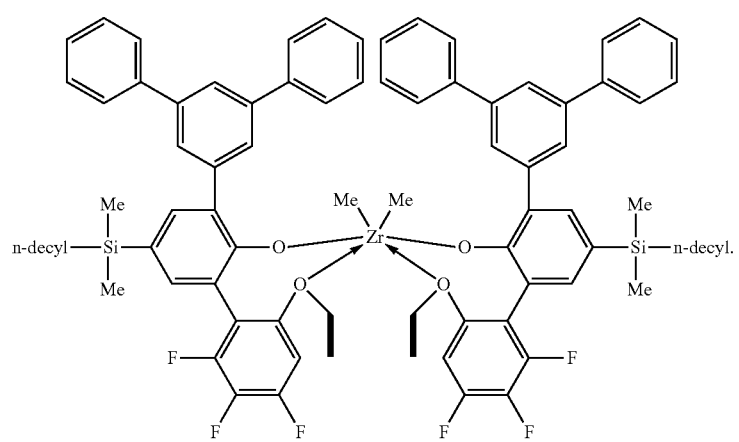

I3

5. The procatalyst according to claim 1, having the structure shown below:
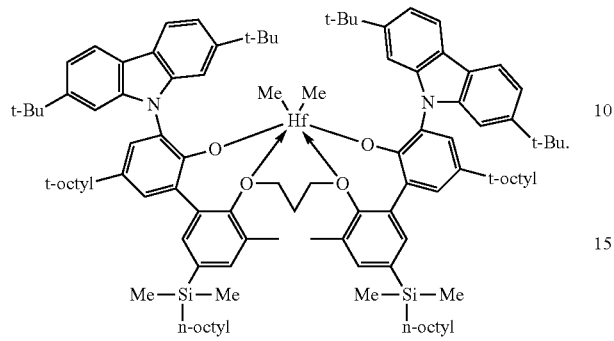
I4
6. The procatalyst according to claim 1, having the structure shown below:
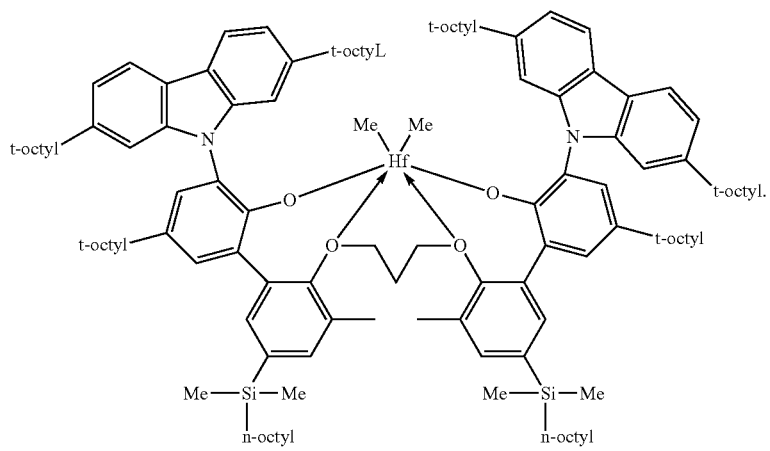
I5
7. The procatalyst according to claim 1, having the structure shown below:
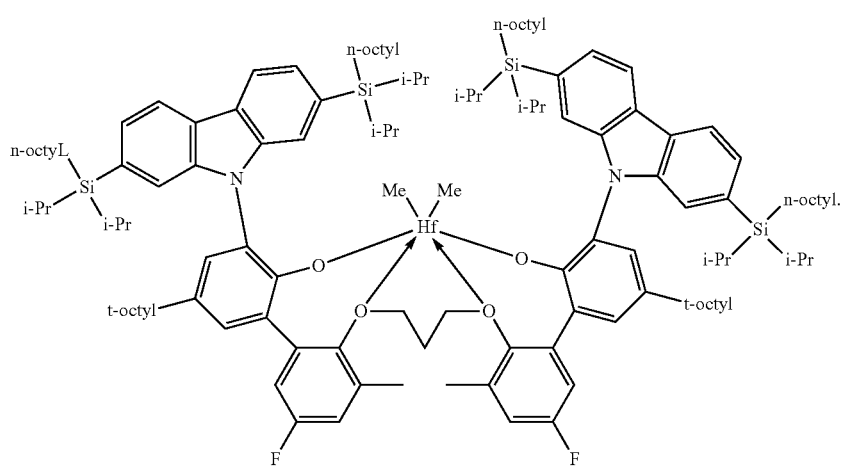
I6

8. The procatalyst according to claim 1, having the structure shown below:

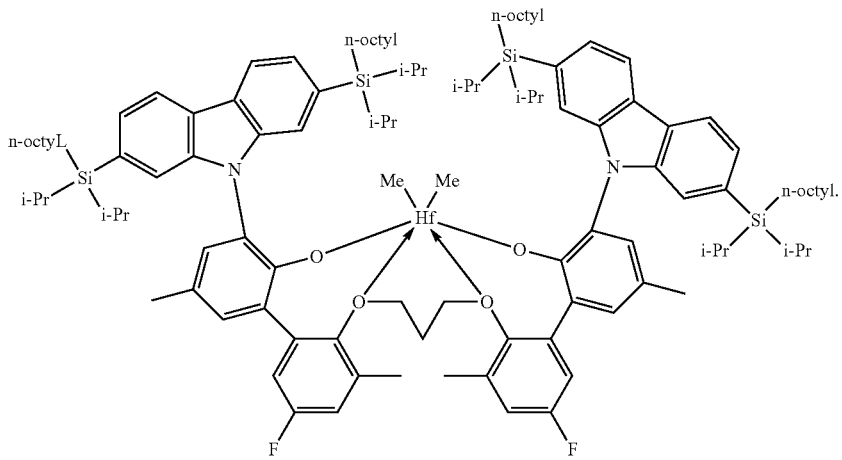

9. A polymerization process for producing ethylene based polymers comprising polymerizing ethylene and optionally one or more a-olefins in the presence of a catalyst system in a reactor system having one or more reactors, wherein the catalyst system comprises
one or more procatalysts comprising a metal-ligand complex of formula (I) below:

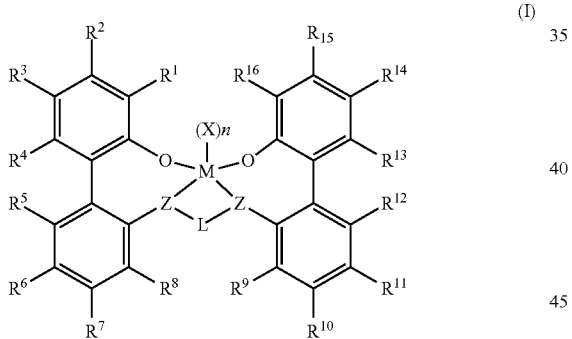

wherein:
M is titanium, zirconium, or hafnium, each independently being in a formal oxidation state of +2, +3, or +4; and n is an integer of from 0 to 3, and wherein when n is 0, X is absent; and
each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and
each Z independently is O, S, $N(C_1-C_{40})$hydrocarbyl, or $P(C_1-C_{40})$hydrocarbyl; and
L is $(C_2-C_{40})$hydrocarbylene or $(C_2-C_{40})$heterohydrocarbylene, wherein the $(C_2-C_{40})$hydrocarbylene has a portion that comprises a 2-carbon atom to 10-carbon atom linker backbone linking the Z atoms in formula (I) (to which L is bonded) and the $(C_2-C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_2-C_{40})$heterohydrocarbylene independently is a carbon atom or heteroatom, wherein each heteroatom independently is O, S, S(O), $S(O)_2$, $Si(R^C)_2$, $Ge(R^C)_2$, $P(R^P)$, or $N(R^N)$, wherein independently each $R^C$ is selected from the group consisting of $(C_1-C_{40})$hydrocarbyl, each $R^P$ is $(C_1-C_{40})$hydrocarbyl; and each $R^N$ is $(C_1-C_{40})$hydrocarbyl or absent; and
$R^{1-16}$ are each independently selected from the group consisting of a $(C_1-C_{40})$hydrocarbyl, $(C_1-C_{40})$heterohydrocarbyl, $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, halogen atom, hydrogen atom, and any combination thereof, provided that at least one of the $R^1$-$R^{16}$ is —$Si(Y_1)(Y_2)(Y_3)$ or $(C_1-C_{40})$heterohydrocarbyl substituted with —$Si(Y_1)(Y_2)(Y_3)$; $Y_1$ is a $(C_3-C_{40})$hydrocarbyl; $Y_2$ is a $(C_1-C_{40})$hydrocarbyl; $Y_3$ is a $(C_1-C_{40})$hydrocarbyl, with the further proviso that $Y_1$, $Y_2$ and $Y_3$ are not all isopropyl groups; and
each of the hydrocarbyl, heterohydrocarbyl, $Si(R^C)_3$, $Ge(R^C)_3$, $P(R^P)_2$, $N(R^N)_2$, $OR^C$, $SR^C$, $R^CS(O)$—, $R^CS(O)_2$—, $(R^C)_2C=N$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C=N$—, NC—, RC(O)O—, ROC(O)—, RC(O)N(R)—, or $R_2NC(O)$—, or two of the $R^S$ are taken together to form an unsubstituted $(C_1-C_{18})$hydrocarbylene wherein each R independently is an unsubstituted $(C_1-C_{18})$hydrocarbyl; and
optionally two or more R groups of the $R^{1-16}$ groups (for example, from $R^{1-8}$, $R^{9-16}$) can combine together into ring structures with such ring structures having from 2 to 50 atoms in the ring excluding any hydrogen atoms.

10. The polymerization process according to claim 9 wherein the one or more procatalysts are selected from the group consisting of the following:

I1
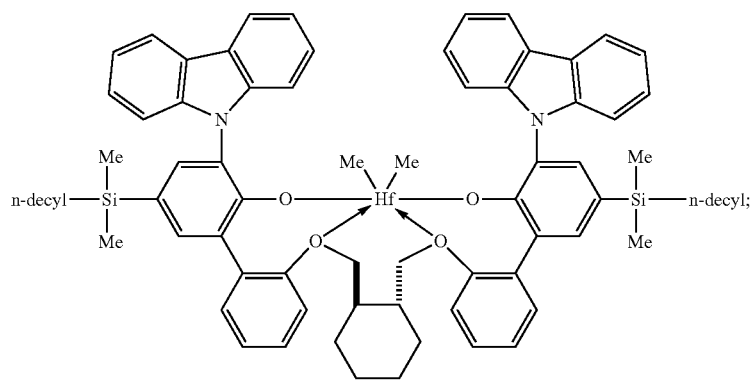
I2
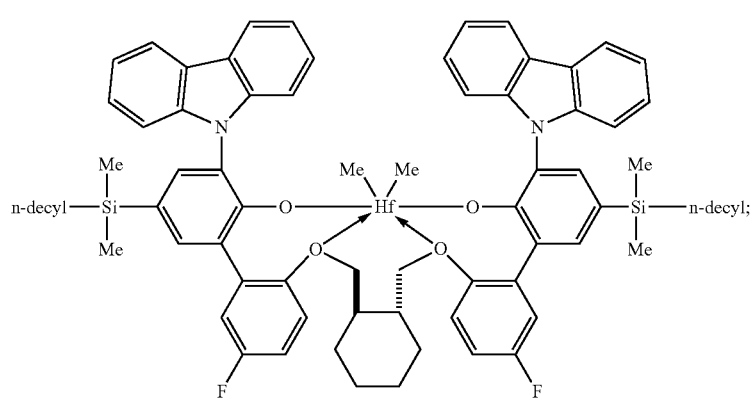
I3
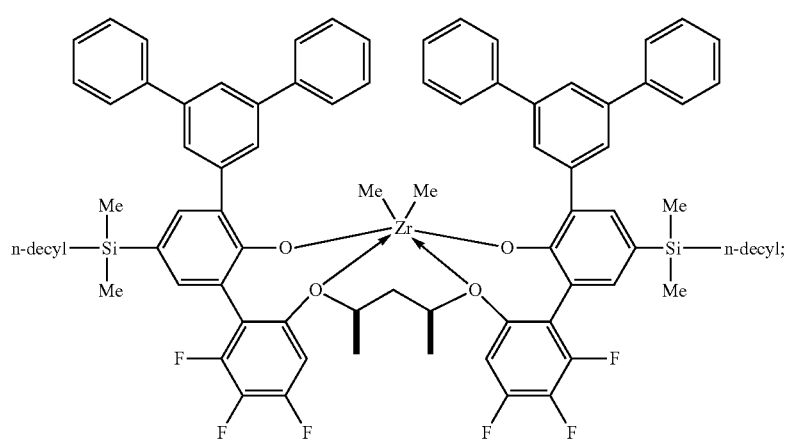
I4
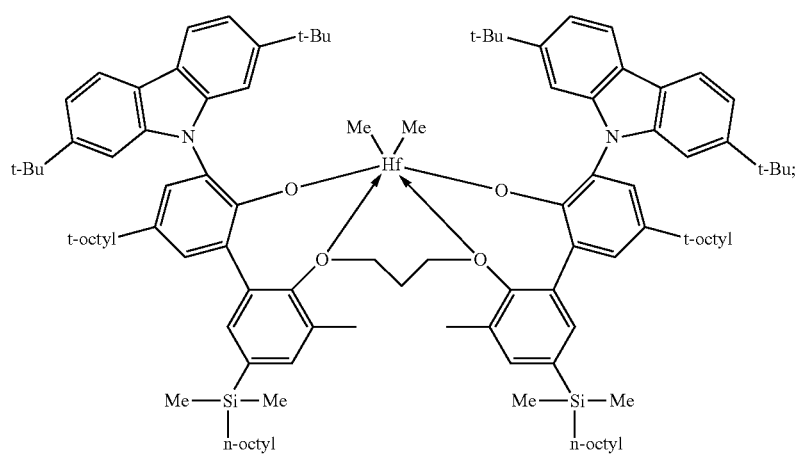

-continued

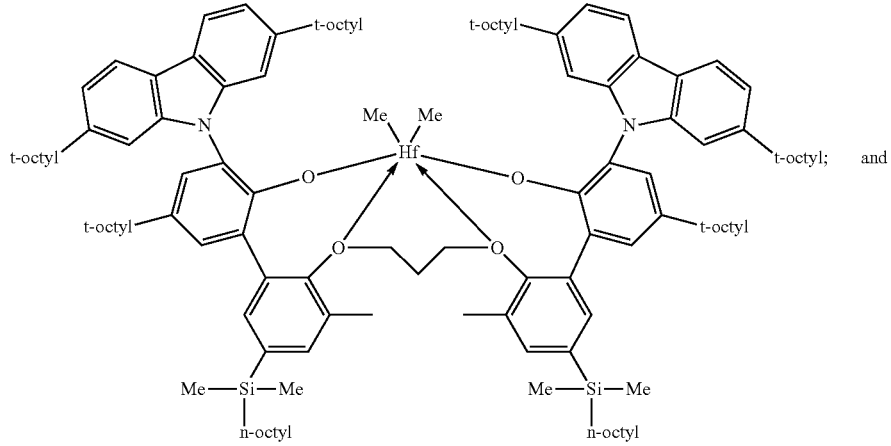

I5

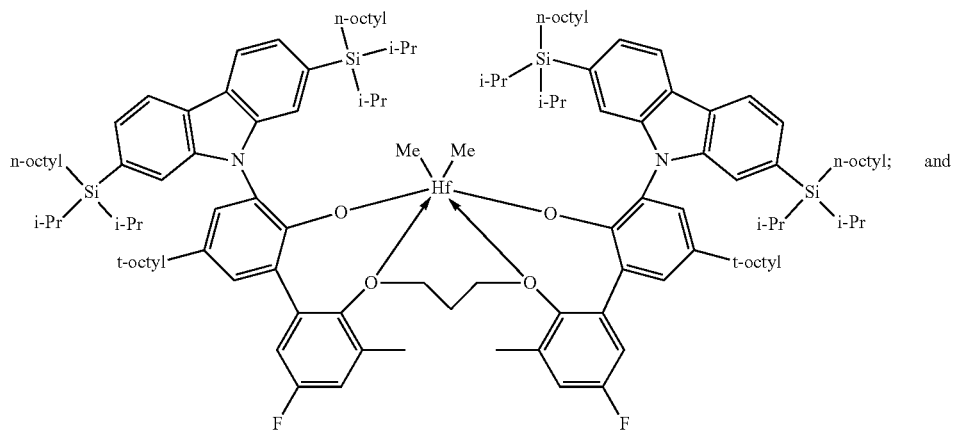

I6

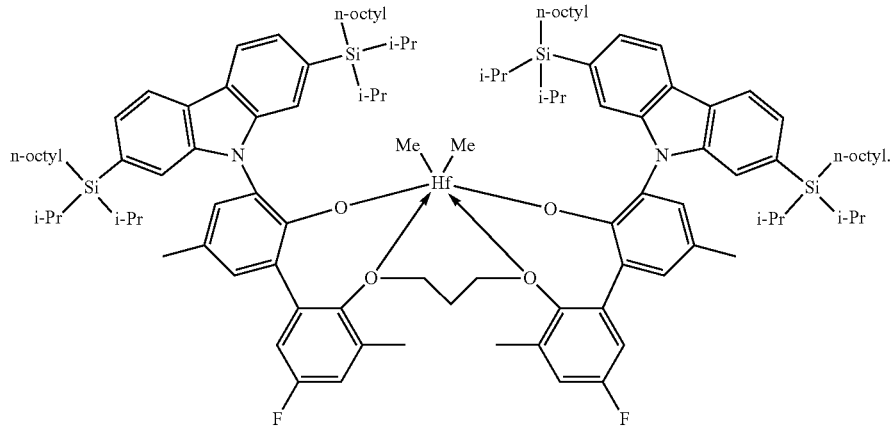

I7

11. The polymerization process according to claim 9 wherein the procatalyst exhibits a solubility in aliphatic hydrocarbons of equal to or greater than 0.8 wt %.

12. The polymerization process according to claim 9 wherein a ratio of a solubility in an aliphatic hydrocarbon of the procatalyst to the solubility in the aliphatic hydrocarbon of a comparative procatalyst is at least 3, wherein the comparative procatalyst has the same structure of the procatalyst except wherein the comparative procatalyst does not have any $SiY_1(Y_2)(Y_3)$ groups and such $SiY_1(Y_2)(Y_3)$ groups are replaced with a hydrocarbyl having from one to 10 carbon atoms.

13. The polymerization process according to claim 12, wherein the ratio is at least 5.

14. The polymerization process according to claim 13, wherein the ratio is at least 8.

* * * * *